(12) United States Patent
Wright

(10) Patent No.: US 12,502,183 B2
(45) Date of Patent: Dec. 23, 2025

(54) JOINT REVISION SURGERY APPARATUS

(71) Applicant: MAP Medical Solutions, LLC, Twin Falls, ID (US)

(72) Inventor: Mark B. Wright, Jackson, ID (US)

(73) Assignee: MAP Medical Solutions, LLC, Twin Falls, ID (US)

( * ) Notice: Subject to any disclaimer, the term of this patent is extended or adjusted under 35 U.S.C. 154(b) by 619 days.

(21) Appl. No.: 17/899,521

(22) Filed: Aug. 30, 2022

(65) Prior Publication Data

US 2023/0172622 A1 Jun. 8, 2023

Related U.S. Application Data

(63) Continuation-in-part of application No. 17/542,636, filed on Dec. 6, 2021.

(51) Int. Cl.
| | | |
|---|---|---|
| A61B 17/17 | (2006.01) | |
| A61B 17/00 | (2006.01) | |
| A61B 17/16 | (2006.01) | |
| A61B 17/56 | (2006.01) | |
| A61B 17/92 | (2006.01) | |
| A61F 2/46 | (2006.01) | |

(52) U.S. Cl.
CPC ........ *A61B 17/175* (2013.01); *A61B 17/1668* (2013.01); *A61F 2/4607* (2013.01); *A61B 2017/00526* (2013.01); *A61B 2017/564* (2013.01); *A61B 17/92* (2013.01); *A61F 2002/4619* (2013.01)

(58) Field of Classification Search
CPC . A61B 17/92; A61B 17/921; A61B 2017/922; A61B 2017/924; A61B 2017/925; A61B 2017/927; A61B 2017/928; A61B 17/1668; A61B 17/175; A61F 2/4607
See application file for complete search history.

(56) References Cited

U.S. PATENT DOCUMENTS

| | | | |
|---|---|---|---|
| 4,686,971 A | 8/1987 | Harris et al. | |
| 5,674,225 A | 10/1997 | Muller | |
| 5,743,910 A * | 4/1998 | Bays | A61F 2/4607 606/99 |
| 12,376,866 B2 * | 8/2025 | Amino | A61F 2/4607 |

(Continued)

*Primary Examiner* — Matthew J Lawson
(74) *Attorney, Agent, or Firm* — Richard D. Clarke

(57) ABSTRACT

The present application is directed a Joint Revision Surgery Apparatus which includes a surgical knife blade guide block which has a plurality of rearward blade guide slots, a central cavity and a plurality of guide slots having a two-way adjustable L-shaped guide plate. The surgical knife blade guide block central cavity houses a stem trunnion securing member and is positioned over the trunnion end of the existing prosthesis to be removed and secured to the prothesis. The guide blade block is secured to the trunnion of the prosthesis to be extracted using a stem trunnion securing member housed within the guide block. Straight, curved and compound curved knife blades are guided by the blade guide slots to cut the prothesis free. The Joint Revision Surgery Apparatus facilitates rapid, efficient and complete removal of an existing prosthesis during joint revision surgery, and significantly increases positive medical outcomes for joint revision procedures.

9 Claims, 50 Drawing Sheets

(56) References Cited

U.S. PATENT DOCUMENTS

| | | | |
|---|---|---|---|
| 2004/0162619 A1* | 8/2004 | Blaylock | A61F 2/30734 |
| | | | 606/88 |
| 2010/0010492 A1 | 1/2010 | Dower | |
| 2012/0290099 A1* | 11/2012 | Gibson | A61F 2/4637 |
| | | | 623/20.11 |
| 2015/0057666 A1* | 2/2015 | Kelley | A61B 17/175 |
| | | | 606/87 |
| 2015/0127010 A1* | 5/2015 | Macke | A61B 17/1742 |
| | | | 606/88 |
| 2021/0212838 A1 | 7/2021 | Wright | |
| 2022/0313282 A1 | 10/2022 | Wright | |
| 2024/0285326 A1* | 8/2024 | Chana | A61B 17/8861 |

\* cited by examiner

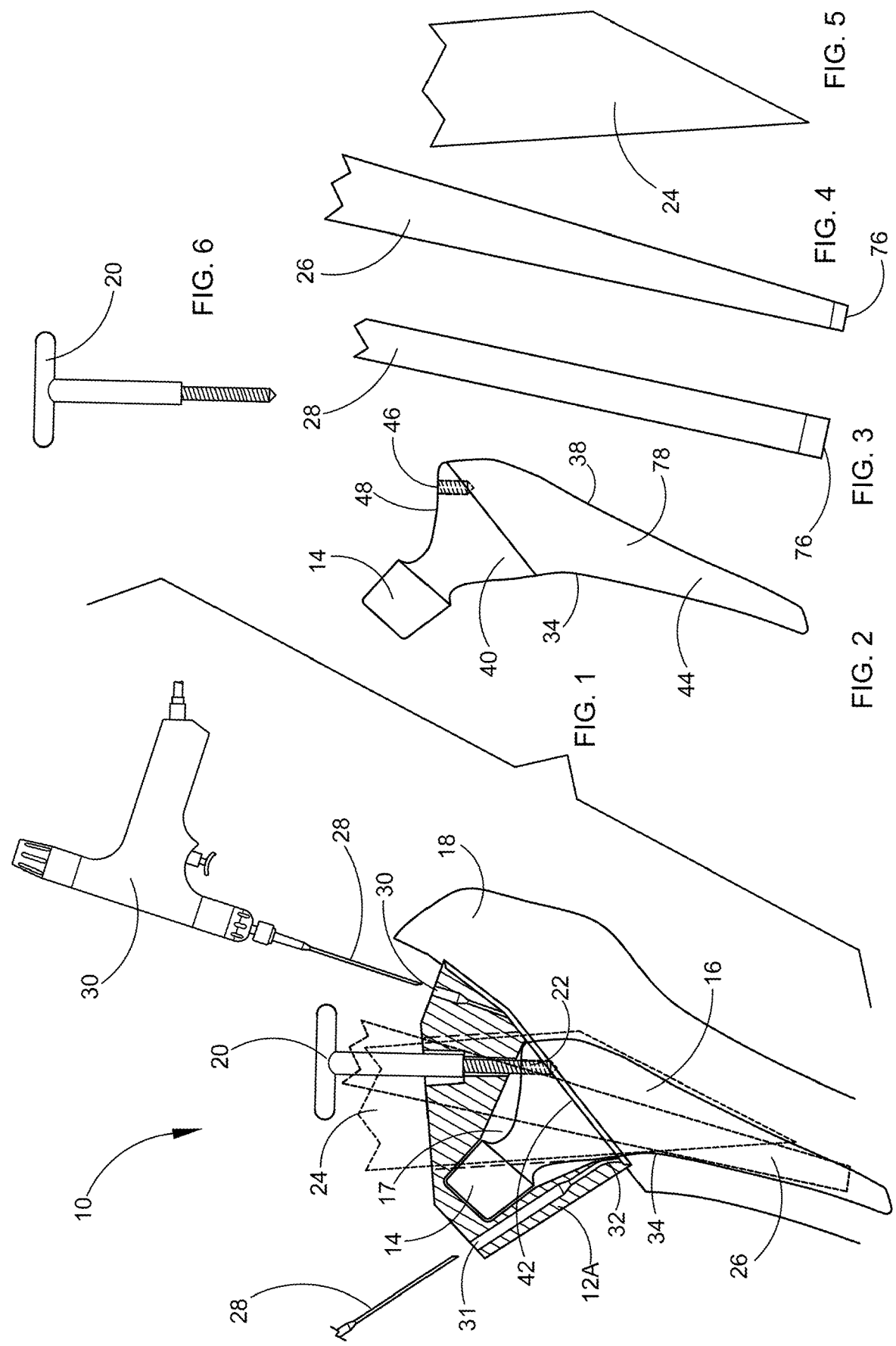

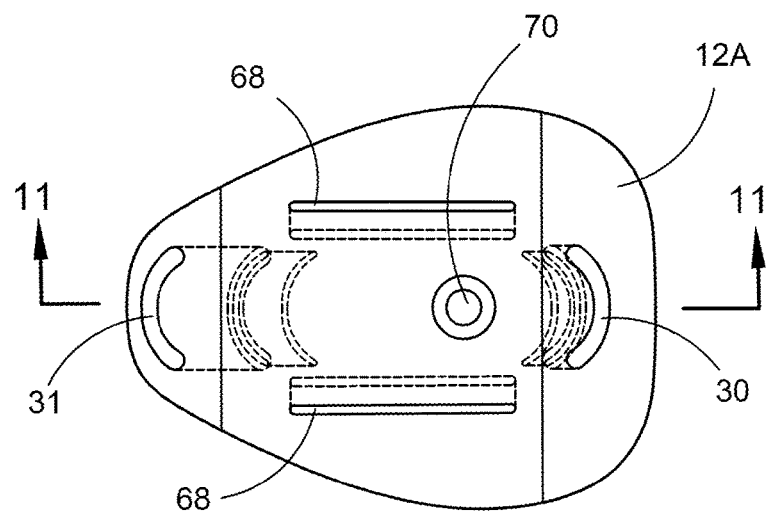
FIG. 12
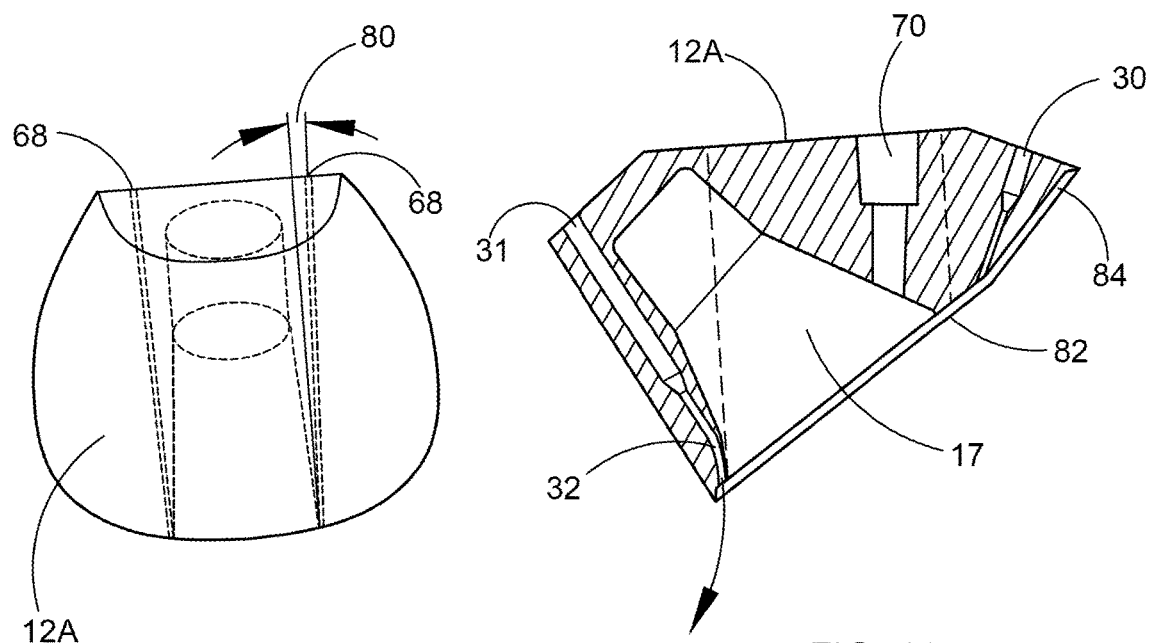
FIG. 10
FIG. 11

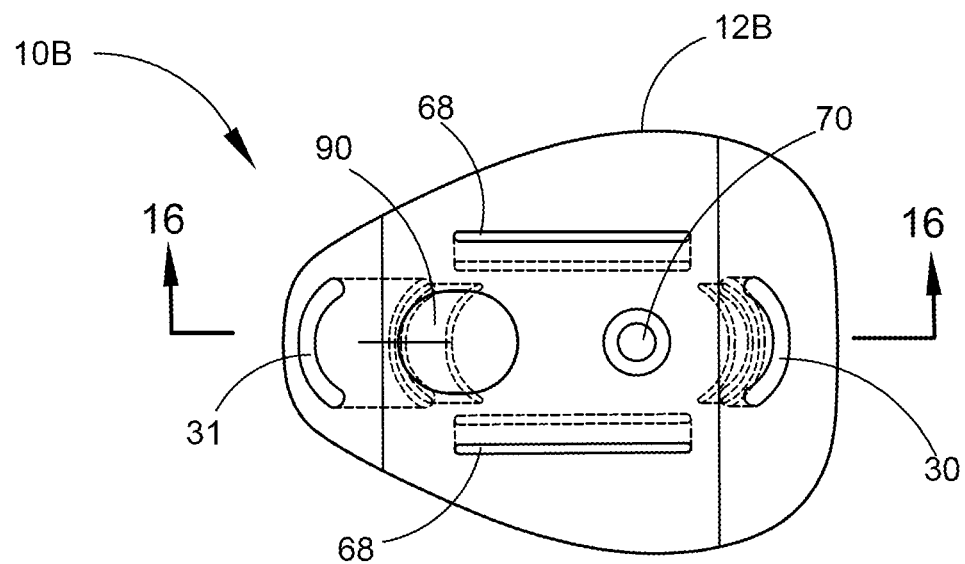
FIG. 15
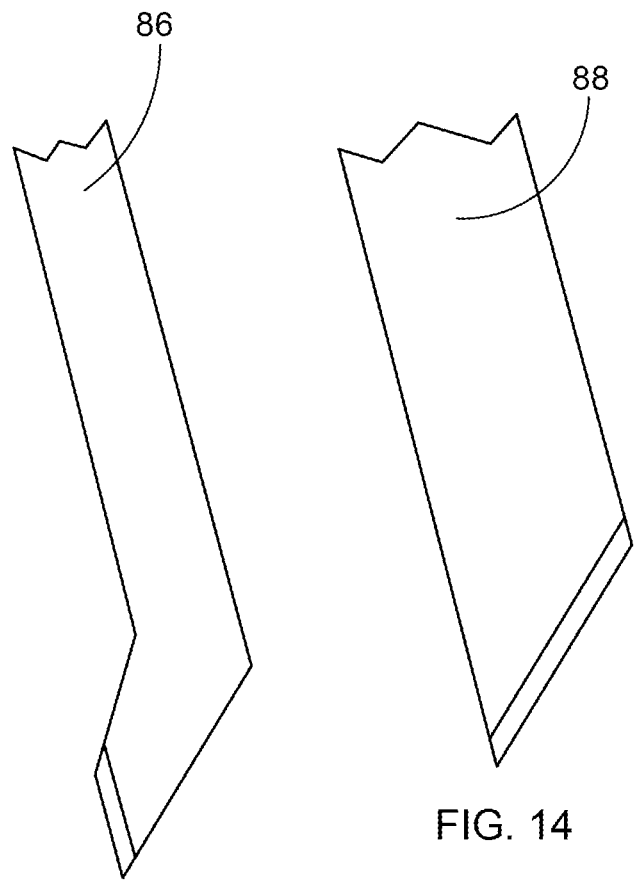
FIG. 14
FIG. 13

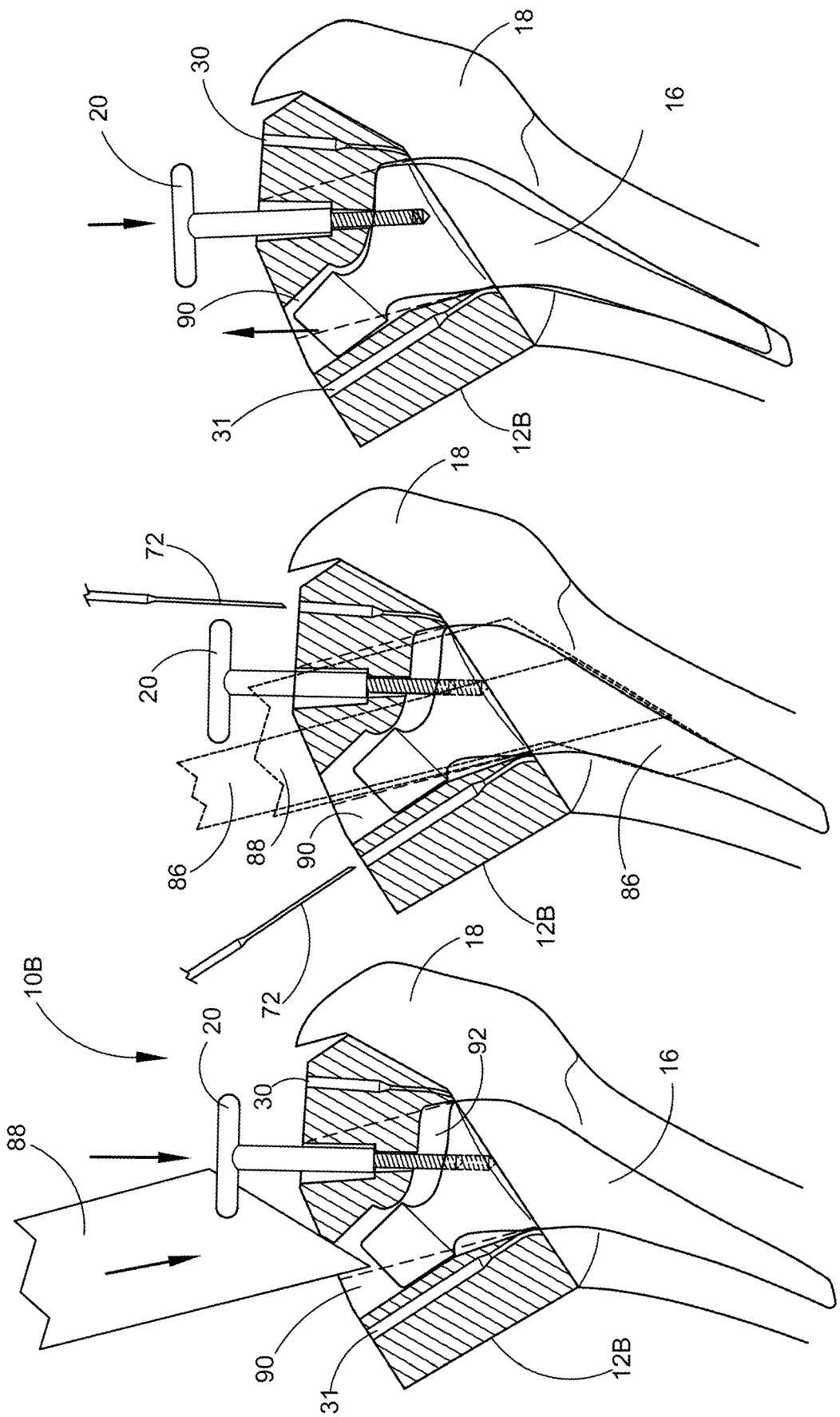

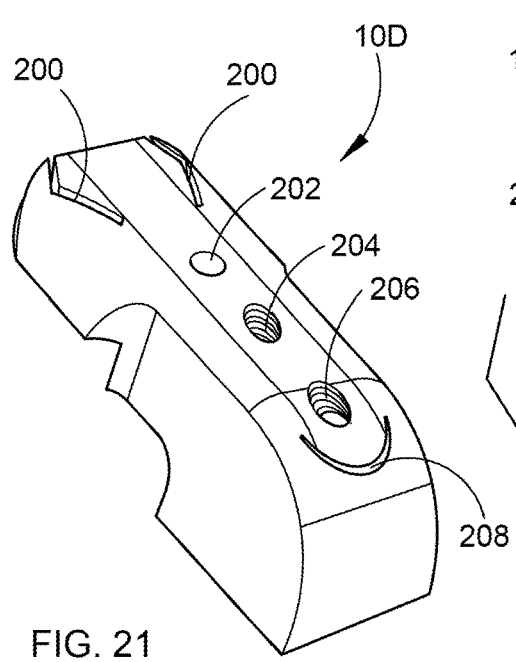
FIG. 21
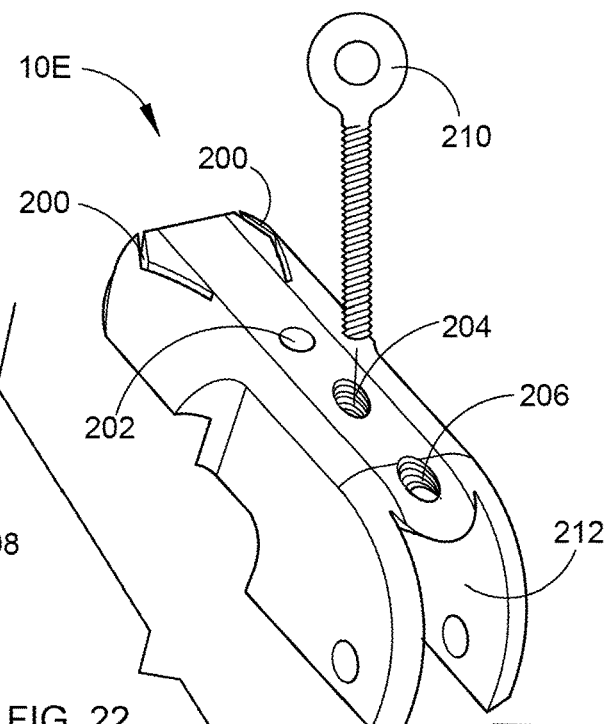
FIG. 22
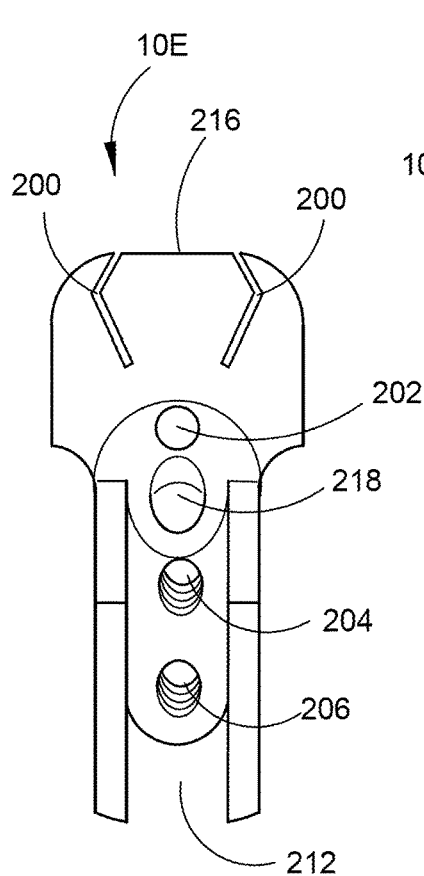
FIG. 23
FIG. 24
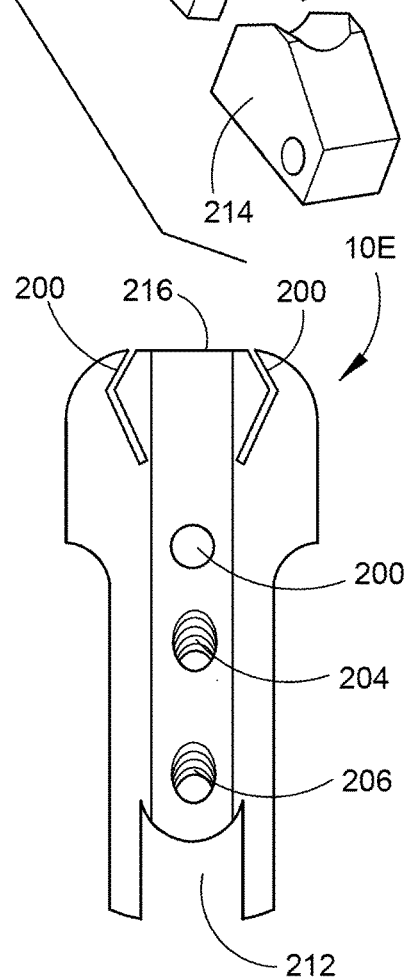
FIG. 25

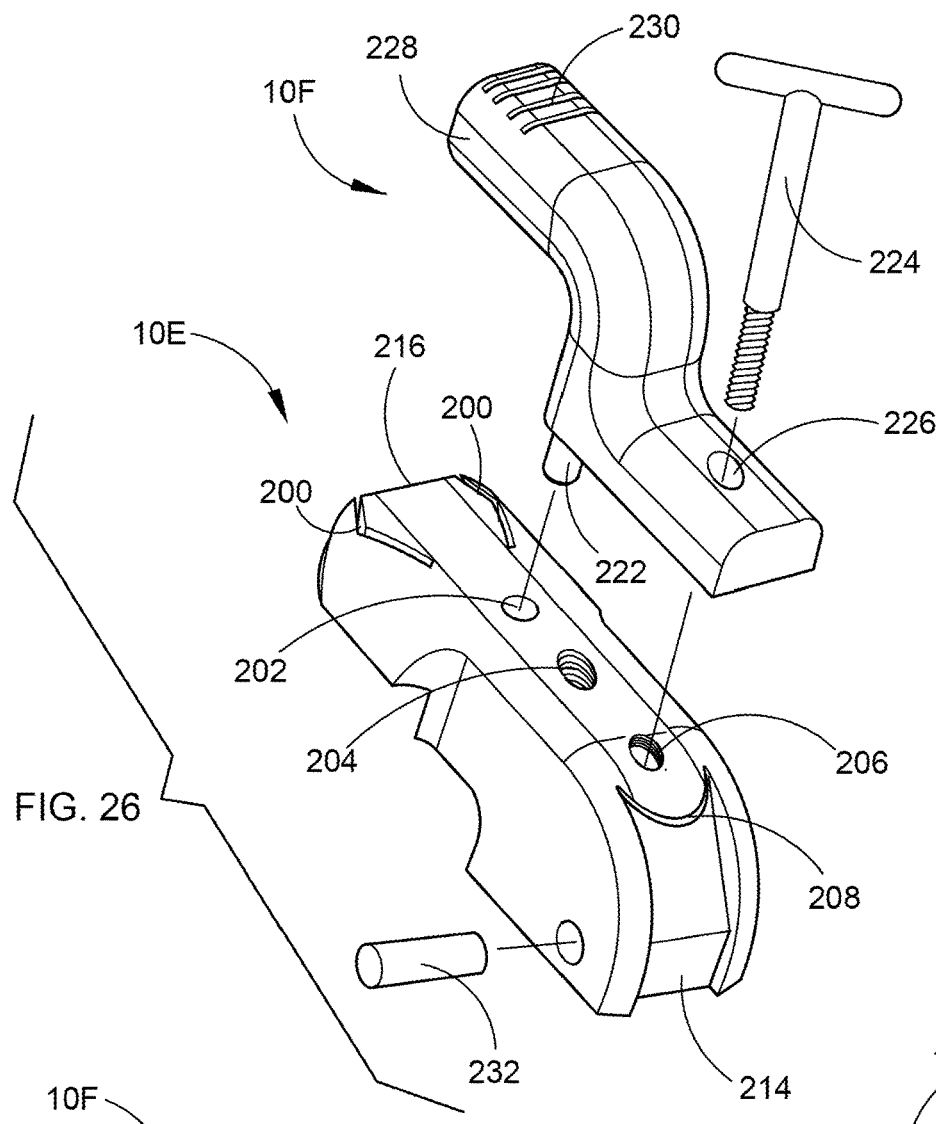
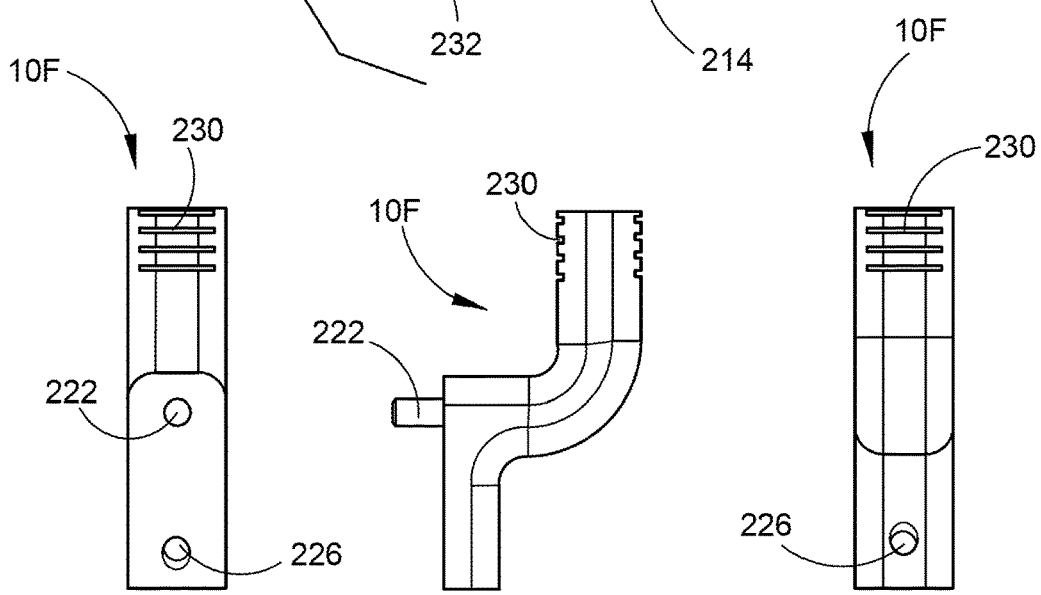
FIG. 27  FIG. 28  FIG. 29

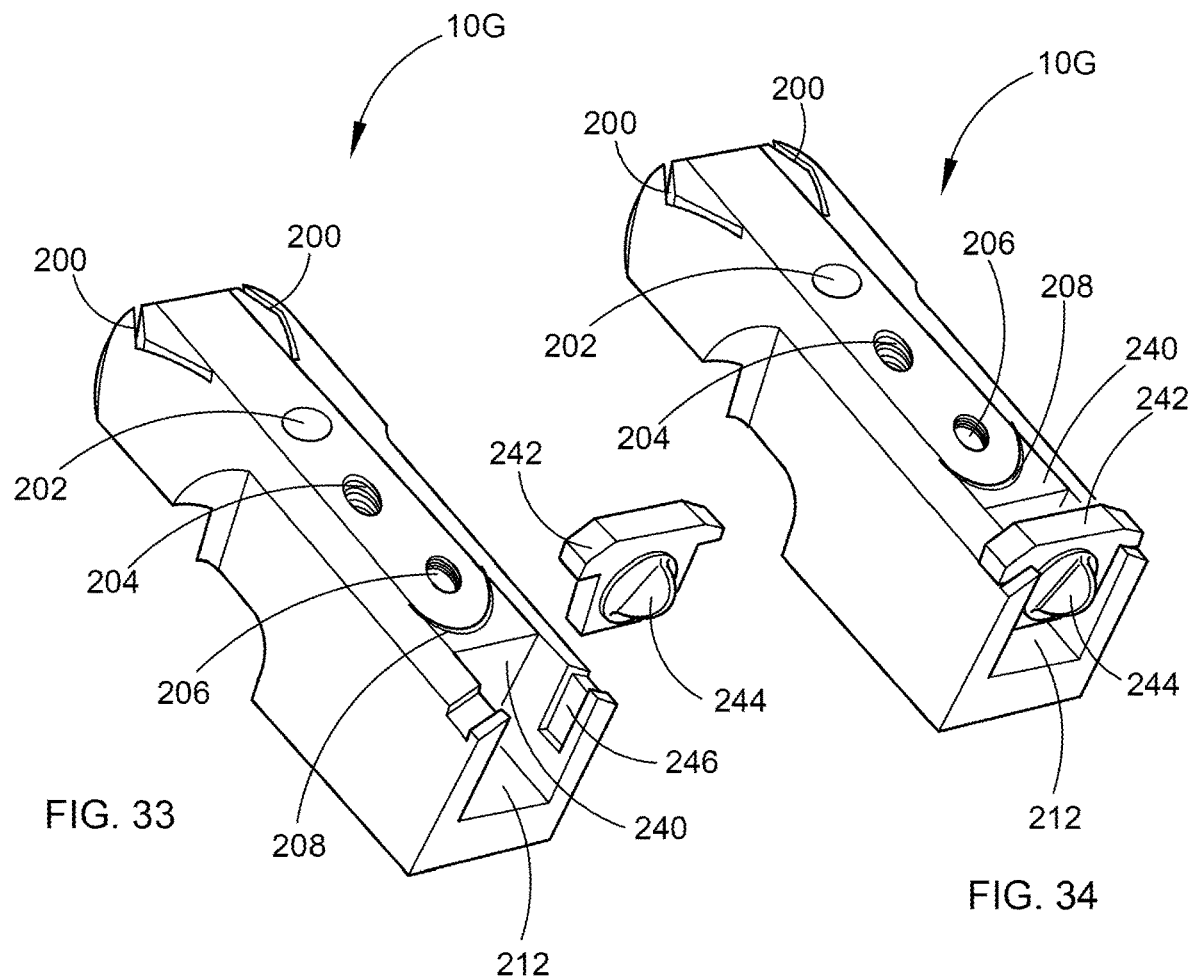
FIG. 33
FIG. 34
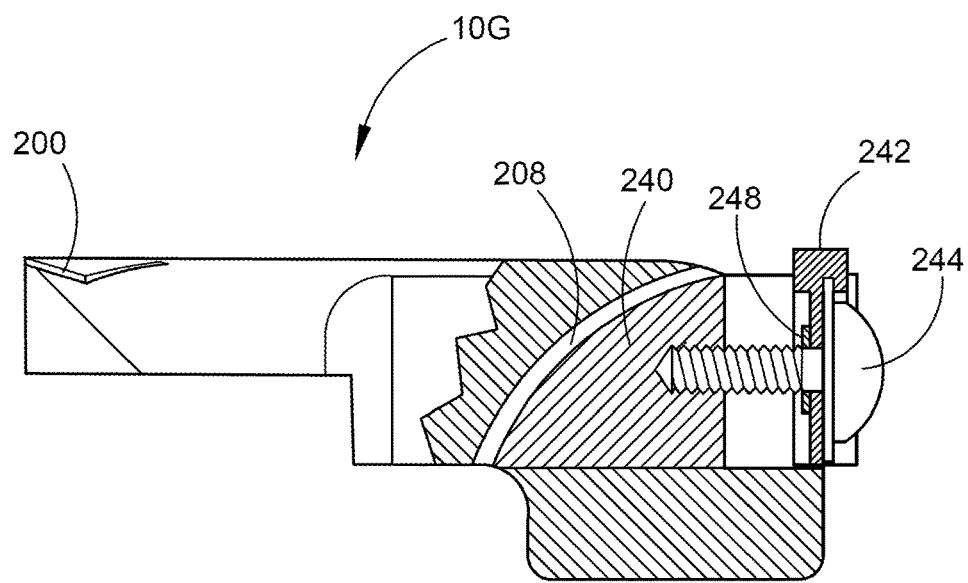
FIG. 35

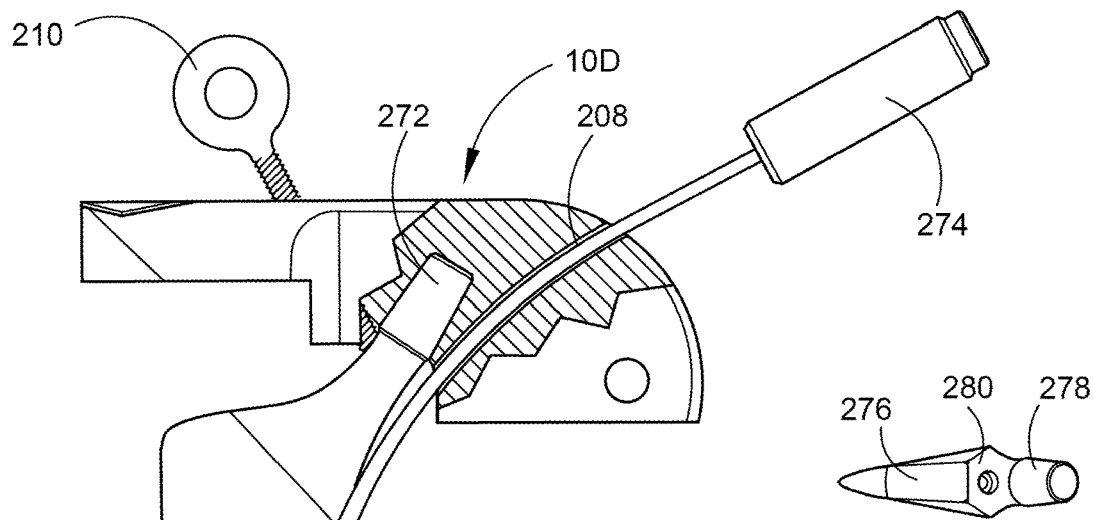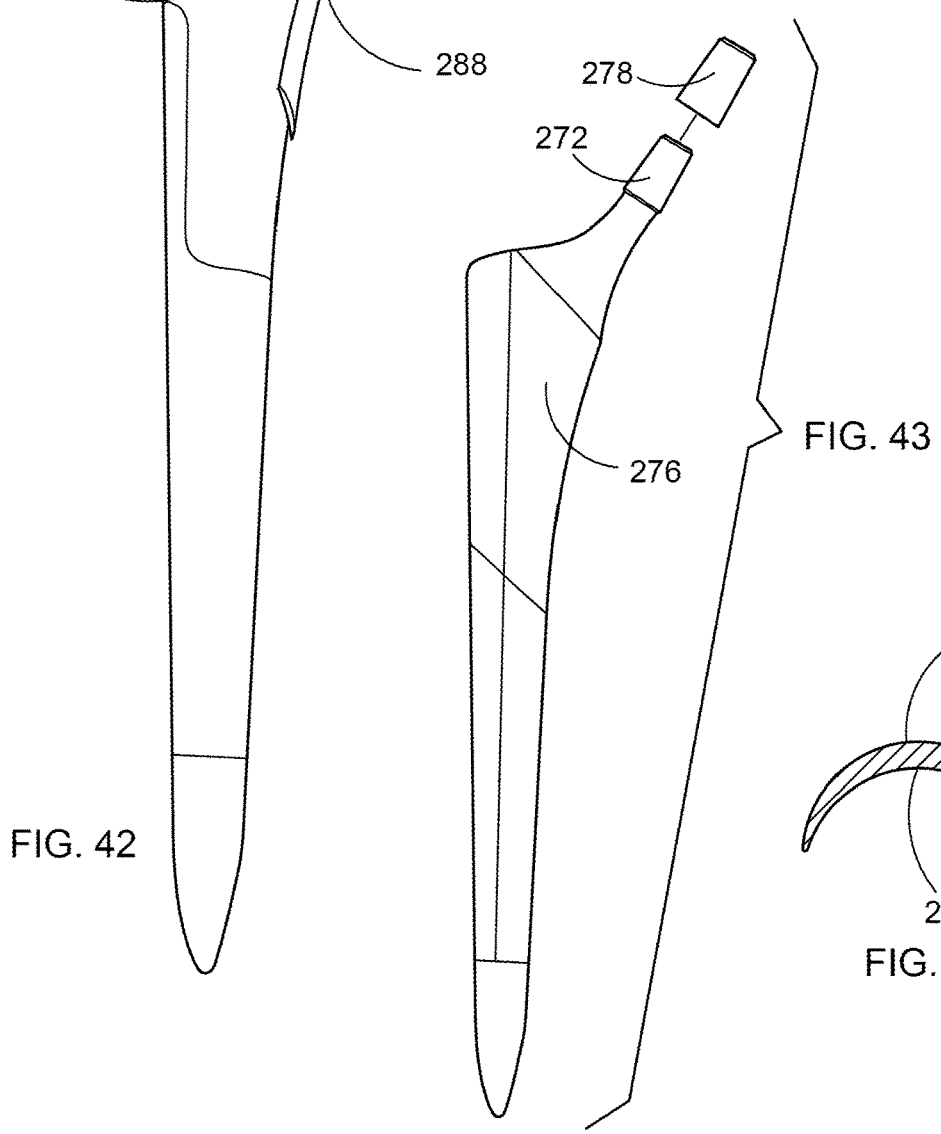
FIG. 42
FIG. 43
FIG. 44
FIG. 45

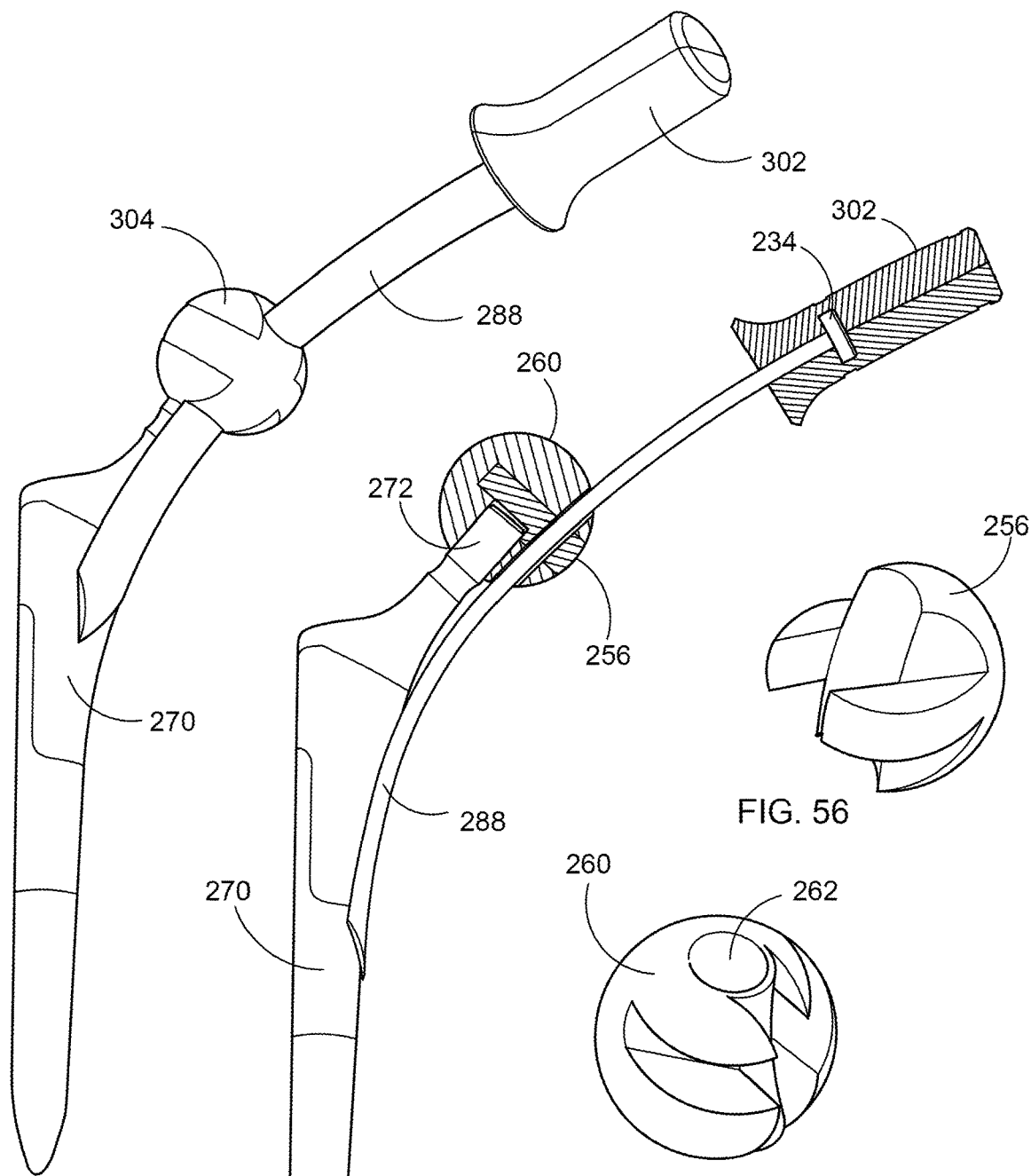
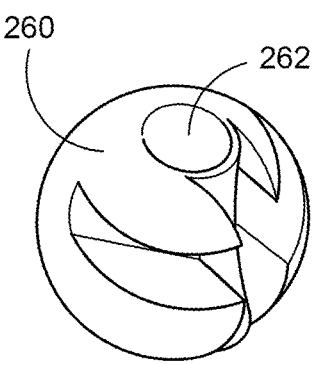
FIG. 54
FIG. 55
FIG. 56
FIG. 57
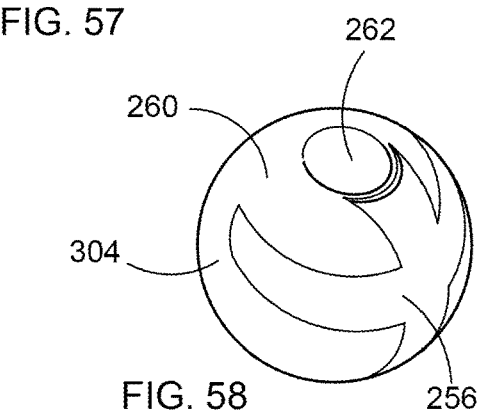
FIG. 58

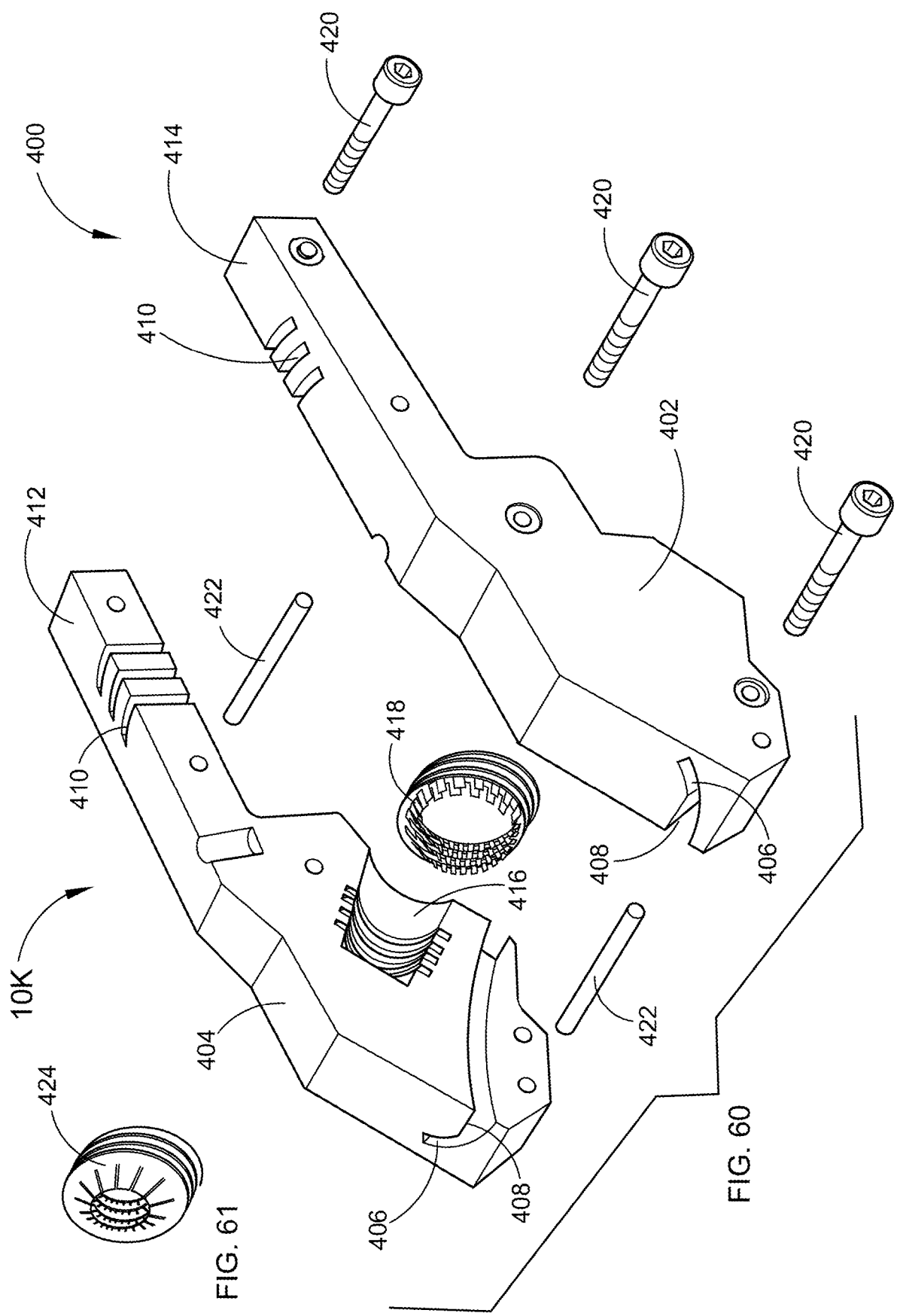

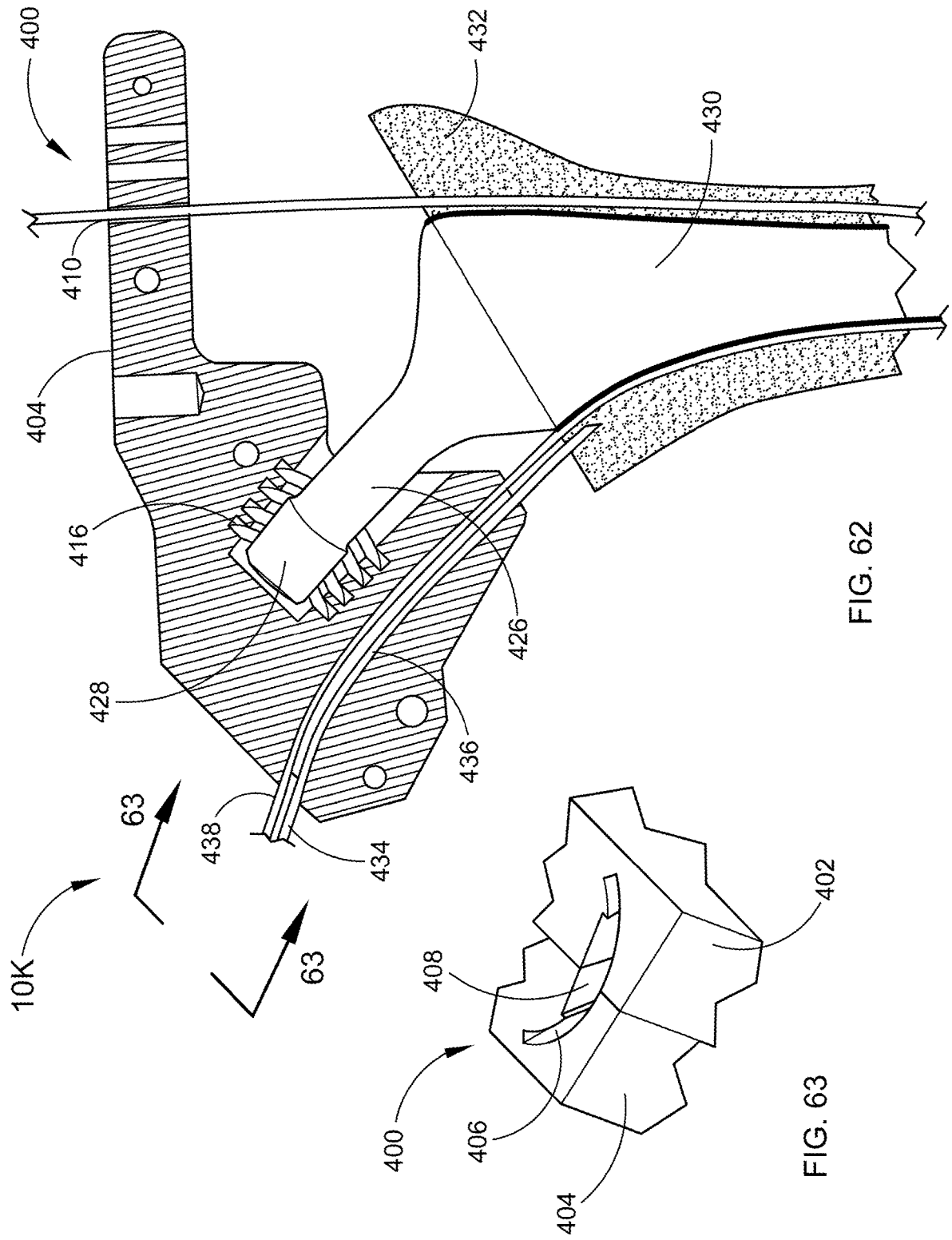

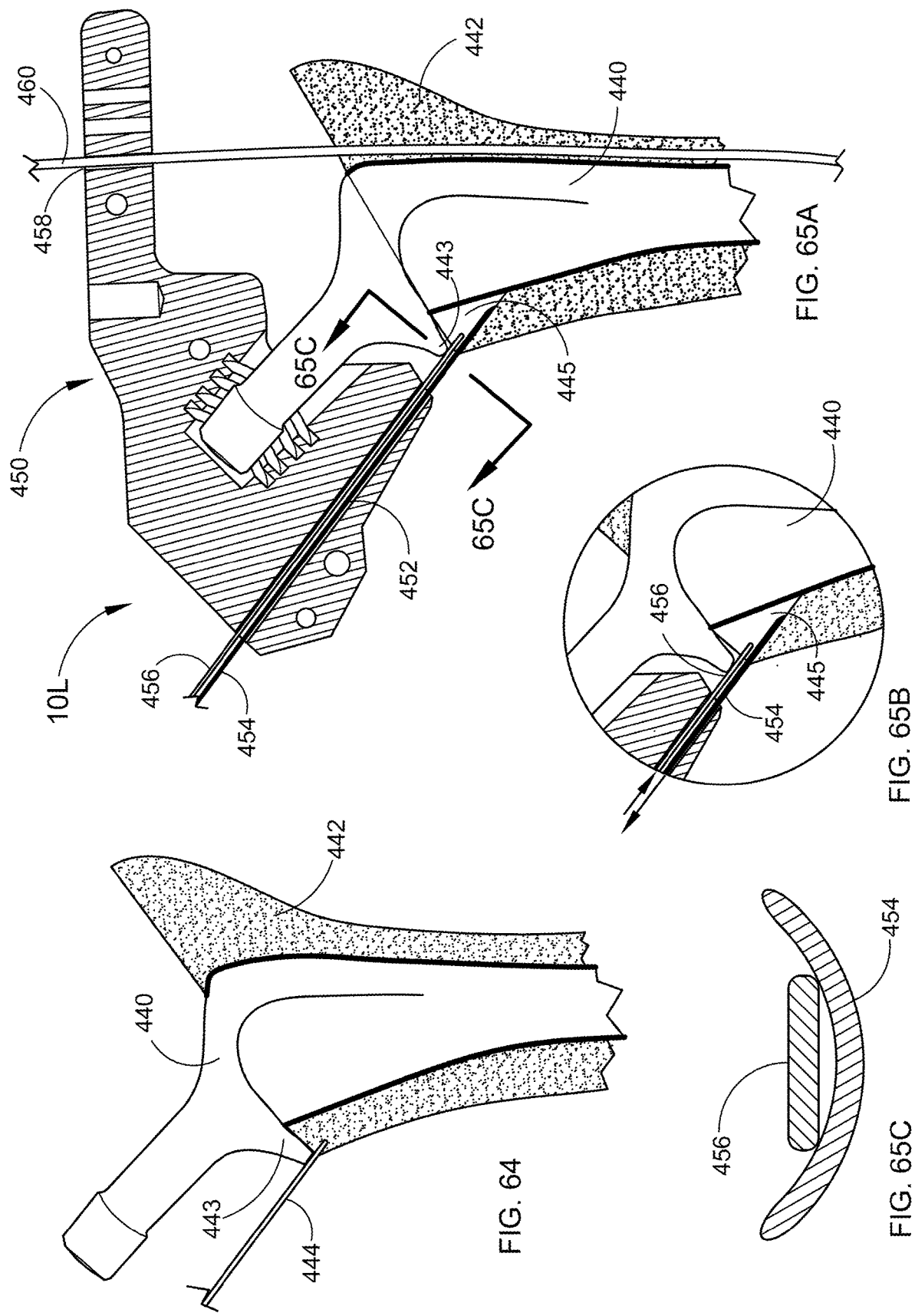

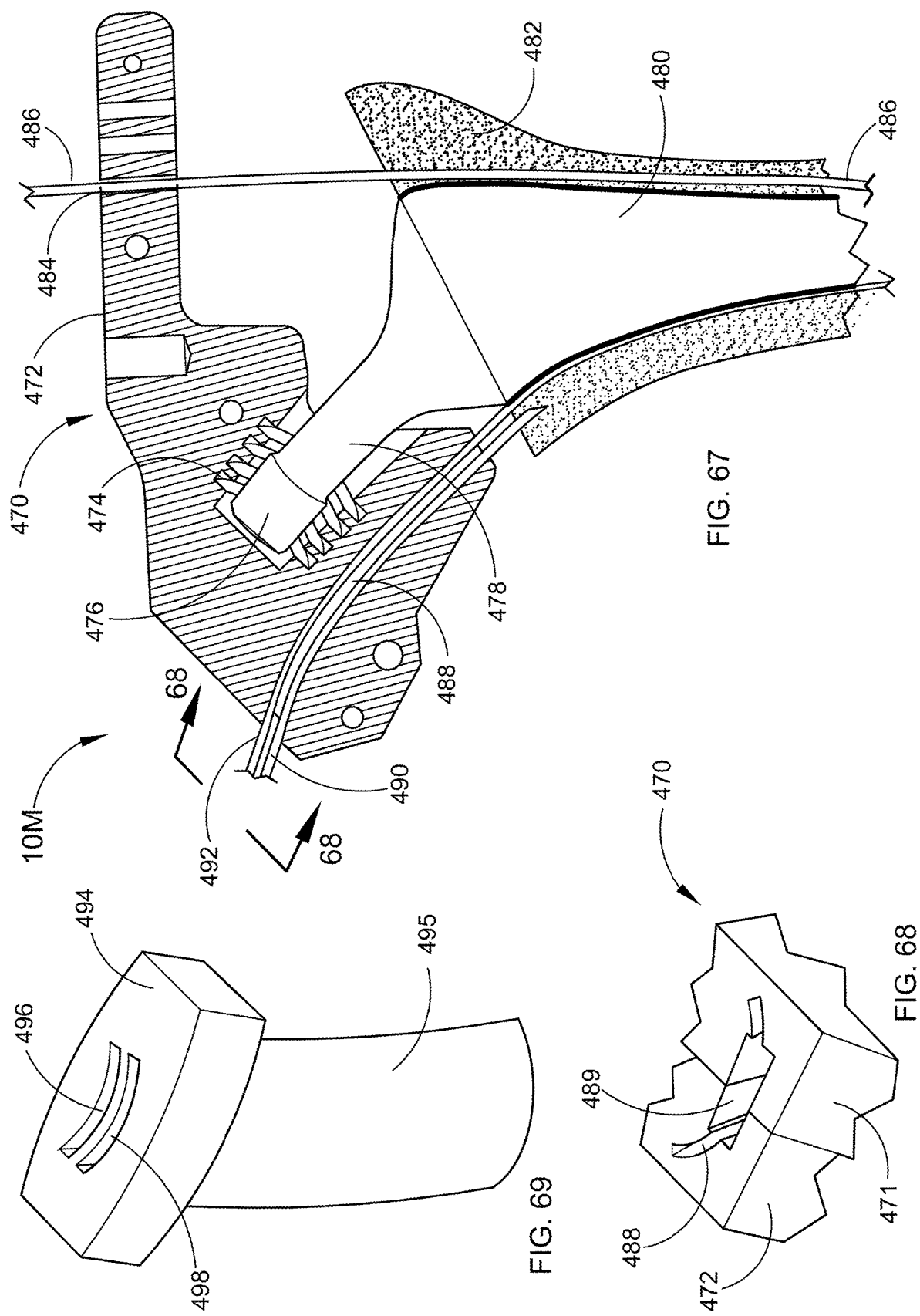

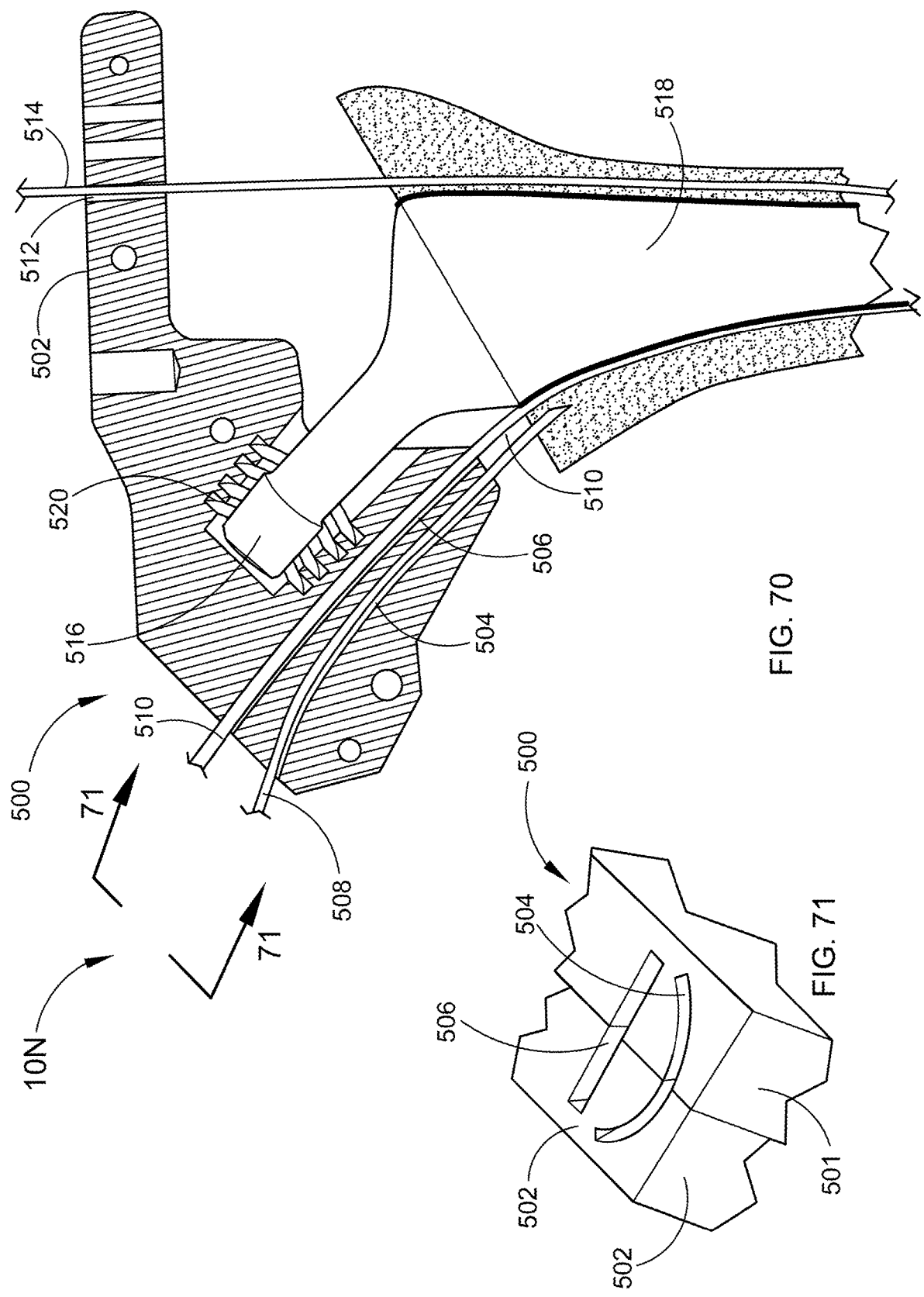

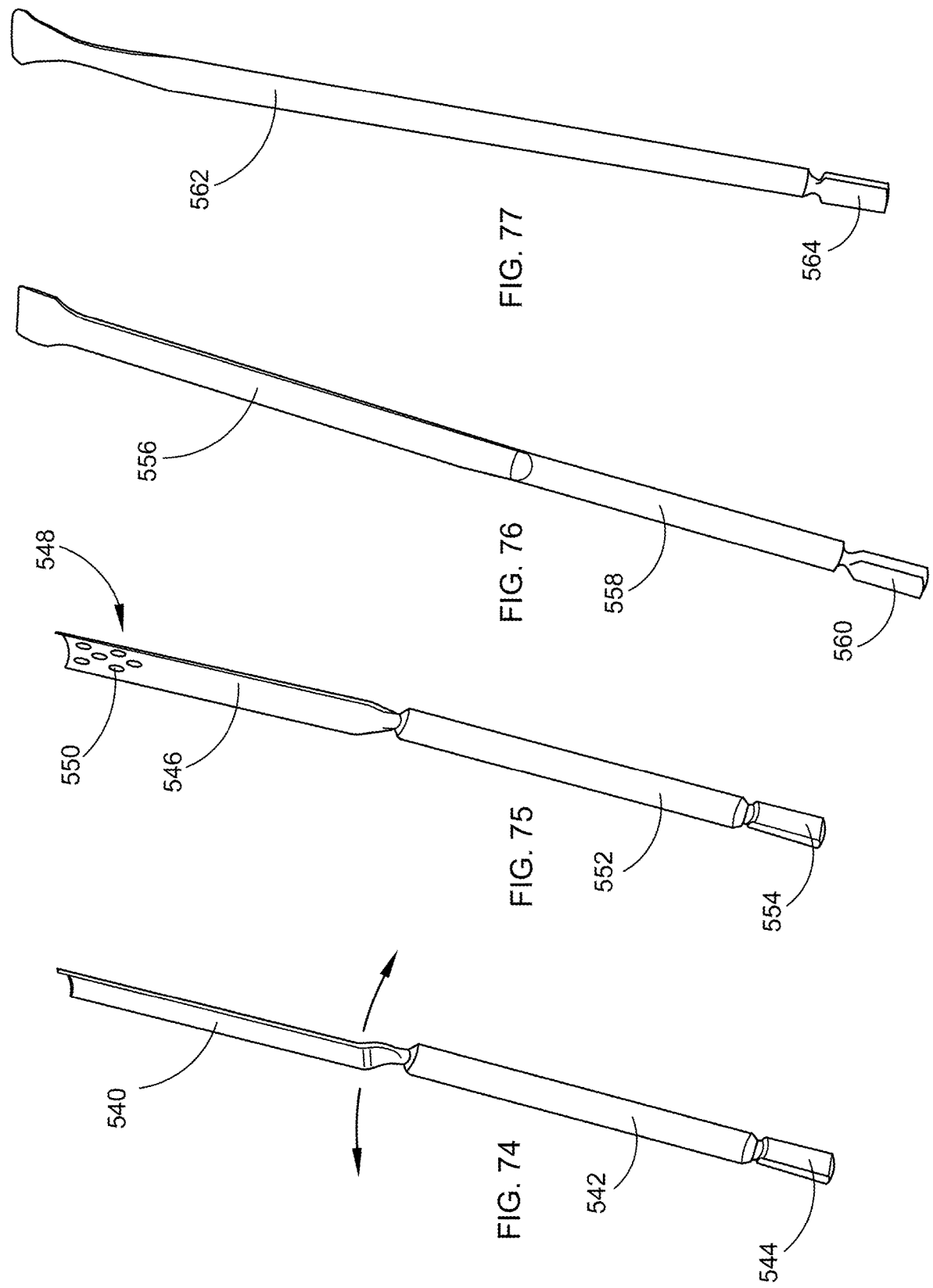

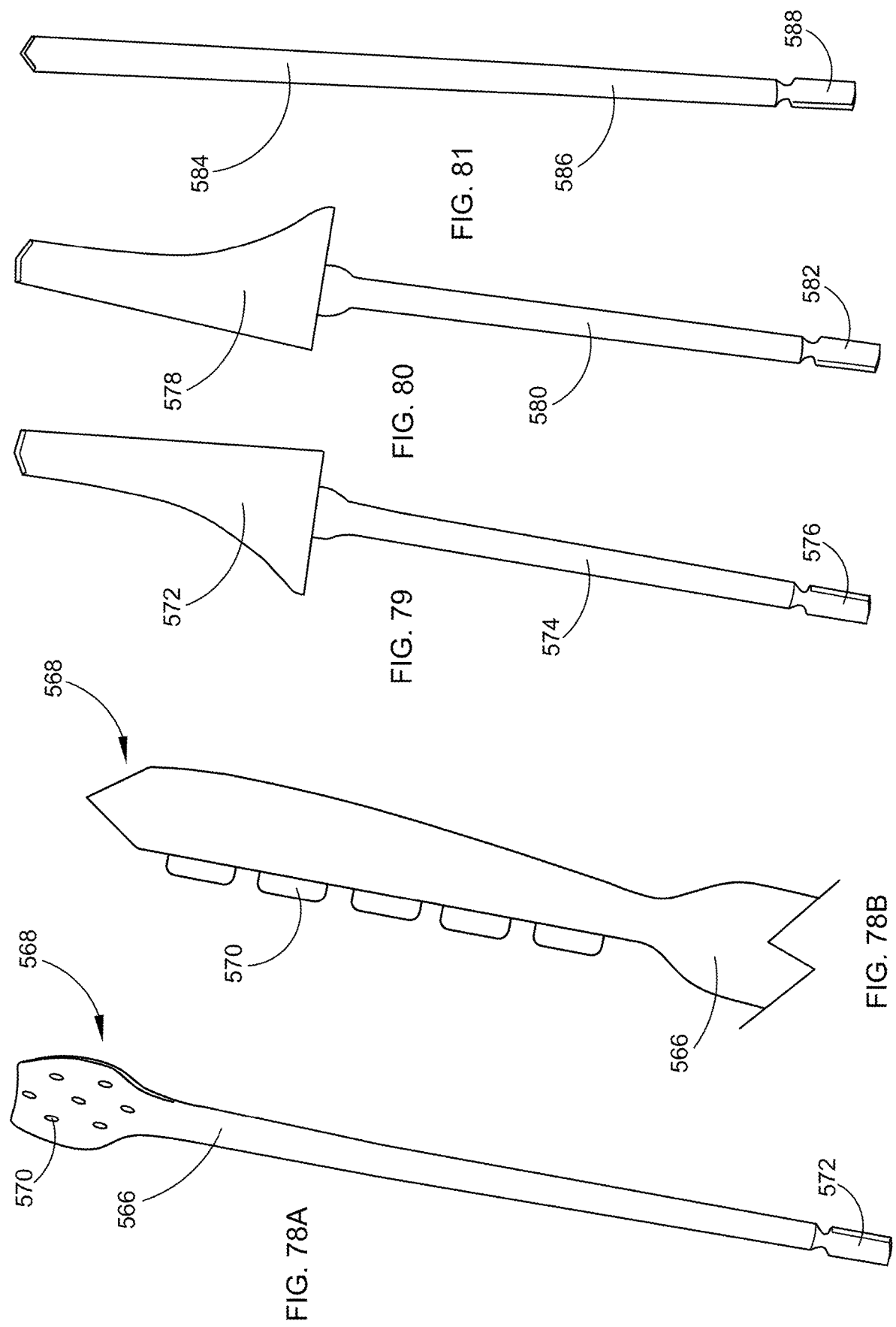

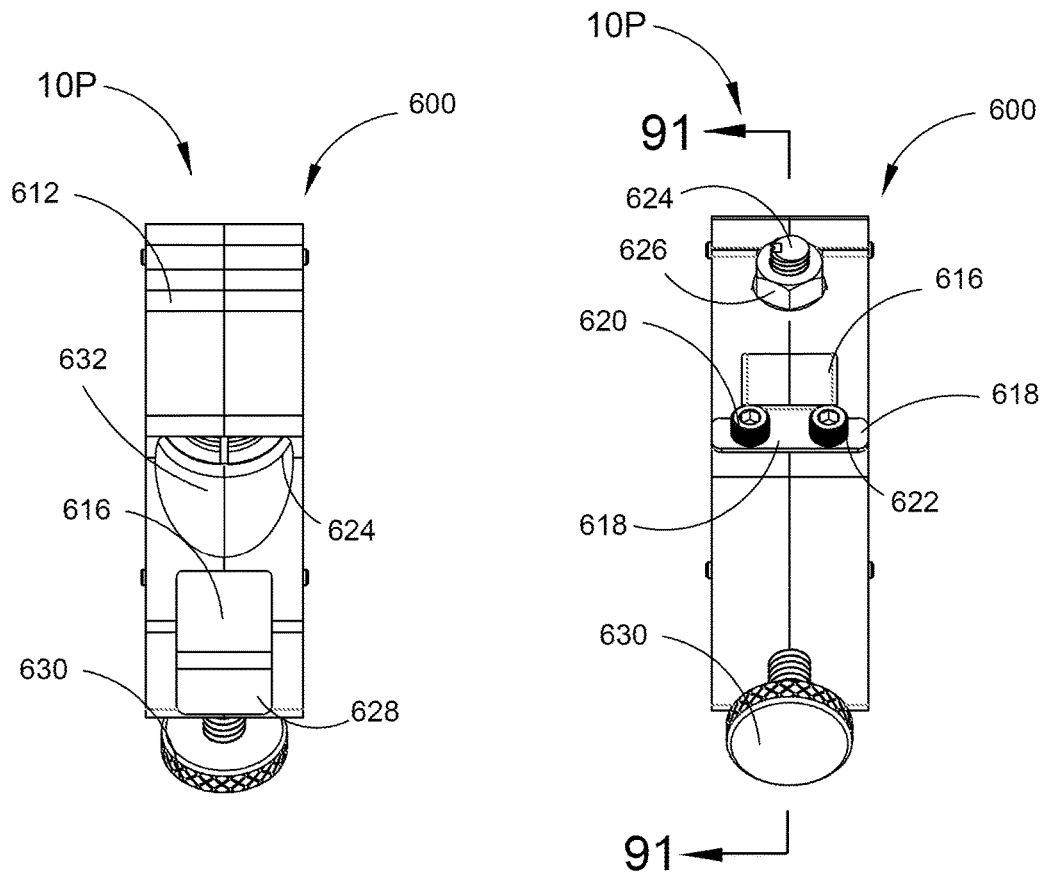
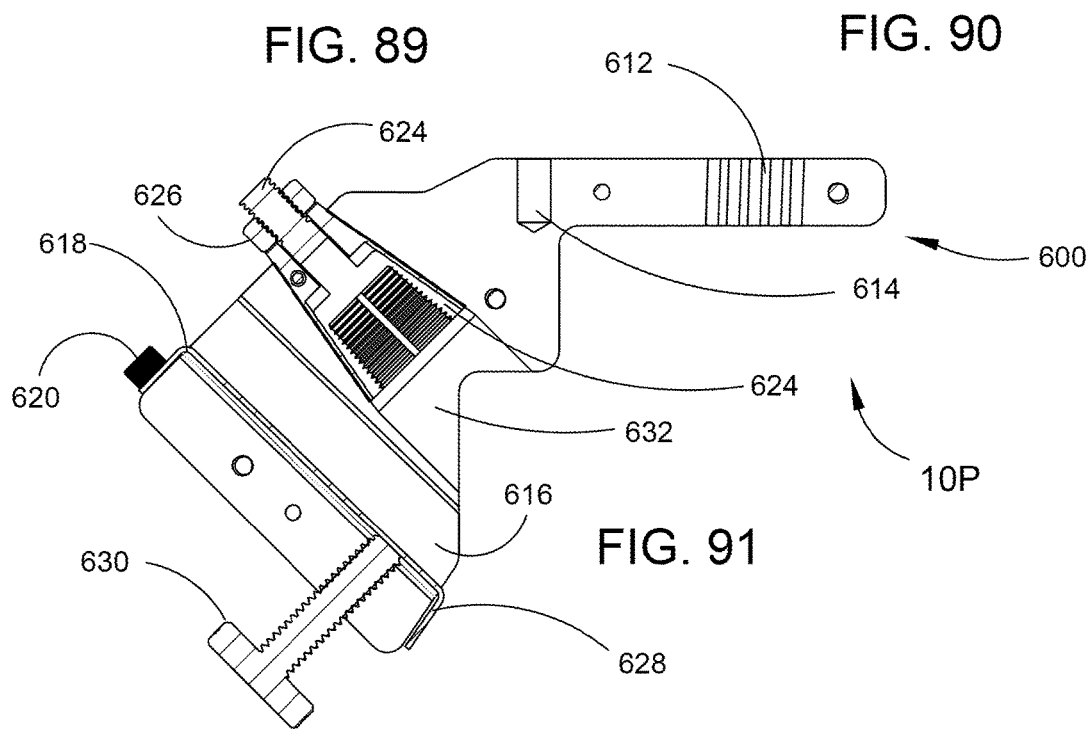

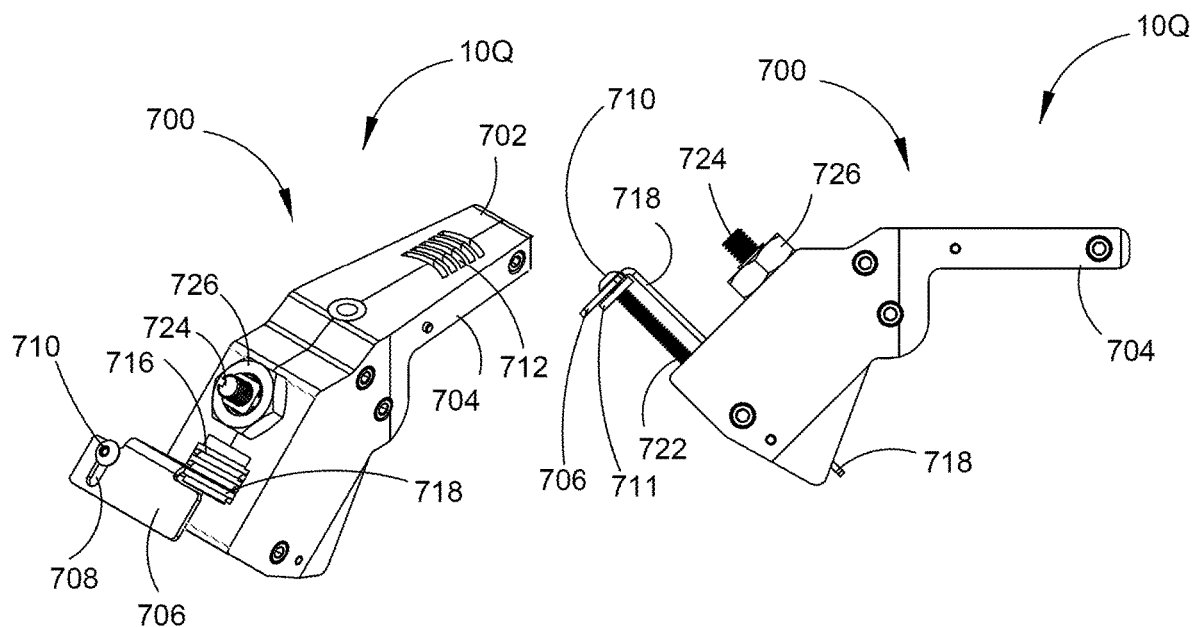
FIG. 112
FIG. 113
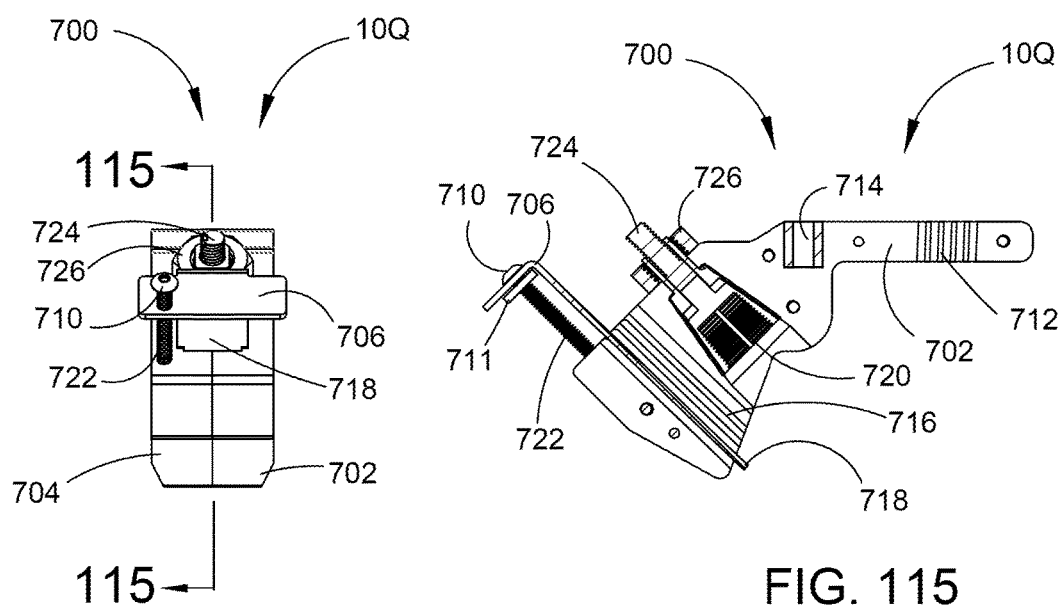
FIG. 114
FIG. 115

JOINT REVISION SURGERY APPARATUS

CROSS-REFERENCE TO RELATED APPLICATIONS

The present non-provisional patent application is a continuation-in-part of Applicant's patent application Ser. No. 17/542,636 filed on Dec. 6, 2021, which application is a continuation-in-part of Applicant's patent application Ser. No. 17/218,000 filed on Mar. 30, 2021, which application is a continuation-in-part of Ser. No. 16/398,564 filed on Apr. 30, 2019 and which application has matured into U.S. Pat. No. 11,116,525 issued on Sep. 14, 2021, which claims the benefit of U.S. provisional patent application Ser. No. 62/665,894 filed on May 2, 2018.

FIELD OF THE INVENTION

This application relates to a surgical apparatus used on joint replacement revision surgery in the areas of the hip joint, shoulder joint and knee joint. More particularly, the present application is directed to a Joint Revision Surgery Apparatus includes a surgical knife blade guide block which has a plurality of rearward blade guide slots, a central cavity and a plurality of guide slots having a two-way adjustable L-shaped guide plate. The blade guide block central cavity is positioned over the trunnion end of the existing prosthesis to be removed and secured to the prothesis. Straight, curved and compound curved knife blades are guided by the blade guide slots to cut the prothesis free. The securing of the guide blade block support apparatus against the femur is accomplished by the means of a T-handle screw or eyebolt threading into one of the threaded orifice in the blade guide block frame. The guide blocks in varying sizes and configurations, straight and curved knifes blades and related accessories may be sold as a complete kit. The Joint Revision Surgery Apparatus facilitates rapid, efficient and complete removal of an existing prosthesis during joint revision surgery.

BACKGROUND OF THE INVENTION

There is growing need to provide a new and refined method of performing delicate surgical operations including hip, shoulder and knee revisions. The similarity in these operations is that the implants have to be inserted into a major bone in the area and when there is a problem with them the prostheses has to be removed.

As with any other mechanical device, a total hip replacement can be subject to various forms of mechanical or biological failure. Such a failure may require a revision of the hip replacement to address the cause of failure and its consequences. A revision of a total hip replacement sometimes requires removal of the femoral implant.

The revision hip implant is comprised of four parts that work together to restore the original function of the ball-and-socket joint, namely, (1) A metal hip stem that is inserted into the top of the thighbone; (2) A metal cup which holds the cup liner; (3) A cup liner which holds the femoral head; and (4) The femoral head or ball which is attached to the top of the hip stem and is inserted into the cup liner to form the ball-and-socket joint.

The wearing down of the plastic component has an unfortunate side effect. The tiny plastic particles that wear off are attacked by your body's immune system, and this immune response also attacks the healthy bone around your implant. This leads to a condition called osteolysis, in which the bone in the area around the joint implant softens as it is absorbed by the body, thus making the implant unstable and in need of revision.

If the bone next to the primary implant is fractured in an accident, revision surgery may be required in order to provide a safe, stable joint. In this case, the original implant may need to be removed, the fracture addressed and a revision joint implanted.

In a low percentage of cases, the hip may become infected after surgery. Although it may be successfully treated with antibiotics, there are severe cases where a follow-up revision surgery may be required.

Hip revision operations are performed relatively infrequently. In the United States, there are approximately 18 revision hip replacements performed for every 100 hip replacements. The most common reasons for revision are: (1) Repetitive (recurrent) dislocation of a hip replacement; (2) Mechanical failure (implant wear and tear—loosening or breakage); and (3) Infection.

Numerous innovations for Joint Revision Surgery Apparatus have been provided in the prior art described as follows. Even though these innovations may be suitable for the specific individual purposes to which they address, they differ from the present Joint Revision Surgery Apparatus as hereinafter contrasted. The following is a summary of those prior art patents most relevant to the Joint Revision Surgery Apparatus at hand, as well as a description outlining the difference between the features of the present application and those of the prior art.

U.S. Pat. No. 9,138,242 of Randell J. Lewis describes a femoral hip stem explant system that has an alignment body which is attached to two locations of a femoral bone and has several lockable collet type adjustment features to set the shaft of a reamer or end mill exactly in coincidence with the femoral bone cavity axis. The shaft of the end mill or reamer is supported by a sleeve member, which is inserted into a drill guide central aperture. The drill guide aperture is adjusted first and locked to be in line with the femoral bone cavity. Each of the sleeve members has the same mating outer diameter, which fits into the drill guide central aperture. Accordingly, the sleeve members can be interchanged into the drill guide aperture with shafts of differently sized reamers or end mills.

This patent describes a femoral hip stem explant or revision system that has an alignment body which is attached to two locations of a femoral bone and has several lockable collet type adjustment features to set the shaft of a reamer or end mill exactly in coincidence with the femoral bone cavity axis. This patent describes a very invasive surgery to attach at two locations of a femoral bone where the Joint Revision Surgery Apparatus works from the top of the femur only and leaves the most proximal portion in fairly good shape.

U.S. Pat. No. 6,740,092 of Alan Lombardo et al. describes IM revision tools include reamers with depth markings or stops, an impactor-extractor with a coupling for attaching to tools which are inserted into and removed from the IM canal, a resection guide tower to which a cutting block is attached and which includes a notch which serves as both a witness mark and a holder for a femoral collar, a reversible clean-up cutting block with a quick-connect clamp attachable to the guide tower for resecting the distal femur, a selection of spacer blocks for measuring the space between the femur to determine the size of the components to be installed, a multiple cut cutting guide for preparing the femur, a set of 5 and 10 mm trial wedges, a trial stem valgus adapter, femoral sizing indicators which include indications of anterior/posterior offset, a stabilizer box cutting template which is attachable to the multiple cut cutting guide, and anterior/posterior offset adapters for attaching the femoral component to the IM stem.

This patent describes IM revision tools that include reamers with depth markings or stops, an impactor-extractor with a coupling for attaching to tools which are inserted into and removed from the IM canal, a resection guide tower to which a cutting block is attached. This patent describes a number of tools for positioning and alignment where the Joint Revision Surgery Apparatus uses the trunnion and the sides of the existing prostheses and the proximal portion of the femur for support and alignment of the process.

U.S. Pat. No. 6,258,095 of Alan Lombardo et al. describes IM revision tools include reamers with depth markings or stops, an impactor-extractor with a coupling for attaching to tools which are inserted into and removed from the IM canal, a resection guide tower to which a cutting block is attached and which includes a notch which serves as both a witness mark and a holder for a femoral or tibial collar, a reversible clean-up cutting block with a quick-connect clamp attachable to the guide tower for resecting the distal femur and separate left and right clean-up cutting blocks for resecting the proximal tibia, a selection of spacer blocks for measuring the space between the tibia and femur to determine the size of the components to be installed, a multiple cut cutting guide for preparing the femur, a set of 5 and 10 mm trial wedges, a trial stem valgus adapter, femoral sizing indicators which include indications of anterior/posterior offset, a stabilizer box cutting template which is attachable to the multiple cut cutting guide, and anterior/posterior offset adapters for attaching the femoral component to the IM stem. The tools according to the invention are modular and can also be used in primary knee arthroplasty without IM fixation. The methods of the invention provide accurate location of bone cuts so that the revision prosthetic is correctly oriented relative the IM canal and the bone cuts.

This is another patent that describes a number of tools for positioning and alignment where the Joint Revision Surgery Apparatus uses the trunnion and the sides of the existing prostheses and the proximal portion of the femur for support and alignment of the process.

US Patent Application Publication No. 2014/0371750 of Greg Klein et al. describes an apparatus for removal of a femoral implant that may include a handle portion and a cutting blade opposite the handle portion. The cutting blade may include a cutting edge, wherein the cutting edge includes a non-linear shape to substantially match at least a portion of a profile of the femoral implant to be removed.

This patent describes an apparatus for removal of a femoral implant that may include a handle portion and a cutting blade opposite the handle portion but does not describe the unique features of the Joint Revision Surgery Apparatus.

U.S. Pat. No. 9,282,981 of Rebecca L. Chaney describes a number of orthopedic surgical instruments for use in a surgical procedure to prepare a patient's femur to receive an orthopedic prosthesis are disclosed. The tools include guide tools, cutting tools, surgical blocks, and other orthopedic surgical instruments configured to plan and guide the preparation of the patient's femur.

This patent describes a number of orthopedic surgical instruments for use in a surgical procedure to prepare a patient's femur to receive an orthopedic prosthesis but does not describe unique features of the Joint Revision Surgery Apparatus.

None of the foregoing prior art teaches or suggests the particular unique features of the Joint Revision Surgery Apparatus and thus clarifies the need for further improvements in the devices that can be used for these purposes.

In this respect, before explaining at least one embodiment of the Joint Revision Surgery Apparatus detail, it is to be understood that the design is not limited in its application to the details of construction and to the arrangement of the components set forth in the following description or illustrated in the drawings. The Joint Revision Surgery Apparatuses disclosed herein are capable of other embodiments and of being practiced and carried out in various ways. Also, it is to be understood that the phraseology and terminology employed herein are for the purpose of description and should not be regarded as limiting.

SUMMARY OF THE INVENTION

The principle advantage of the of the Joint Revision Surgery Apparatus is to enable the performance of a significantly quicker, safer and more successful joint revision surgery procedure.

Another advantage of using the Joint Revision Surgery Apparatus is to have significantly less blood loss during the joint revision surgery procedure.

Another advantage of using the Joint Revision Surgery Apparatus is to have much shorter operating room use times during the joint revision surgery procedure.

Another advantage of using the Joint Revision Surgery Apparatus is to perform joint revision surgery with less instrumentation and tools, for example, cables and long stems during the procedure.

Another advantage of using the Joint Revision Surgery Apparatus is to have quicker times to have full weight bearing capability after joint revision surgery.

Another advantage of using the Joint Revision Surgery Apparatus is to have fewer complications during and after joint revision surgery.

Another advantage of using the Joint Revision Surgery Apparatus is to have less morbidity and mortality following joint revision surgery.

Another advantage of using the Joint Revision Surgery Apparatus is that it will accommodate the removal of collared femoral stems which are significantly more difficult to extract than non-collared femoral stems.

An advantage of the first alternate embodiment of the Joint Revision Surgery Apparatus is to have the internal elongated cavity allowing the upward movement of the existing prostheses.

Another advantage of using the first alternate embodiment of the Joint Revision Surgery Apparatus is by tightening the T handle screw, the existing prostheses can be moved upward.

Another advantage of using the first alternate embodiment of the Joint Revision Surgery Apparatus is by tightening the T handle screw to lift upwardly to extract the existing prostheses.

An advantage of the second alternate embodiment of the Joint Revision Surgery Apparatus is to have a simpler device to perform the joint revision surgery procedure.

The Joint Revision Surgery process entails the positioning of the support apparatus over the trunnion end of the existing prostheses within its internal cavity. The wide knife blades will initially be used to properly align the support apparatus with the side surfaces of the existing prostheses. The securing of the support apparatus down against the femur end is accomplished by the means of the T handle screw threading into the threaded orifice in of the existing prostheses.

Wide knife blades or shaped knife blades will be used to loosen both sides of the existing prostheses while narrow blades will be used around the tapered curved apertures and on the ends of the support apparatus. The distal end of one of the curved aperture has an internal curvature to guide the tapered knife blade along the curved front edge of the existing prostheses. The replaceable knives can be used in a pneumatic osteotome or tapped with a surgical hammer. Both the internally curved front edge and back edge of the existing prostheses may be flat or have a curved surface. The blades will be used with the sharp edge section toward the side surfaces of the existing prostheses to keep the knives from digging into or scraping the bone.

With respect to the above description then, it is to be realized that the optimum dimensional relationships for the parts of the Joint Revision Surgery Apparatus, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the Joint Revision Surgery Apparatus. Further, since numerous modifications and changes will readily occur to those skilled in the art, it is not desired to limit the Joint Revision Surgery Apparatus to the exact construction and operation shown and described, and accordingly, all suitable modifications and equivalents may be resorted to, falling within the scope of this application.

While the apparatus and method has or will be described for the sake of grammatical fluidity with functional explanations, it is to be expressly understood that the claims, unless expressly formulated under 35 USC 112, or similar applicable law, are not to be construed as necessarily limited in any way by the construction of "means" or "steps" limitations, but are to be accorded the frill scope of the meaning and equivalents of the definition provided by the claims under the judicial doctrine of equivalents, and in the case where the claims are expressly formulated under 35 USC 112 are to be accorded full statutory equivalents under 35 USC 112, or similar applicable law. The Joint Revision Surgery Apparatus can be better visualized by turning now to the following drawings wherein like elements are referenced by like numerals.

BRIEF DESCRIPTION OF THE DRAWINGS

The accompanying drawings, which are incorporated in and form a part of this specification, illustrate embodiments of the Joint Revision Surgery Apparatus and together with the description, serve to explain the principles of this application.

FIG. 1 depicts a cross section through the preferred embodiment of the support apparatus and tools used in performing the Joint Revision Surgery.

FIG. 2 depicts a side view of the hip replacement prostheses.

FIG. 3 depicts a narrow blade knife used in the Joint Revision Surgery.

FIG. 4 depicts a tapered blade knife used in the Joint Revision Surgery.

FIG. 5 depicts a wide blade knife used in the Joint Revision Surgery.

FIG. 6 depicts a side view of the T handle screw used in securing and removal of the existing prostheses.

FIG. 10 depicts an end view of the preferred embodiment of the support apparatus.

FIG. 11 depicts a side view cross section of the preferred embodiment of the support apparatus.

FIG. 12 depicts atop view of the preferred embodiment of the support apparatus.

FIG. 13 depicts a side view of the angled blade knife.

FIG. 14 depicts a side view of the wide blade knife.

FIG. 15 depicts a top view of the first alternate embodiment of the support apparatus.

FIG. 16 depicts a cross section through the first alternate embodiment of the support apparatus with the T head screw attached to the existing hip prosthesis.

FIG. 17 depicts a cross section through the first alternate embodiment of the support apparatus with angled blade knife or the wide blade knife along the sides of the existing prostheses and curved knives on the ends.

FIG. 18 depicts a cross section through the first alternate embodiment of the support apparatus where the T handle screw is tightened to pull the existing hip prosthesis up from the femur.

FIG. 21 depicts a perspective view of the third alternate embodiment of the blade guide block.

FIG. 22 depicts a perspective view of the fourth alternate embodiment of the blade guide block.

FIG. 23 depicts a bottom view of the fourth alternate embodiment of the blade guide block.

FIG. 24 depicts a side view of the fourth alternate embodiment of the blade guide block.

FIG. 25 depicts a top view of the fourth alternate embodiment of the blade guide block.

FIG. 26 depicts a perspective view of the fourth alternate embodiment of the blade guide block and the attaching secondary blade guide block.

FIG. 27 depicts the bottom view of the secondary blade guide block.

FIG. 28 depicts the side view of the secondary blade guide block.

FIG. 29 depicts the top view of the secondary blade guide block.

FIG. 33 depicts a perspective view of the fifth alternate embodiment of the blade guide block with the adjustable insert and the adjusting mechanism raised up.

FIG. 34 depicts a perspective view of the fifth alternate embodiment of the blade guide block with the adjustable insert and the adjusting mechanism in position.

FIG. 35 depicts a side cut-away view of the fifth alternate embodiment of the blade guide block with the adjustable insert and the adjusting mechanism.

FIG. 42 depicts a side view of a prostheses attached to a cut-away third alternate embodiment of the blade guide block illustrating a thin curved blade with handle in position with the eye bolt secured against the prostheses trunnion.

FIG. 43 depicts a side view of a large prosthesis.

FIG. 44 depicts a side view of a small prostheses with a trunnion adapter extended away from it.

FIG. 45 depicts a top view of the small prostheses illustrating the semi-hexagonal shape.

FIG. 54 depicts a perspective view of a typical prosthesis with a two part blade guide ball and a two part handle.

FIG. 55 depicts side view of a typical prosthesis with a two part blade guide ball and a two part handle with the metal end cap enclosed.

FIG. 56 depicts a perspective view of the insert section of the two part blade guide ball.

FIG. 57 depicts a perspective view of the base section of the two part blade guide ball.

FIG. 58 depicts a perspective view of the two part blade guide ball.

FIG. 60 depicts an exploded top and side perspective view of a surgical knife blade guide block illustrating the two-piece construction, surgical knife blade slots and the locking rings within a locking ring cavity capable of accepting a prothesis stem trunnion and securing it for an extraction operation.

FIG. 61 depicts an alternate embodiment of the locking rings capable of accepting a prothesis stem trunnion and securing it for an extraction operation.

FIG. 62 depicts a cross-sectional view of the surgical knife blade guide block having a single channel front slot and multiple rear slots, illustrating the position of the surgical knife blade slots and the locking ring cavity accepting a prothesis stem trunnion of a stem cemented in place within a patient's femur.

FIG. 63 depicts a front and top partial perspective view of the surgical knife blade block shown in FIG. 62 illustrating the shape of the single channel front surgical knife blade slot therein.

FIG. 64 depicts femoral stem extraction Step 1 wherein a cross sectional view of a stem within a femur wherein a Lambotte osteotome is beginning to remove a small triangle of bone therein.

FIG. 65A depicts femoral stem extraction Step 2 showing a cross-sectional view of the surgical knife blade guide block having a single channel front slot, illustrating the position of a rigid surgical knife blade and a flexible surgical knife blade within the single slot and passing the collar to enter the removed bone triangle within a patient's femur.

FIG. 65B depicts a partial magnification of FIG. 65A femoral stem extraction Step 2 showing greater detail of the movement and position of the surgical knife blades.

FIG. 65C depicts a cross-sectional view of FIG. 65A showing the curved rigid surgical knife blade below and guiding the flexible surgical knife blade above.

FIG. 67 depicts a cross-sectional view of the surgical knife blade guide block having a single channel front slot and multiple channel rear slots, illustrating the position of a rigid surgical knife blade and a flexible surgical knife blade extending downward within the single slot, and a surgical knife blade extending downward on the opposite side of the stein to be removed.

FIG. 68 depicts a front and top partial perspective view of the surgical knife blade block shown in FIG. 67 illustrating the shape of the single channel front surgical knife blade slot therein.

FIG. 69 depicts a top and side perspective view of a specialized surgical knife blade guide tool which when placed within the surgical knife blade slot is used to act as a rigid guide for the flexible surgical knife blade which may be extended in one of two surgical knife blade slots above or below the lower portion of the guide tool.

FIG. 70 depicts a cross-sectional view of the surgical knife blade guide block having a multiple channel front slot and multiple channel rear slots, illustrating the position of a rigid surgical knife blade and a flexible surgical knife blade extending downward within the multiple slots, and a surgical knife blade extending downward on the opposite side of the stem to be removed.

FIG. 71 depicts a front and top partial perspective view of the surgical knife blade block shown in FIG. 70 illustrating the shape of the multiple channel front surgical knife blade slots therein.

FIG. 74 depicts a rigid surgical knife blade for attachment to an osteotome to act to guide a flexible cutting blade.

FIG. 75 depicts another rigid surgical knife blade for attachment to an osteotome to act to guide a flexible cutting blade.

FIG. 76 depicts a flexible surgical knife blade for attachment to an osteotome used to cut through cement on the stem after being guided by the rigid guide surgical knife blade.

FIG. 77 depicts another flexible surgical knife blade for attachment to an osteotome used to cut through cement on the stem after being guided by the rigid guide surgical knife blade.

FIG. 78A depicts another flexible surgical knife blade for attachment to an osteotome having a plurality of protrusions on the cutting edge, used to cut through cement on the stem after being guided by the rigid guide surgical knife blade.

FIG. 78B depicts an enlarged partial side view of the flexible surgical knife blade shown in FIG. 78A, illustrating the plurality of protrusions on the cutting edge, used to cut through cement on the stem after being guided by the rigid guide surgical knife blade.

FIG. 79 depicts a side cutting blade for extending down the sides of a stem to be removed.

FIG. 80 depicts another side cutting blade for extending down the sides of a stem to be removed.

FIG. 81 depicts another flexible knife blade for attachment to an osteotome used to cut through cement on the stem after being guided by the rigid guide knife blade.

FIG. 89 depicts a rear perspective view of an assembled surgical knife blade guide block illustrating the position of a knurled knob threaded plate adjustment screw and the adjustment plate mounting screws.

FIG. 90 depicts a front perspective view of an assembled surgical knife blade guide block illustrating the position of a knurled knob threaded plate adjustment screw and the adjustment plate mounting screws.

FIG. 91 depicts a cross-sectional view of the surgical knife blade guide block illustrating the position of the knurled knob threaded plate adjustment screw, adjustment plate, and a stem trunnion securing piece within a central cavity, shown in FIG. 90.

FIG. 112 depicts a top, side elevational and perspective view of an alternate embodiment of the joint revision surgery apparatus illustrating an assembled knife blade guide block having an adjustable L-shaped knife blade guide plate fully retracted upwardly.

FIG. 113 depicts a side elevational view of an alternate embodiment of the joint revision surgery apparatus illustrating an assembled knife blade guide block having an adjustable L-shaped knife blade guide plate fully retracted upwardly.

FIG. 114 depicts a front view of an alternate embodiment of the joint revision surgery apparatus illustrating an assembled knife blade guide block having an adjustable L-shaped knife blade guide plate fully retracted upwardly.

FIG. 115 depicts a cross-sectional view of an alternate embodiment of the joint revision surgery apparatus illustrating an assembled knife blade guide block having an adjustable L-shaped knife blade guide plate fully retracted upwardly of FIG. 114.

FIG. 116 depicts a cross-sectional view of an alternate embodiment of the joint revision surgery apparatus illustrating an assembled knife blade guide block having an adjustable L-shaped knife blade guide plate fully extended downwardly and positioned in the middle knife blade guide slot within the guide block.

FIG. 117 depicts a cross-sectional view of an alternate embodiment of the joint revision surgery apparatus illustrating an assembled knife blade guide block having an adjustable L-shaped knife blade guide plate fully retracted upwardly and positioned in the middle knife blade guide slot within the guide block.

FIG. 118 depicts a cross-sectional view of an alternate embodiment of the joint revision surgery apparatus illustrating an assembled knife blade guide block having an adjustable L-shaped knife blade guide plate fully extended downwardly and positioned in the upper most knife blade guide slot within the guide block.

FIG. 119 depicts a cross-sectional view of an alternate embodiment of the joint revision surgery apparatus illustrating an assembled knife blade guide block having an adjustable L-shaped knife blade guide plate fully retracted upwardly and positioned in the upper most knife blade guide slot within the guide block.

FIG. 120 depicts an exploded view of the alternate embodiment of the joint revision surgery apparatus illustrating an assembled knife blade guide block having an adjustable L-shaped knife blade guide plate, illustrating the position of the knife blades before insertion into the forward and rearward knife blade guide slots within the guide block.

FIG. 121 depicts a cross-sectional view of the alternate embodiment of the joint revision surgery apparatus illustrating an assembled knife blade guide block having an adjustable L-shaped knife blade guide plate, showing the surgical knife blades inserted into the forward and rearward knife blade guide slots within the guide block, for removal of a non-collared implanted femoral stem.

FIG. 122 depicts a cross-sectional view of the alternate embodiment of the joint revision surgery apparatus illustrating an assembled knife blade guide block having an adjustable L-shaped knife blade guide plate, showing the surgical knife blades inserted into the forward and rearward knife blade guide slots within the guide block, for removal of a non-collared implanted femoral stem.

FIG. 123 depicts a cross-sectional view of the alternate embodiment of the joint revision surgery apparatus illustrating an assembled knife blade guide block having an adjustable L-shaped knife blade guide plate, showing the surgical knife blades inserted into the forward and rearward knife blade guide slots within the guide block, for removal of a non-collared implanted femoral stem.

FIG. 124 depicts a cross-sectional view of the alternate embodiment of the joint revision surgery apparatus illustrating an assembled knife blade guide block having an adjustable L-shaped knife blade guide plate, showing the surgical knife blades inserted into the forward and rearward knife blade guide slots within the guide block, for removal of a non-collared implanted femoral stem.

FIG. 125 depicts a cross-sectional view of the alternate embodiment of the joint revision surgery apparatus illustrating an assembled knife blade guide block having an adjustable L-shaped knife blade guide plate, showing the surgical knife blades inserted into the forward and rearward knife blade guide slots within the guide block, for removal of a non-collared implanted femoral stem.

Figure 126:
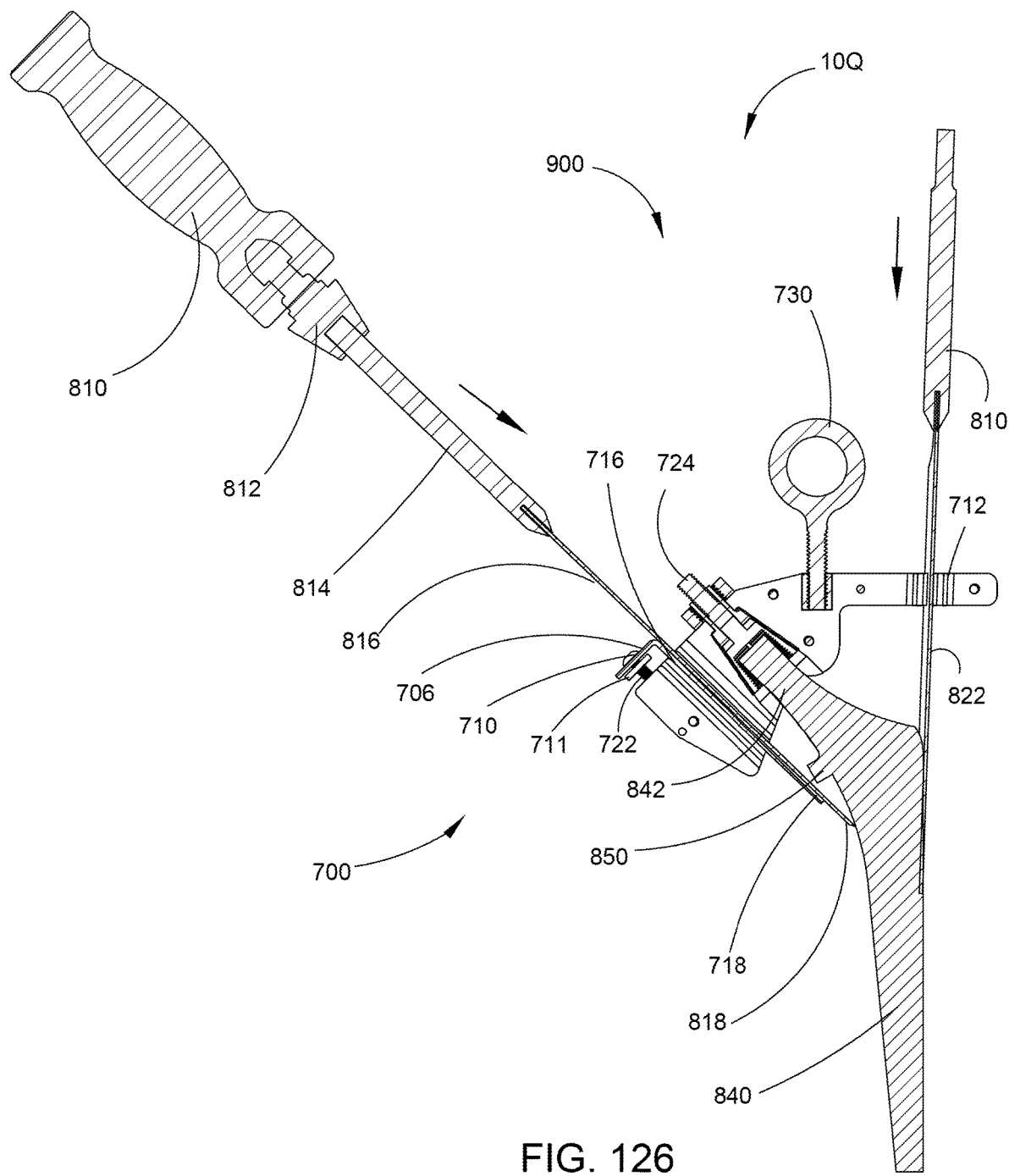

FIG. 126 depicts a cross-sectional view of the alternate embodiment of the joint revision surgery apparatus illustrating an assembled knife blade guide block having an adjustable L-shaped knife blade guide plate, showing the surgical knife blades inserted into the forward and rearward knife blade guide slots within the guide block, for removal of a collared implanted femoral stem.

Figure 127:
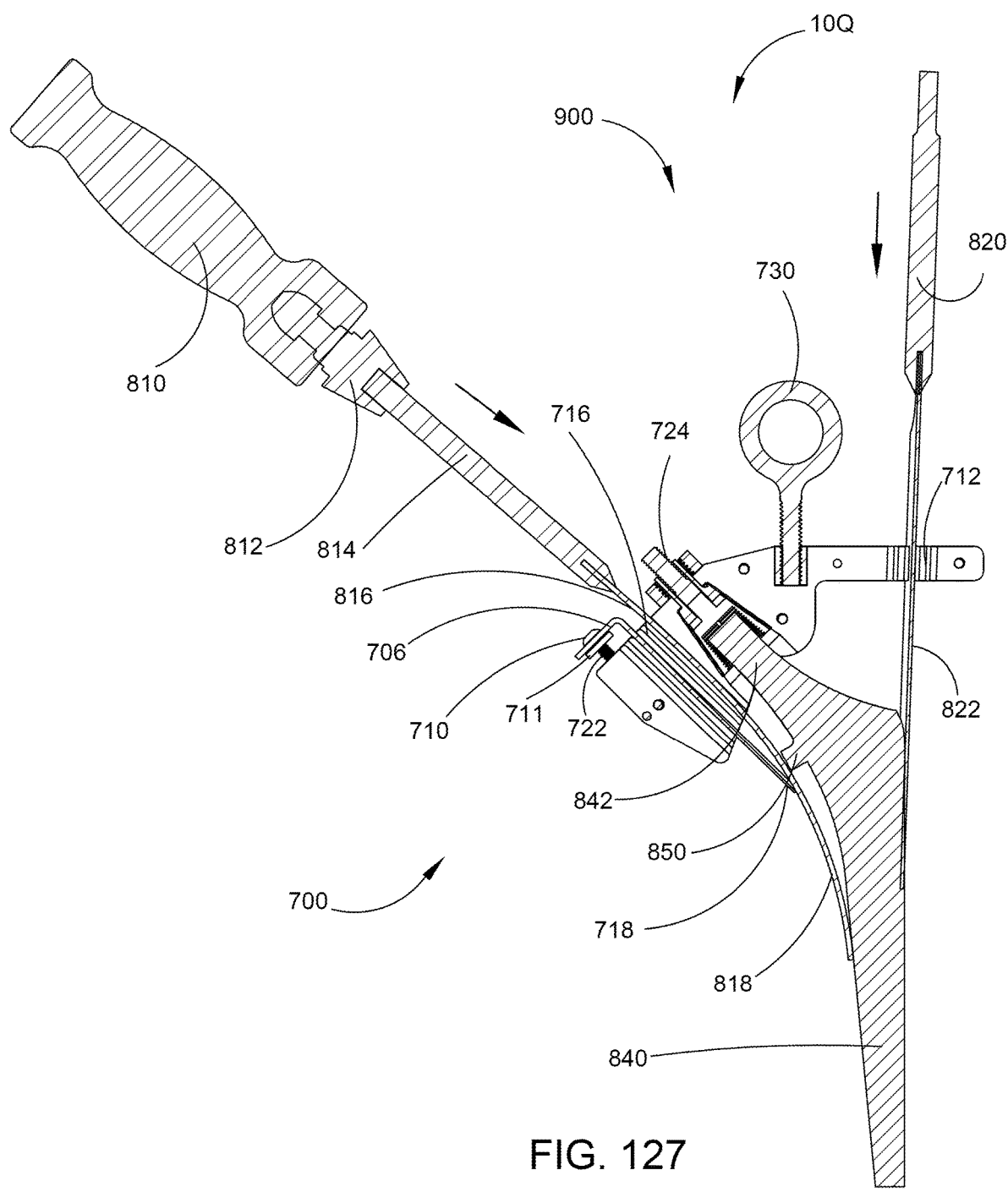

FIG. 127 depicts a cross-sectional view of the alternate embodiment of the joint revision surgery apparatus illustrating an assembled knife blade guide block having an adjustable L-shaped knife blade guide plate, showing the surgical knife blades inserted into the forward and rearward knife blade guide slots within the guide block, for removal of a collared implanted femoral stem.

DETAILED DESCRIPTION OF THE PREFERRED EMBODIMENTS

As required, the detailed embodiments of the present Joint Revision Surgery Apparatus 10A, 10B, 10C, 10D, 10E, 10F, 10G, 10H, 10J, 10K, 10L, 10M, 10N, 10P and 10Q are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure.

FIG. 1 depicts a cross section through the preferred embodiment of the support apparatus 10A and tools used in performing the Joint Revision Surgery. The process entails the positioning of the support apparatus 12A over the trunnion end 14 of the existing prostheses 16 within its internal cavity 17. The wide knife blades 24 will initially be used to properly align the support apparatus 12A with the side surfaces 42 of the existing prostheses 16. Then, securing the support apparatus 12A down against the femur end 18 by the means of the T handle screw 20 that threads into the threaded orifice 22 in of the existing prostheses 16.

Wide knife blades 24 or shaped knife blades 26 will be used to loosen both sides of the existing prostheses 16 while narrow blades 28 will be used around the tapered curved apertures 30 and 31 on the ends of the support apparatus 12A. The distal end of the curved aperture 31 has an internal curvature 32 to guide the tapered knife blade 28 along the curved front edge 34 of the existing prostheses 16. The replaceable knives can be used in a pneumatic osteotome 36 or tapped with a surgical hammer. Both the internally curved front edge 34 and back edge 38 of the existing prostheses 16 may be a flat or have a curved surface.

FIG. 2 depicts a side view of the hip replacement prostheses 40 with the trunnion end 14 and the lower stem portion 44. A threaded existing orifice 46 is located on the exposed shoulder 48.

FIG. 3 depicts a narrow blade knife 28 used in the Joint Revision Surgery. The blades will be used with the sharp edge 76 section away from the side surfaces 78 of the existing prostheses 16 to keep the knives from digging into or scraping the metal.

FIG. 4 depicts a shaped blade knife 26 used in the Joint Revision Surgery.

FIG. 5 depicts a wide blade knife 24 used in the Joint Revision Surgery.

FIG. 6 depicts a side view of the T handle screw 20 used in securing and removal of the existing prostheses 16.

Figure 7:
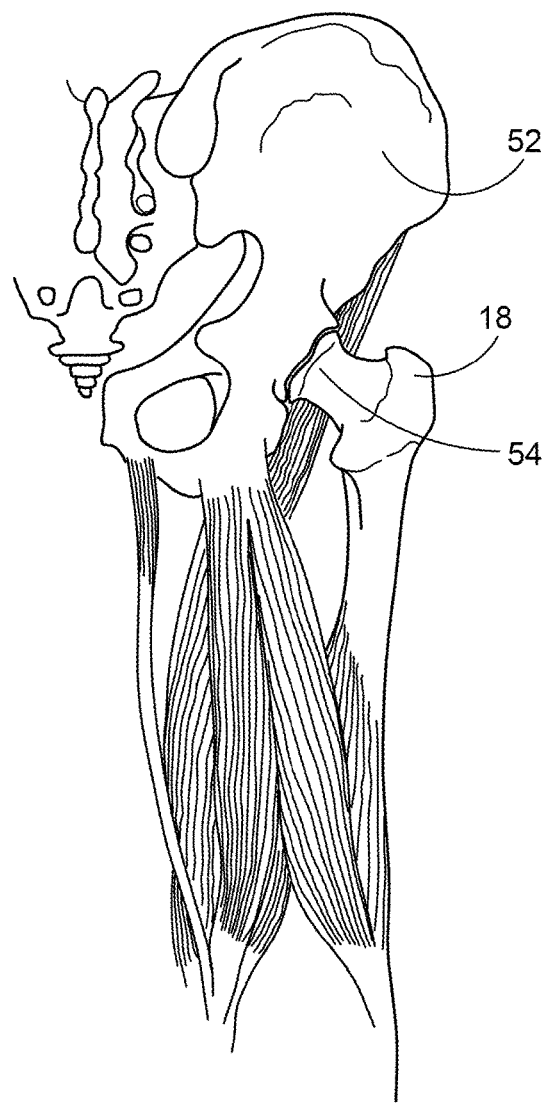
FIG. 7 depicts a view of a normal hip illustrating the pelvis, and femur connection.

FIG. 7 depicts a view of a normal hip illustrating the pelvis 52, and femur end 18 connection to the pelvis 52.

Figure 8:
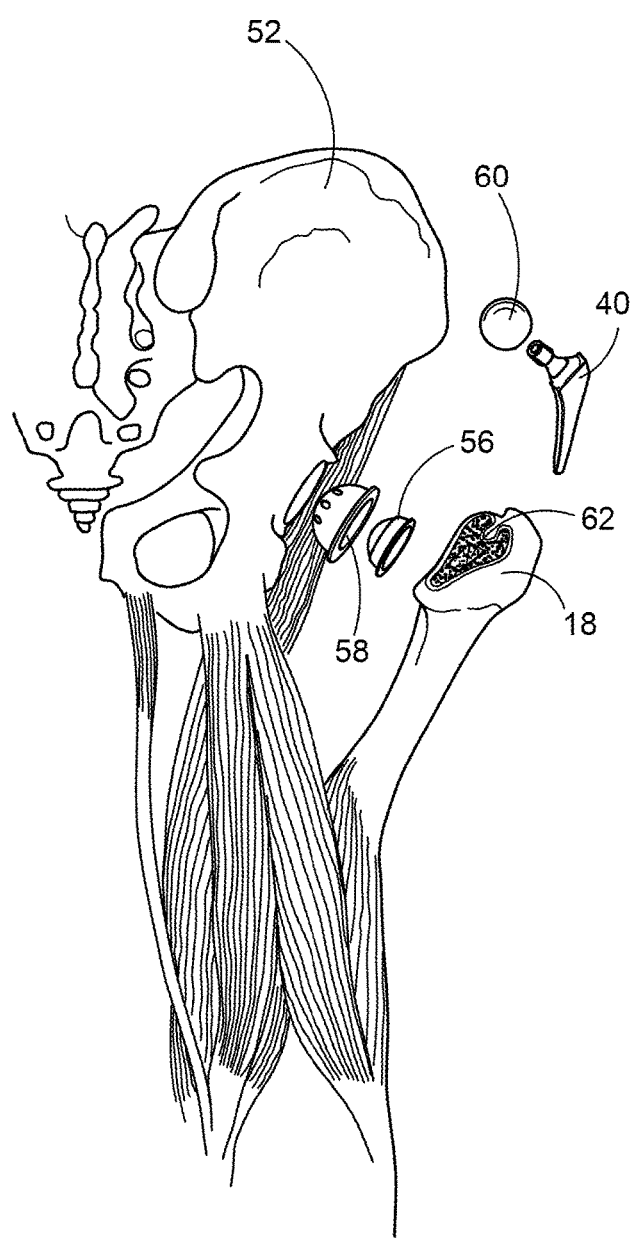
FIG. 8 depicts a view of the femur separated from the pelvis with the existing ball section removed and the plastic cup and metal shell exploded away. The existing hip prosthesis and ball are above the existing cavity.

FIG. 8 depicts a view of the femur end 18 separated from the pelvis 52 with the existing ball section 54 removed and the plastic cup 56 and metal shell 58 exploded away. The hip replacement prosthesis 40 and replacement ball 60 are above the existing cavity 62 in the femur end 18.

Figure 9:
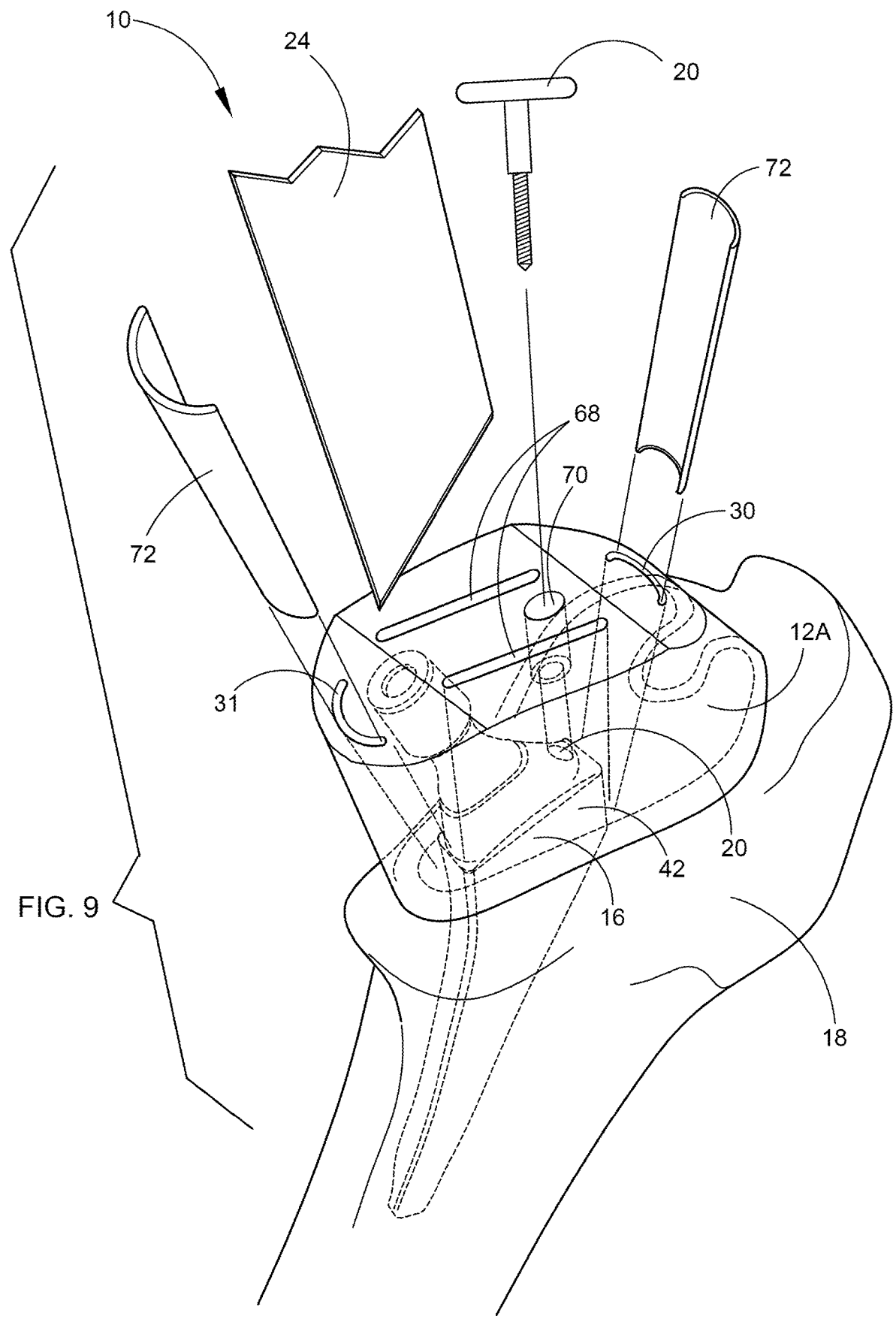
FIG. 9 depicts a perspective view of the femur end with the support apparatus in place.

FIG. 9 depicts a perspective view of the femur end 18 with the support apparatus 12A in place. One of the wide knife blades 24 is positioned above one of the two tapered guide slots 68 that extend to the side surfaces 42 of the existing prostheses 16. The T handle screw 20 is shown above the orifice 70 in the support apparatus 12A that extends to the existing threaded orifice 46 in the existing prostheses 16. Two optional curved knives 72 are illustrated above the tapered curved slots 74 in the support apparatus 12A.

FIG. 10 depicts an end view of the preferred embodiment of the support apparatus 12A illustrating the angles 80 of the tapered slots 68.

FIG. 11 depicts a side view cross section of the preferred embodiment of the support apparatus 12A illustrating the internal cavity 17 the tapered curved aperture 30 and the tapered curved aperture 31 with the internal curvature 32 at the distal end. The bottom surface 82 of the support apparatus 12A will have an internally beveled edge 84 on its perimeter.

FIG. 12 depicts atop view of the preferred embodiment of the support apparatus 12A illustrating the tapered curved aperture 30 and the tapered curved aperture 31 with the internal curvature 32 at the distal end, the two tapered guide slots 68 and the orifice for the "T" handle screw 20.

FIG. 13 depicts a side view of the angled blade flat knife 86 to be used on the first alternate embodiment of the support apparatus 12B.

FIG. 14 depicts a side view of the wide blade knife 88 to be used on the first alternate embodiment of the support apparatus 12B.

FIG. 15 depicts a top view of the first alternate embodiment of the support apparatus 10B with support apparatus 12B having an elongated orifice 90 at the top of the enlarged internal elongated cavity 92. The cavity has been elongated to the back side to allow the existing prostheses 16 to only move back and up when the T head screw 20 is tightened to extract the device.

FIG. 16 depicts a cross section through the first alternate embodiment of the of the support apparatus 10B with the T head screw 20 attached to the existing prosthesis 16 and the wide blade knife 88 is inserted in one of the tapered guide slots 68 to align the support apparatus 12B in position on the existing prosthesis 16.

FIG. 17 depicts a cross section through the first alternate embodiment of the support apparatus 10B with angled blade knife 86 or the wide blade knife 88 inserted along the sides of the existing prostheses 16 and curved knives 72 on the ends.

FIG. 18 depicts a cross section through the first alternate embodiment of the support apparatus 10B where the T handle screw 20 is tightened to pull the existing prosthesis 16 up from the femur end 18. If necessary, the T handle screw 20 can be partially backed out of the existing prosthesis 16 and can be moved up and down to further release the adhesive bond on the device.

Figure 19:
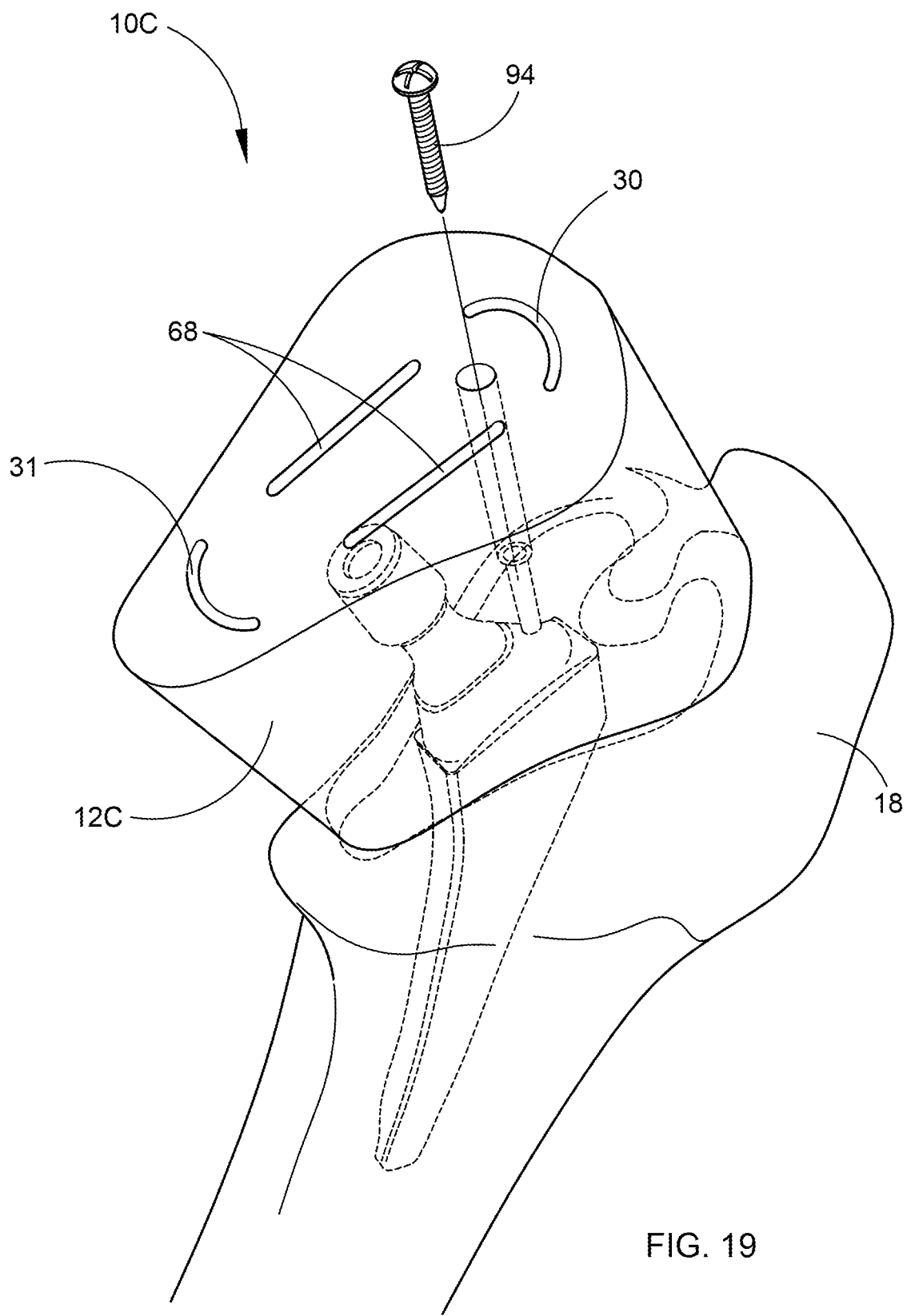
FIG. 19 depicts a perspective view of the second alternate embodiment of the support apparatus with a different configuration.

FIG. 19 depicts a perspective view of the second alternate embodiment of the support apparatus 10C with a different simpler configuration of the support apparatus 12C with two tapered guide slots 68, the tapered curved aperture 30 and tapered aperture 31 with the internal curvature 32 in the distal end. A conventional style of screw 94 will be used to secure the support apparatus 10C in place over the femur end 18.

Figure 20:
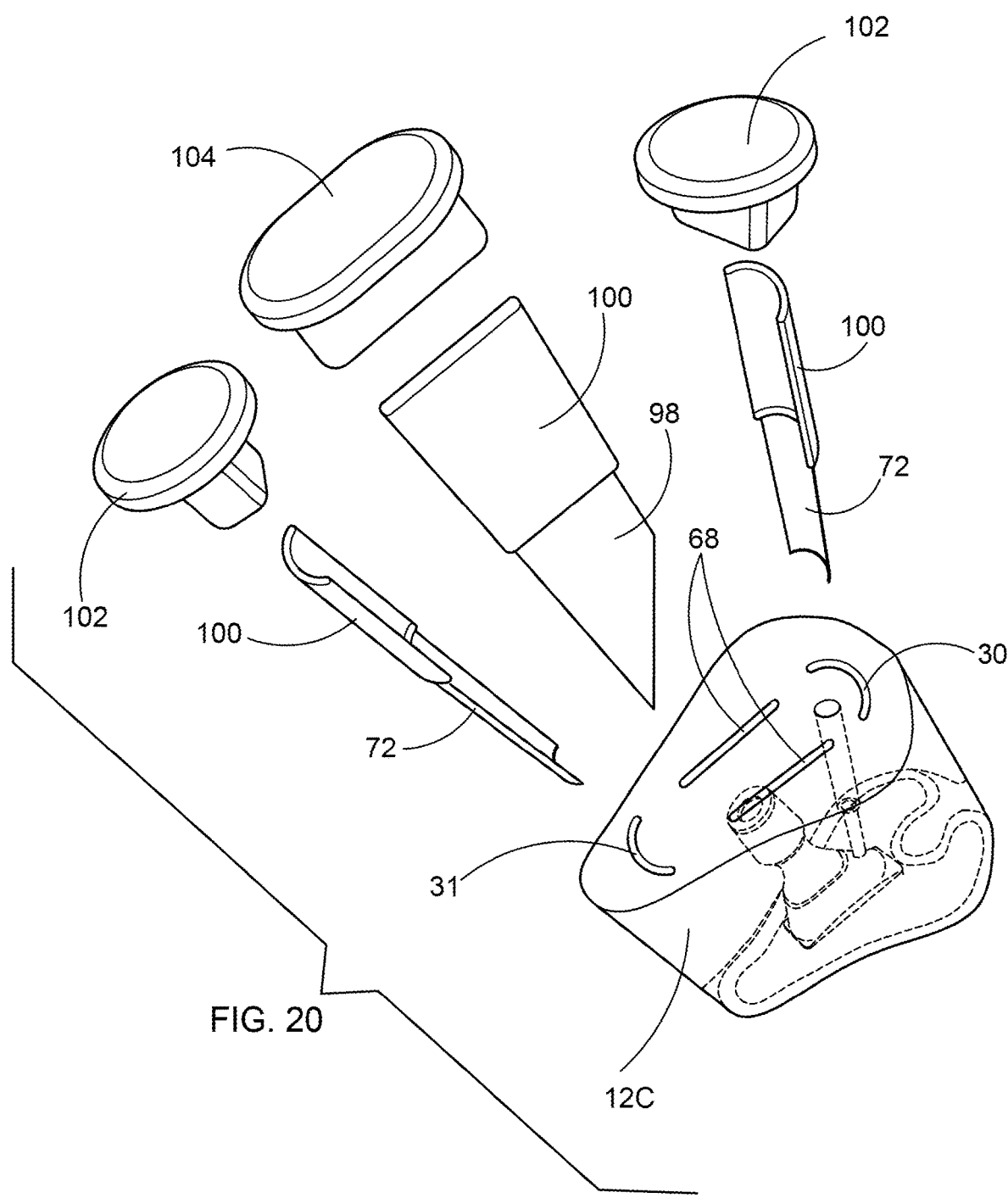
FIG. 20 depicts a perspective view of the second alternate embodiment of the support apparatus with a different configuration illustrating the tools used in the procedure.

FIG. 20 depicts a perspective view of the second alternate embodiment of the support apparatus 10C with the different simpler configuration of the support apparatus 12C illustrating the tools used in the procedure. A wide blade knife 98 with a depth restricting section 100 can be used with the pneumatic osteotome 36 or tapped with a surgical hammer Two optional curved blades 72 may be used in the tapered curved aperture 30 and tapered aperture 31 with the internal curvature 32. Two small blade adapters 102 and one large blade adapter 104 will fit over the top of the blades when they are used by hand pressure or tapped with a surgical hammer.

FIG. 21 depicts a perspective view of the third alternate embodiment of the one-piece blade guide block 10D illustrating the locations of the angular blade slots 200, the smooth alignment orifice 202, the threaded angled eye bolt orifice 204 and the threaded securing orifice 206 along with the curved blade cavity 208. This one-piece guide blade block 10D could be constructed of stainless steel, composite materials or hard plastic.

FIG. 22 depicts a perspective view of the fourth alternate embodiment of the two-piece blade guide block 10E illustrating the locations of the angular blade slots 200, the smooth alignment orifice 202, the threaded angled eye bolt orifice 204 and the threaded securing orifice 206 and the insert cavity 212 with the insert 214 moved away, along with the curved blade cavity 208 with the eye bolt 210 raised above and the insert cavity 212. This two-piece guide blade block 10E could be constructed of stainless steel, composite materials or hard plastic.

FIG. 23 depicts a bottom view of the fourth alternate embodiment of the blade guide block 10E detailing the bottom view with angular blade slots 200, the smooth alignment orifice 202, the threaded angled eye bolt orifice 204 and the threaded securing orifice 206 along with the curved blade cavity 208 with the insert cavity 212 and the flat front blade guide surface 216. The prosthesis trunnion cavity 218 does not fully penetrate completely through the device.

FIG. 24 depicts a side view of the fourth alternate embodiment of the blade guide block 10E illustrating the flat front blade guide surface 216.

FIG. 25 depicts a top view of the fourth alternate embodiment of the blade wide block 10E detailing the top view with angular blade slots 200, the smooth alignment orifice 202, the threaded angled eye bolt orifice 204 and the threaded securing orifice 206 along with the curved blade cavity 208 with the insert cavity 212 and the flat front blade guide surface 216.

FIG. 26 depicts a perspective view of the fourth alternate embodiment of the two-piece blade guide block 10E with a secondary handle-shaped guide block 10F, illustrating the top view with angular blade slots 200, the smooth alignment orifice 202, the threaded angled eye bolt orifice 204 and the threaded securing orifice 206 along with the curved blade cavity 208 with the insert 212 cavity and the flat front blade guide surface 216. The attaching secondary blade guide block 10F is shown raised up illustrating the location of the locating dowel 222 that mates with the smooth alignment orifice 202 and the threaded T-screw 224 goes through the orifice 226 in the secondary blade guide block 10F and into the threaded securing orifice 206. The distal end 228 of the secondary blade guide block 10F is shown with four slots 230 that will align with the flat front blade guide surface 216 of the blade guide block 10E for different styles of prosthesis. The dowel 232 when inserted allows the insert 214 to move slightly keeping it from binding with the different knife blades.

FIG. 27 depicts the bottom view of the secondary blade guide block 10F showing the four slots 230 the end of the locating dowel 222 and the orifice 226.

FIG. 28 depicts the side view of the secondary blade guide block 10F showing the four slots 230 the end of the locating dowel 222.

FIG. 29 depicts the top view of the secondary blade guide block 10F showing the four slots 230 and the orifice 226.

Figure 30:
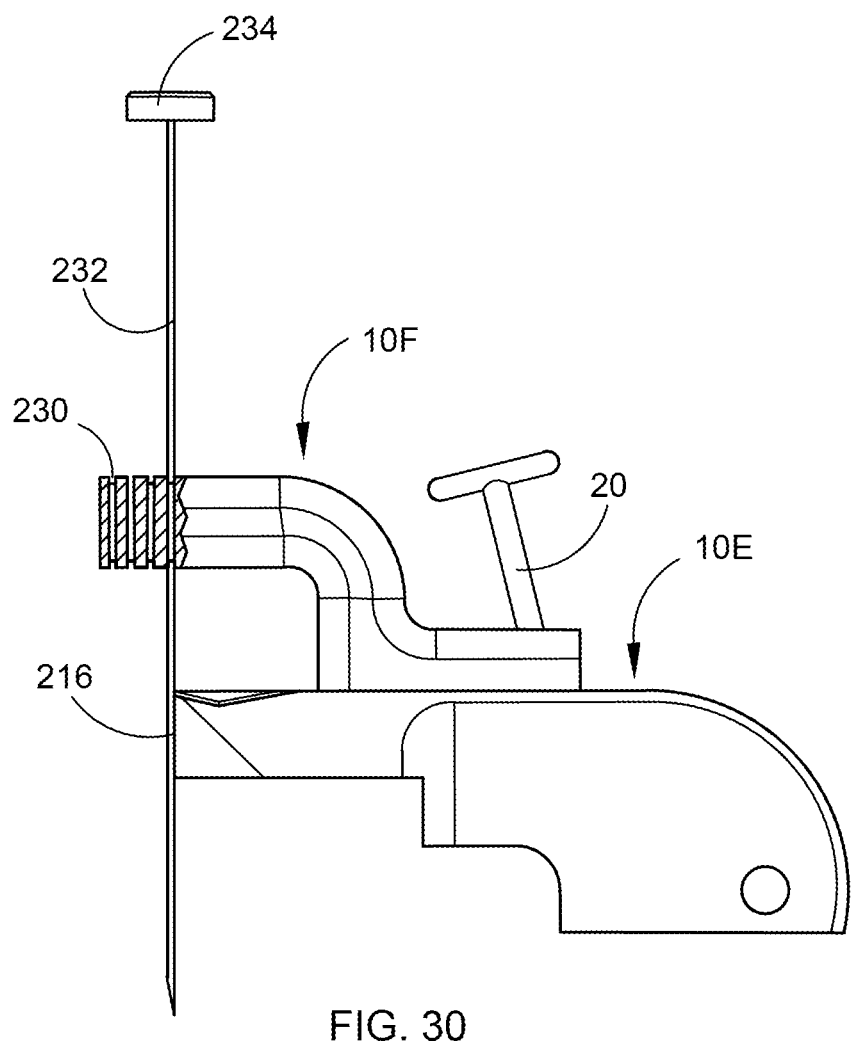
FIG. 30 depicts a side view of the fourth alternate embodiment of the blade guide block and the attaching secondary blade guide block connected with a flat blade going through one of the four slots in the end.

FIG. 30 depicts a side view of the fourth alternate embodiment of the blade guide block 10E with the attached secondary blade guide block 10F with the T handle screw 20 and a flat knife blade 232 with the upper metal cap end 234 extending through one of the slots 230 located in the secondary blade guide block 10F.

Figure 31:
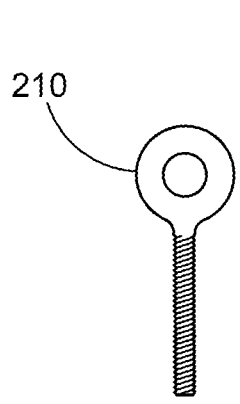
FIG. 31 depicts a front view of the eye bolt.

FIG. 31 depicts a front view of the eye bolt 210.

Figure 32:
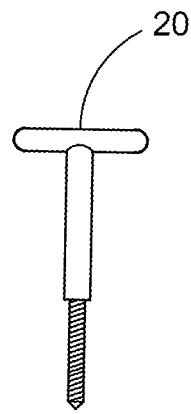
FIG. 32 depicts a front view of the T handle screw.

FIG. 32 depicts a front view of the T handle screw 20.

FIG. 33 depicts a perspective view of the fifth alternate embodiment of the blade guide block 10G with angular blade slots 200, the smooth alignment orifice 202, the threaded angled eye bolt orifice 204, the threaded securing orifice 206 and the curved blade cavity 208. The insert 212 cavity with the adjustable insert 240 and the adjusting mechanism 242 has a pressure adjustment knob 244 shown raised up. The adjusting mechanism 242 can be slid down through grooves 246 on either side of the insert cavity 212 in the blade guide block 10G to be able to move the adjustable insert 240 forward and backward.

FIG. 34 depicts a perspective view of the fifth alternate embodiment of the blade guide block 10G with the adjustable insert 240 in the insert cavity 212 and the adjusting mechanism 242 in position.

FIG. 35 depicts a side cut-away view of the fifth alternate embodiment of the blade guide block 10G with the adjustable insert 240 and the adjusting mechanism 242. The pressure adjustment knob 244 is secured in place in the adjusting mechanism 242 by the means of a snap ring 248 so that when the pressure adjustment knob 244 is rotated the adjustable insert 240 can move forward and backward to be able to put a light pressure on a blade within the curved blade cavity 208.

Figure 36:
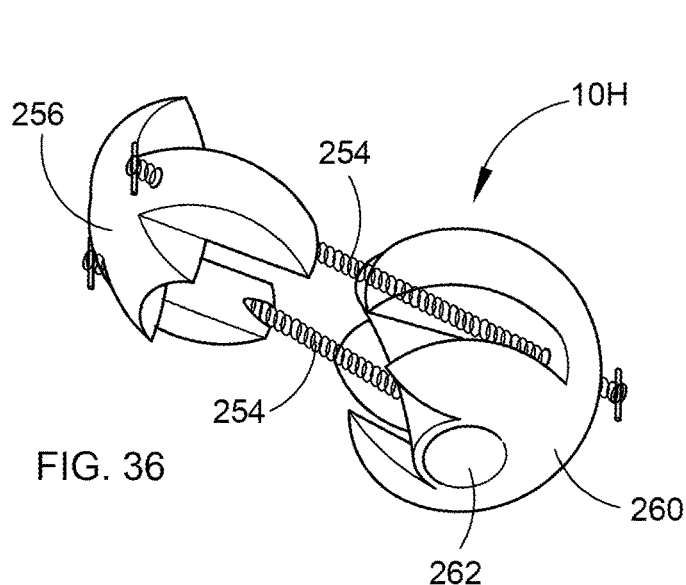
FIG. 36 depicts a perspective view of the sixth alternate embodiment of the internal tension spring blade guide ball using an internal spring tensioner.

FIG. 36 depicts a perspective view of the sixth alternate embodiment of the internal tension spring blade guide ball 10H using an internal spring tensioner 254 to restrain the female guide ball section 256 to the male guide ball section 260 that has the prosthesis trunnion orifice 262 at the bottom.

Figure 37:
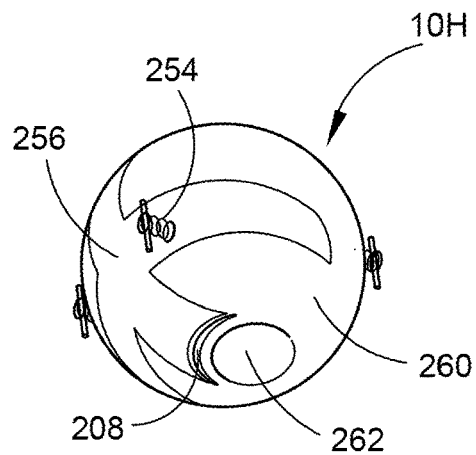
FIG. 37 depicts a side view of the sixth alternate embodiment of the external spring blade guide ball using an internal spring tensioner.

FIG. 37 depicts a side view of the sixth alternate embodiment of the external spring blade guide ball 10H using an internal spring tensioner 254 to restrain the female guide ball section 256 to the male guide ball section 260 that has the prosthesis trunnion orifice 262 at the bottom.

Figure 38:
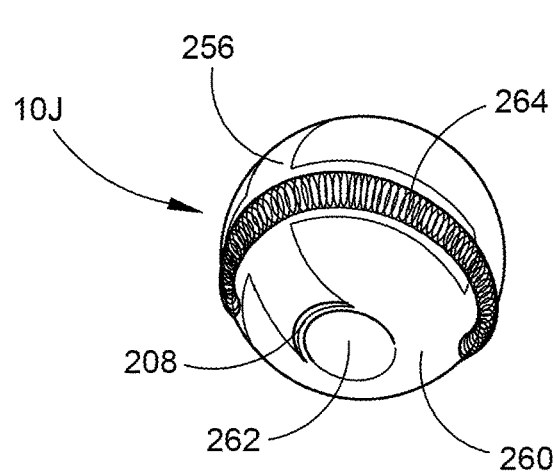
FIG. 38 depicts a perspective view of the sixth alternate embodiment of the blade guide ball using an external spring tensioner.

FIG. 38 depicts a perspective view of the sixth alternate embodiment of the blade guide ball 10J using an external spring tensioner 264 to restrain the female guide ball section 256 to the male guide ball section 260 to restrain the female guide ball section 256 to the male guide ball section 260 that has the prosthesis trunnion orifice 262 at the bottom.

Figure 39:
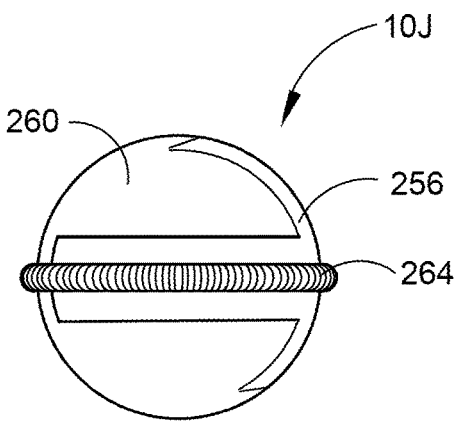
FIG. 39 depicts a side view of the seventh alternate embodiment of the blade guide ball using an external spring tensioner.

FIG. 39 depicts a side view of the seventh alternate embodiment of the blade guide ball 10J using an external spring tensioner 264 to restrain the female guide ball section 256 to the male guide ball section 260.

Figure 40:
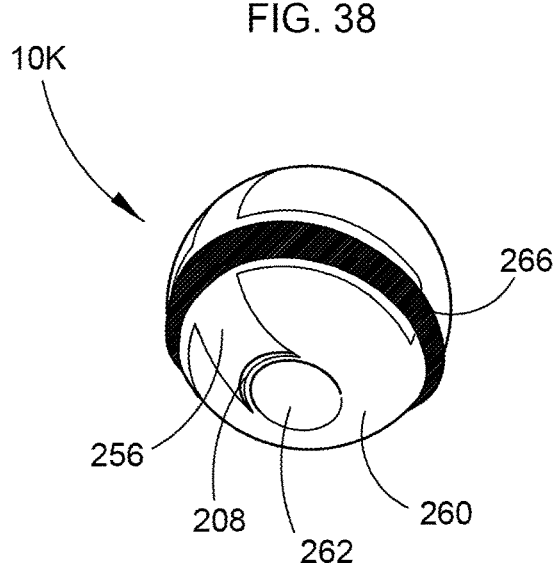
FIG. 40 depicts a perspective view of a two part eighth alternate embodiment of the blade guide ball with internal spring tensioners exposed.

FIG. 40 depicts a perspective view of a two part eighth alternate embodiment of the blade guide ball 10K with an external elastic tensioner 266 to restrain the female guide ball section 256 to the male guide ball section 260 that has the prosthesis trunnion orifice 262 at the bottom.

Figure 41:
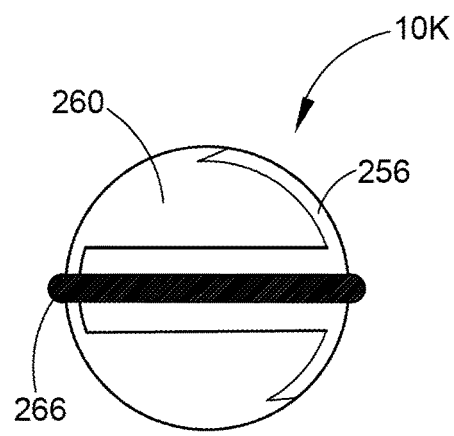
FIG. 41 depicts perspective view of a two part eighth alternate embodiment of the blade guide ball with internal spring tensioners.

FIG. 41 depicts a side view of a two part eighth alternate embodiment of the blade guide ball 10K with an external elastic tensioner 266 to restrain the female guide ball section 256 to the male guide ball section 260.

FIG. 42 depicts a side view of a large prostheses 270 attached to a cut-away third alternate embodiment of the basic blade guide block 10D illustrating a thin curved blade with straight handle 274 in the compound curved prosthesis blade 288 and a curved handle 274 cavity 208 with the eye bolt 210 secured tightly against the prostheses trunnion 272 to aide in the extraction of the prosthesis.

FIG. 43 depicts a side view of a small prosthesis 276 having the trunnion 272 and the trunnion size adaptor 278 which fits over the prostheses trunnion 272 to add thickness to the prostheses trunnion 272 for a better fit with the blade guide block used in the revision surgery procedure.

FIG. 44 depicts a top view of the small prostheses 276 illustrating the semi-hexagonal shape 280 of the upper section of the small prostheses 276 that conforms to the angular slots 200 in the blade guide blocks 10D, 10E and 10G. Different sizes are anticipated to accommodate differing sizes of implanted stems undergoing revision surgery.

FIG. 45 depicts a cross section through a compound curved prosthesis blade 288 where the inner surface 290 conforms to the shape of the typical prosthesis radius and the length of the typical blade has a sweeping curve to it.

Figure 46:
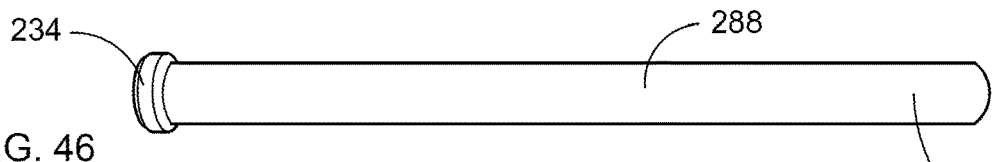
FIG. 46 depicts a top view of a heavy curved blade a curved sharp end and a metal end cap.

FIG. 46 depicts a top view of a heavy compound curved prosthesis blade 288 with a curved sharp end 218 and a metal end cap 234.

Figure 47:
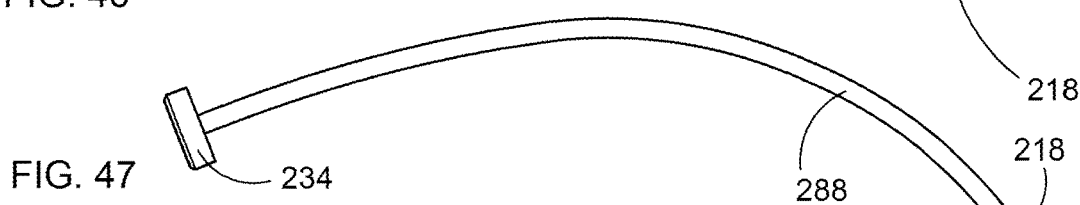
FIG. 47 depicts a side view of a heavy curved blade a curved sharp end and a metal end cap.

FIG. 47 depicts a side view of a heavy compound curved prosthesis blade 288 a curved sharp end 218 and a metal end cap 234.

Figure 48:
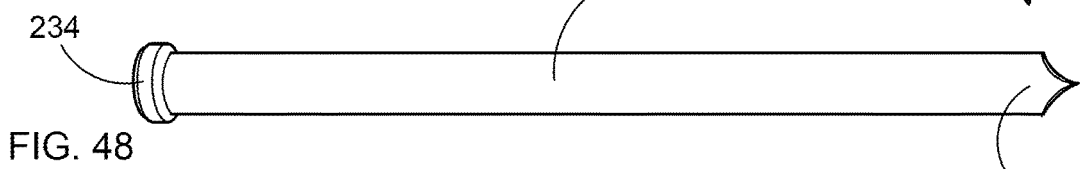
FIG. 48 depicts a top view of a thin curved blade a curved sharp end and a metal end cap.

FIG. 48 depicts a top view of a thin compound curved prosthesis blade 288 with a curved sharp pointed end 292 and a metal end cap 234.

Figure 49:
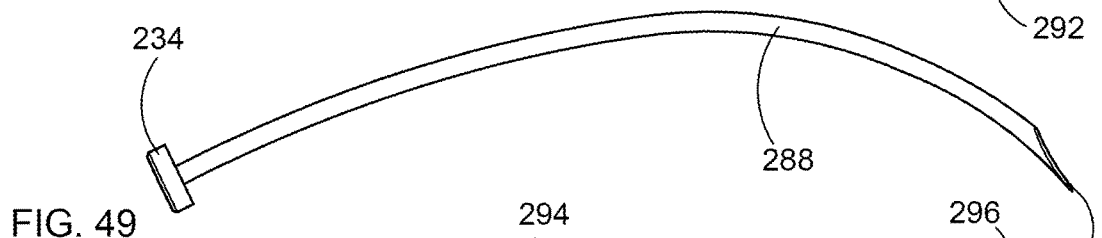
FIG. 49 depicts a side view of a thin curved blade a curved sharp pointed end and a metal end cap.

FIG. 49 depicts a side view of a thin compound curved prosthesis blade 288 with a curved sharp pointed end 292 and a metal end cap 234.

Figure 50:
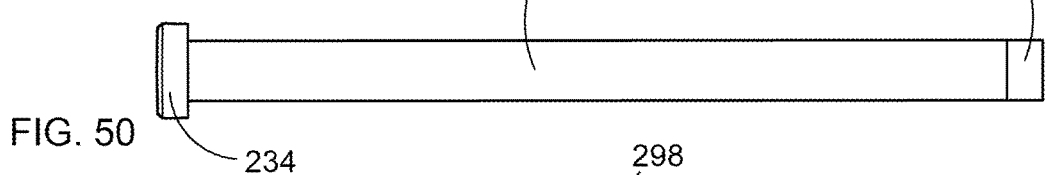
FIG. 50 depicts a top view of a straight narrow flat blade with a chisel shaped sharp end and a metal end cap.

FIG. 50 depicts a top view of a straight narrow flat blade 294 with a chisel shaped sharp end 296 and a metal end cap 234.

Figure 51:
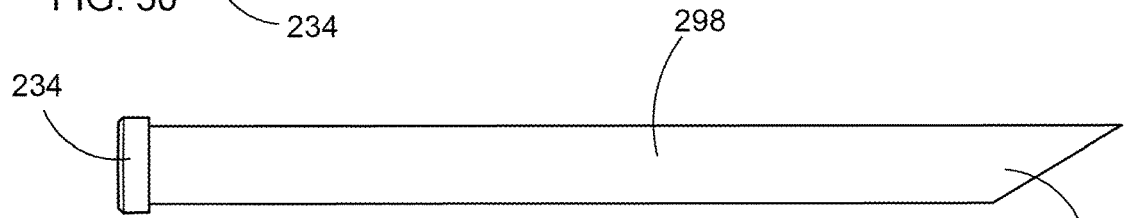
FIG. 51 depicts a top view of a straight wide flat blade with a triangular shaped sharp end and a metal end cap.

FIG. 51 depicts a top view of a straight wide flat blade 298 with a triangular shaped sharp end 300 and a metal end cap 234.

Figure 52:
FIG. 52 depicts a side view of a thin curved blade a sharp pointed end, a straight handle and a metal end cap.

FIG. 52 depicts a side view of a thin compound curved prosthesis blade 288 with a straight handle 274 and a metal end cap 234.

Figure 53:
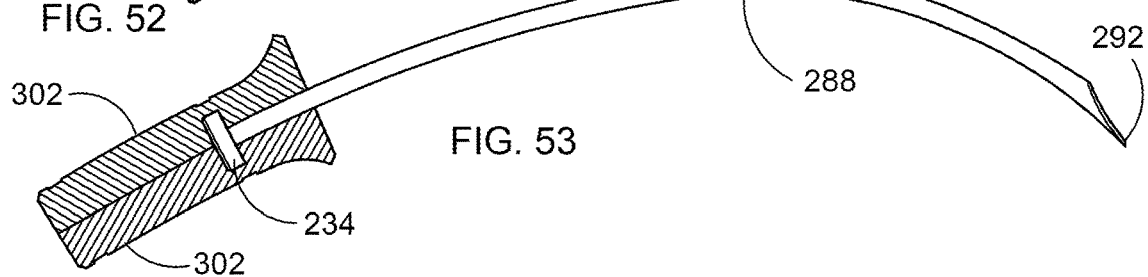
FIG. 53 depicts side view of a thin curved blade a sharp pointed end, a two part handle with the metal end cap enclosed.

FIG. 53 depicts side view of a thin compound curved prosthesis blade 288 with a two part handle 302 and the metal end cap 234 enclosed.

FIG. 54 depicts a perspective view of a large prosthesis 270, the compound curved prosthesis blade 288 with a two part blade guide ball 304 and a two part handle 302.

FIG. 55 depicts side view of a large prosthesis 270 the compound curved prosthesis blade 288 with a two part blade guide ball 304 and a two part handle 302 with the metal end cap 234 enclosed.

FIG. 56 depicts a perspective view of the female guide ball section 256 of the two part blade guide ball 304 where the female guide ball section 256 includes two wings on both sides of the female guide ball section 256.

FIG. 57 depicts a perspective view of the male guide ball section 260 of the two part blade guide ball 304 where the male guide ball section 260 includes two slots for accepting the wings located on both sides of the female guide ball section 256 (see FIG. 56).

FIG. 58 depicts a perspective view of the two part blade guide ball 304 assembled together. where the female guide ball section 256 two wings located on both sides of the female guide ball section 256 have mated with the two slots located on the male guide ball section 260 for accepting the wings located on both sides of the female guide ball section 256.

Figure 59:
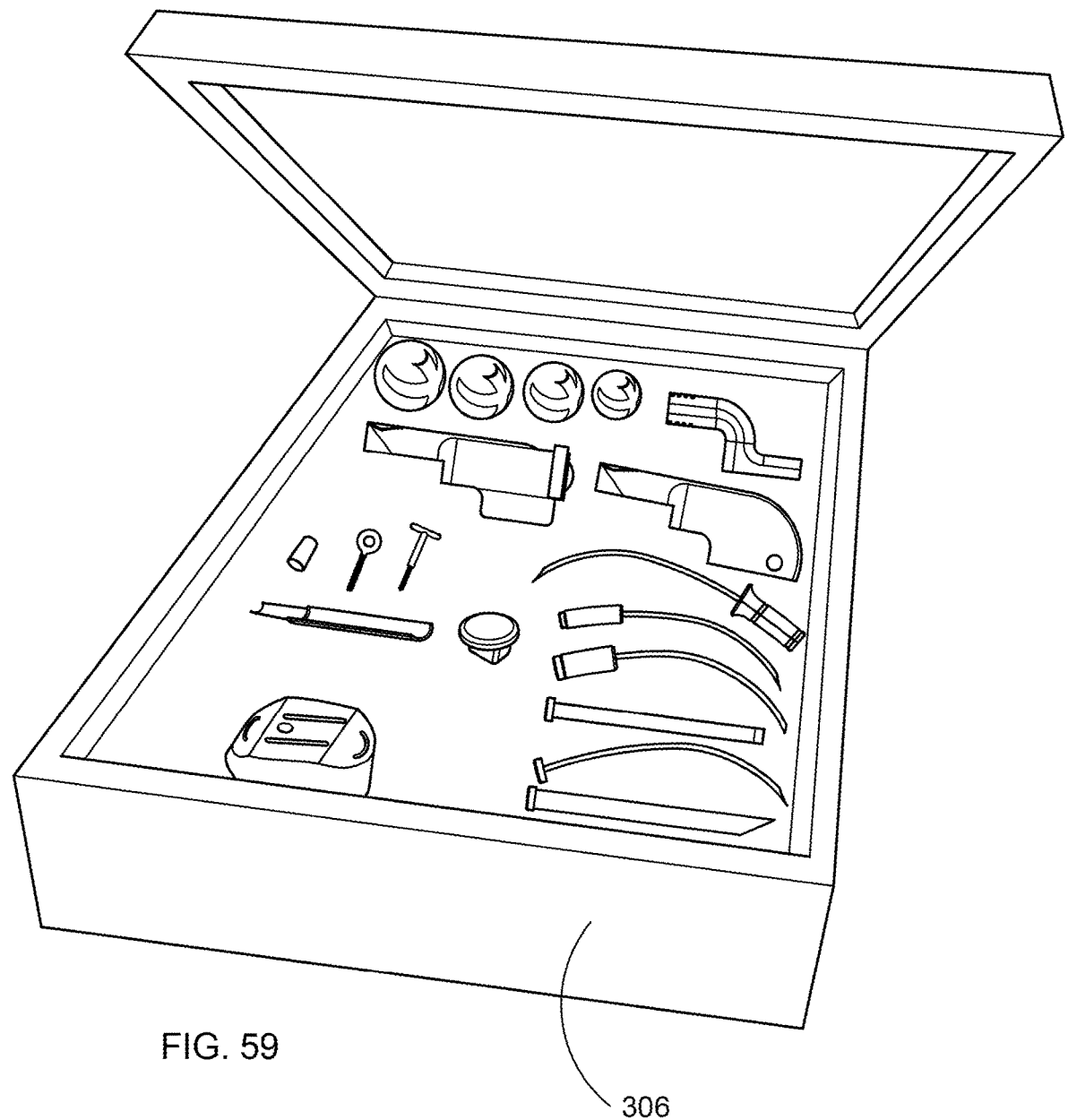
FIG. 59 depicts a perspective view of a box style of container illustrating a typical assortment of the prosthesis replacement equipment assembled in a surgeon's hospital kit for prosthesis extraction according to the present invention.

FIG. 59 depicts a perspective view of a box style of container 306 illustrating a typical assortment of prosthesis removal devices. It is anticipated that these assembled kits for performing joint revision surgery will contain any number, style and varying sizes of blade guide blocks, blade guide balls, curved knife blades, straight knife blades, narrow knife blades, wide knife blades, knife blades with attached knife blade handles, one-piece removable replacement knife blade handles, two-piece removeable replacement knife blade handles, eyebolts, T handle screws, T screws and possibly even a pneumatic osteotome.

FIG. 60 depicts an exploded top and side perspective view of a Joint Revision Surgery Apparatus 10K surgical knife blade guide block 400 illustrating the two-piece construction, the location of the multiple surgical knife blade slots 406, 408 and 410 and the position of the locking rings 418 within a locking ring cavity 416 capable of accepting a prothesis stem trunnion and securing it for an extraction operation. The surgical knife blade guide block 400 is constructed of two half sections 402 and 404 and when assembled these two half sections 402 and 404 are held together by three Allen screws 420 and stabilized by two stabilization pins 422. When assembled, the two half sections 402 and 404 form a centrally located retaining ring cavity 416 which contains a plurality of slots for accepting retaining rings 418. Multiple surgical knife blade slots 406, 408 and 410 are visible from the top surfaces 412 and 414 of the surgical knife blade guide block 400 and lead to channels extending through the surgical knife blade guide block 400 for the purpose of guiding surgical knife blades inserted into each slot.

FIG. 61 depicts an alternate embodiment of the retaining rings 424 capable of accepting a prothesis stem trunnion and securing it for an extraction operation. These retaining rings 424 differ from the retaining rings 418 seen in FIG. 60 above in that they are capable of securing stem trunnions smaller in diameter. It is anticipated that retaining rings for this purpose will be sized in various diameters to accommodate all sizes of femoral stems to be extracted using the Joint Revision Surgery Apparatus according to the present invention. All of the varying sizes will be capable of being inserted and secured by the retaining ring cavity formed when the surgical knife blade guide block 400 is assembled.

FIG. 62 depicts a cross-sectional view of the Joint Revision Surgery Apparatus 10K surgical knife blade guide block half section 404 having a single channel 436 front slot and multiple rear slots 410, illustrating the position of the surgical knife blade slots 436 and 410 and the retaining ring cavity 416 accepting a prothesis stem trunnion 426 having a trunnion end portion 428 of a femoral stem 430 cemented in place within a patient's femur 432. Also shown is a rigid surgical knife blade 434 and a flexible surgical knife blade 438 extending down through the slot and through the channel 436 to reach the femur 432 and the stem 430 cemented into the femur 432 to be extracted in the joint revision surgery operation. The lower blade is the rigid guide blade 434 and guides the path of the upper blade which is the flexible cutting blade 438. Flexible cutting blade 438 is capable of cutting through the cement (represented here by a heavy black line around the stem 430) and releasing the stem 430 from the patient's femur 432 during the joint revision surgery operation.

FIG. 63 depicts a front and top enlarged partial perspective view of the surgical knife blade block assembled half sections 402 and 404 shown in FIG. 62 illustrating the shape of the single channel front surgical knife blade slot 406 therein. This single channel front surgical knife blade slot 406 has an expanded top section 408 to accommodate the flexible cutting surgical knife blade 438 (see FIG. 62) after the rigid surgical knife guide blade 438 has been inserted into the curved lower section of the slot 406.

FIG. 64 depicts femoral stem extraction Step 1 wherein a cross sectional view of a collared stem 440 within a patient's femur 442, wherein a Lambotte osteotome 444 is beginning to remove a small triangle of bone below the collar portion 443 of the collared stem 440. Removal of collared stems presents a unique problem to a surgeon performing joint revision surgery. Collared stems are significantly more difficult to remove as the collar hinders extraction blades from reaching the stem cement for cutting the stem free of the patient's femur. In this regard, a three step process is disclosed herein. Step 1 of this process for removing collared stems is using a Lambotte osteotome 444 to remove a small triangle of bone below the collar portion 443 of the collared stem 440.

FIG. 65A depicts femoral stein extraction Step 2 showing a cross-sectional view of a Joint Revision Surgery Apparatus 10L surgical knife blade guide block 450 having a single straight channel front slot 452, illustrating the position of a rigid surgical knife blade 454 and a flexible surgical knife blade 456 within the single slot channel 452 and passing the collar portion 443 of the collared stem 440 to enter the Step 1 removed bone triangle 445 within a patient's femur 442. Step 2 requires that the surgeon insert a rigid guide surgical knife blade 454 first and extend it downward passing through the removed triangle of bone 445 until it makes contact with the stem wall, then flex downward until it passes the collar portion 443, then back off the rigid guide blade 2-4 millimeters to create a passageway for the flexible cutting blade 456 to pass by the collared portion 443. After this is completed surgical knife blade 460 is inserted into knife blade slot 458 and extended down along the stem 440.

FIG. 65B depicts a partial magnification of FIG. 65A femoral stem extraction Step 2 showing greater detail of the movement (see movement arrows) around the collared stem 440 and position of the surgical knife blades with respect to the removed triangle of bone 445, including the rigid lower guide blade 454 and the flexible upper cutting blade 456.

FIG. 65C depicts a cross-sectional view of FIG. 65A showing the curved rigid surgical knife blade 454 below and in a position for guiding the flexible surgical knife blade 456 above it. After the curved rigid surgical knife blade 454 is inserted and extended to the stem surface, then pushed slightly downward and backed off about 2-4 millimeters, it is in position to guide the flexible surgical knife blade 456 which is inserted above it and passes through to the stem for the stem cement cutting operation.

Figure 66A:
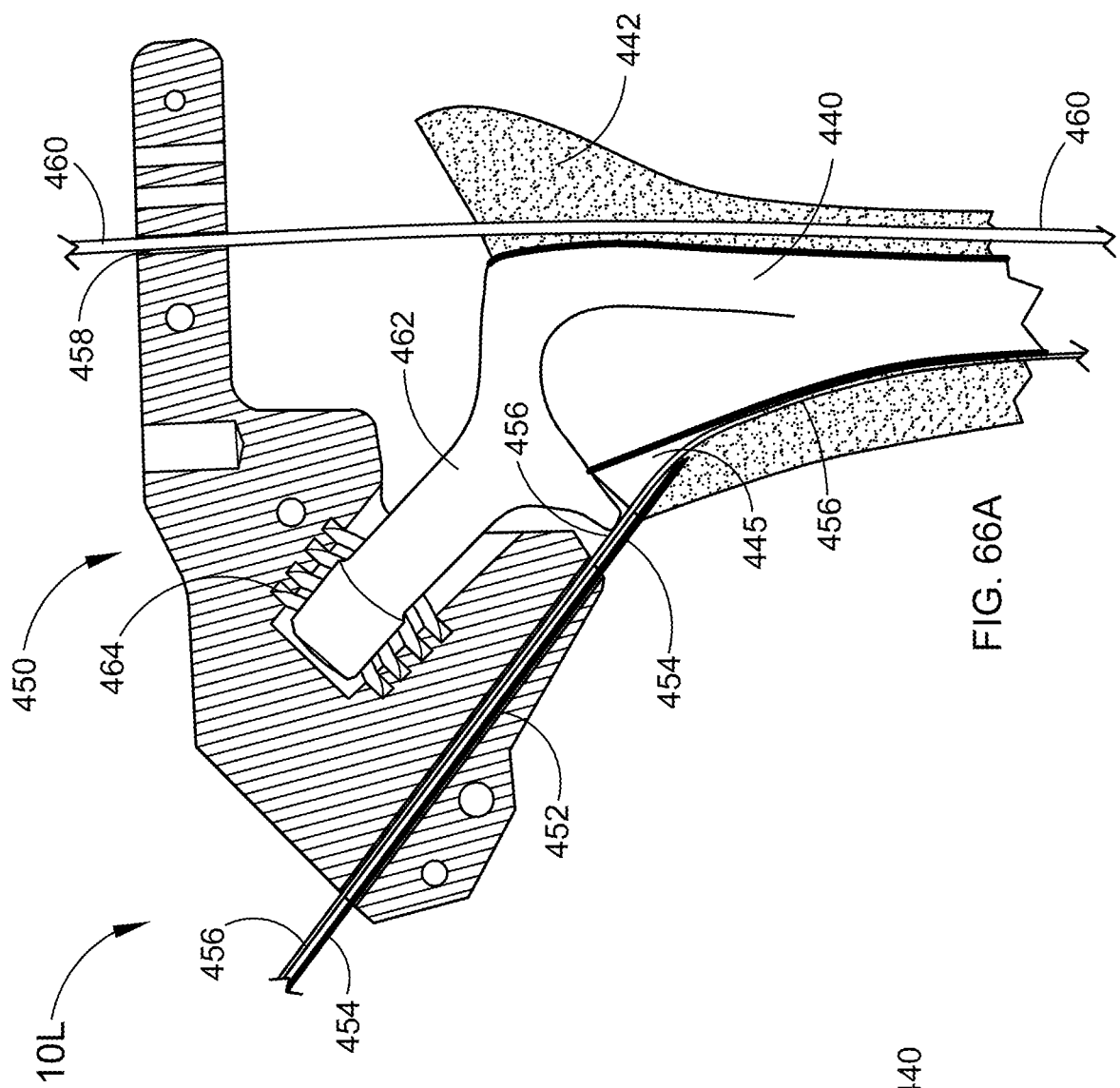
FIG. 66A depicts femoral stem extraction Step 3 showing a cross-sectional view of the surgical knife blade guide block having a single channel front slot, illustrating the position of a rigid surgical knife blade and a flexible surgical knife blade within the single slot and passing the collar to enter the removed bone triangle within a patient's femur, wherein the rigid surgical knife blade is extended downward reaching the stem, then backing off about 3-4 millimeters and the flexible surgical knife blade is guided to the stem by the rigid surgical knife blade and is extended downward cutting the cement material holding the stem in place within the femur.

FIG. 66A depicts femoral stem extraction Step 3 showing a cross-sectional view of a Joint Revision Surgery Apparatus 10L surgical knife blade guide block 450 having a single straight channel front slot 452, illustrating the position of a rigid surgical knife blade 454 and a flexible surgical knife blade 456. Step 3 involves the actual cutting of the cement on the interface between the collared stem and the patient's femur (represented by a heavy black line). This is accomplished by extending the flexible surgical knife blade 456 down the medial calcar of the collared stem 440 and cutting it away from the femur 442. The flexible surgical knife blade 456 is guided past the collar portion of the collared stem using the positioning of the rigid guide surgical knife blade 454. Once flexible surgical knife blade 456 is extended down to the lower portion of the collared stem 440, and surgical knife blade 460 is extended down the opposite side of the collared stem 440, the stem is then removable by pulling the stem upward and out of the patient's femur 442. This extraction is made possible by the retaining rings within the retaining ring cavity 464 secure the trunnion of the stem and enable its removal in an upward motion (see FIGS. 72 and 73). In summary, Step 1 cuts a triangle of femur bone below the collar, Step 2 sets the position of the guide blade, and Step 3 is the actual cutting of the medial calcar for removal of the collared stem.

Figure 66B:
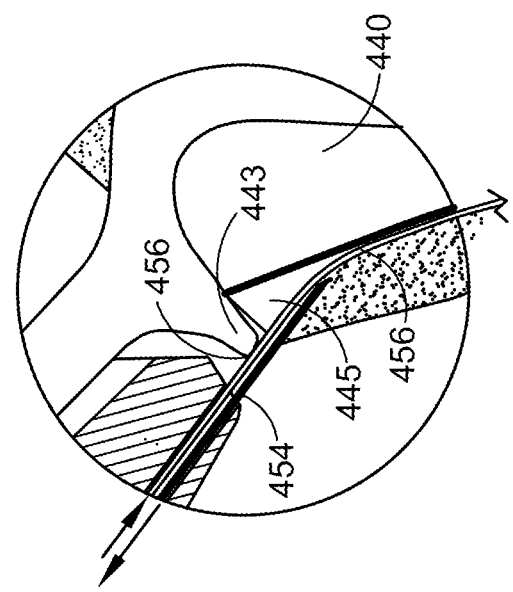
FIG. 66B depicts a partial magnified view of FIG. 66A showing greater detail and illustrating the positions of the lower surgical rigid knife blade which guides the flexible surgical knife blade and the upper flexible surgical knife blade which cuts through the cement on the surface of the stem.

FIG. 66B depicts a partial magnification of FIG. 66A femoral stem extraction Step 3 showing greater detail of the movement (see movement arrows) around the collared stem 440 and position of the surgical knife blades with respect to the removed triangle of bone 445, including the rigid lower guide blade 454 and the flexible upper cutting blade 456, and illustrating the positions of the lower surgical rigid knife blade 454 which guides the flexible surgical knife blade 456 and the upper flexible surgical knife blade extending past the collar portion 443 of the stem, downward along the stem 440 which cuts through the cement (heavy black line) on the surface of the stem 440 and between the interface of the stem 440 and the patient's femur 442 (see FIG. 66A). Therefore, Step 3 is the actual cutting stem enabling the removal of the collared stem.

FIG. 67 depicts a cross-sectional view of a Joint Revision Surgery Apparatus 10M and the surgical knife blade guide block 470 constructed of two half sections, with half section 472 seen here, having a single curved channel front slot 488 and multiple channel rear slots 484, illustrating the position of a rigid surgical knife blade 490 and a flexible surgical knife blade 492 extending downward within the single slot channel 488, and a surgical knife blade 486 extending downward through slot 484 on the opposite side of the stem 480 to be removed from the patient's femur 482. This a Joint Revision Surgery Apparatus 10101 has a slot channel 488 specifically shaped to be capable of accommodating a specialized tool for guiding the surgical knife blades down to the stem to be removed (see FIGS. 68 and 69). Additionally, this surgical knife blade guide block 470 having a single curved channel front slot 488 focus a retaining ring cavity 474 which enables retaining rings within the cavity 464 to secure the trunnion end 476 of the stem trunnion 478.

FIG. 68 depicts a front and top partial perspective view of the surgical knife blade block, including half sections 471 and 472, as seen in FIG. 67 illustrating the shape of the single curved channel front surgical knife blade slot 488 therein. The single curved channel front surgical knife blade slot 488 is specifically altered in shape 489, specifically extended to be larger on top and bottom of the curved slot 488, to accommodate a specialized surgical knife blade guide tool (see FIG. 69).

FIG. 69 depicts a top and side perspective view of a specialized surgical knife blade guide tool 494 which when its lower section 495 placed within the surgical knife blade slot 488 (see FIGS. 67 and 68) is used to act as a rigid guide for the flexible surgical knife blade which may be extended in one of two surgical knife blade slots 496 and 498 above or below the lower portion of the guide tool. When in use, the specialized surgical knife blade guide tool 494 is inserted into slot channel 488 and accommodates flexible knife blades in slot extension 489 when they are passed through slots 496 and 498 in the specialized surgical knife blade guide tool 494. In this regard, there is no requirement to use a rigid guide blade in the extraction of a femoral stem when the specialized surgical knife blade guide tool 494 is employed.

FIG. 70 depicts a cross-sectional view of the Joint Revision Surgery Apparatus 10N surgical knife blade guide block 500 constructed of two half sections 502 (and 501 not shown) having multiple channel front slots having a curved lower channel 504 and a straight upper channel 506 as well as multiple channel rear slots 512. FIG. 70 further illustrates the position of a curved rigid surgical knife blade 508 within lower curved channel 504 and a flexible surgical knife blade 510 extending downward within the straight upper channel 506 slot, and a surgical knife blade 514 extending downward on the opposite side of the stem 518 within the patient's femur to be removed. As shown here, flexible surgical knife blade 510 is extending down along the medial calcar to cut through the cement between the interface of the femur bone and the stem 518. Additionally, the trunnion end 516 of the stem 518 is secured by retaining rings within the retaining ring cavity 520 formed when surgical knife blade guide block 500 is assembled from two half sections with on half section represented here by half section 502.

FIG. 71 depicts a front and top partial perspective view of the surgical knife blade block 500 shown in FIG. 70 constructed of two half sections, namely, half section 501 and half section 502, illustrating the shape of the multiple channels 504 and 506 front surgical knife blade slots therein. Front lower surgical knife blade channel 504 is curved in shape to accommodate curved surgical knife blades, such as surgical knife blade 508 (see FIG. 70), whereas front upper surgical knife blade channel 506 is straight in shape to accommodate straight surgical knife blades such as surgical knife blade 510 (see FIG. 70).

Figure 72:
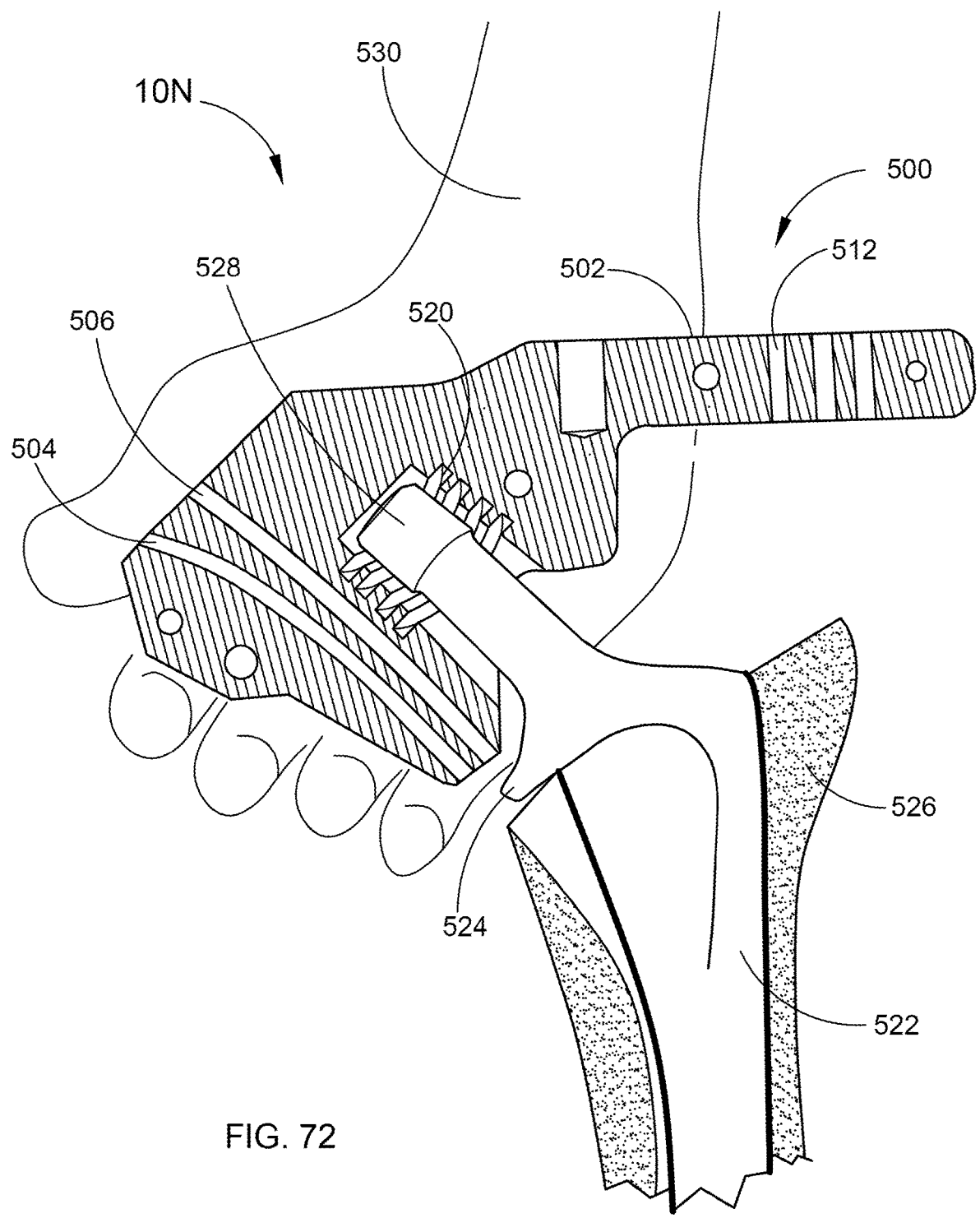
FIG. 72 depicts a cross-sectional view of the surgical knife blade guide block having a multiple channel front slot and multiple channel rear slots, illustrating the surgeon's hand grasping the surgical knife blade guide block to initiate removal of the stem after all stem cement cutting operations have been completed.

FIG. 72 depicts a cross-sectional view of the Joint Revision Surgery Apparatus 10N surgical knife blade guide block 500 having a multiple channel front slot 504 and 506 and multiple channel rear slots 512, illustrating the surgeon's hand grasping the surgical knife blade guide block 500 to initiate removal of the femoral stem 522 from the patient's femur bone 526 after all stem cement cutting operations have been completed by the rigid guide surgical knife blades and the flexible cutting surgical knife blades (not shown).

Figure 73:
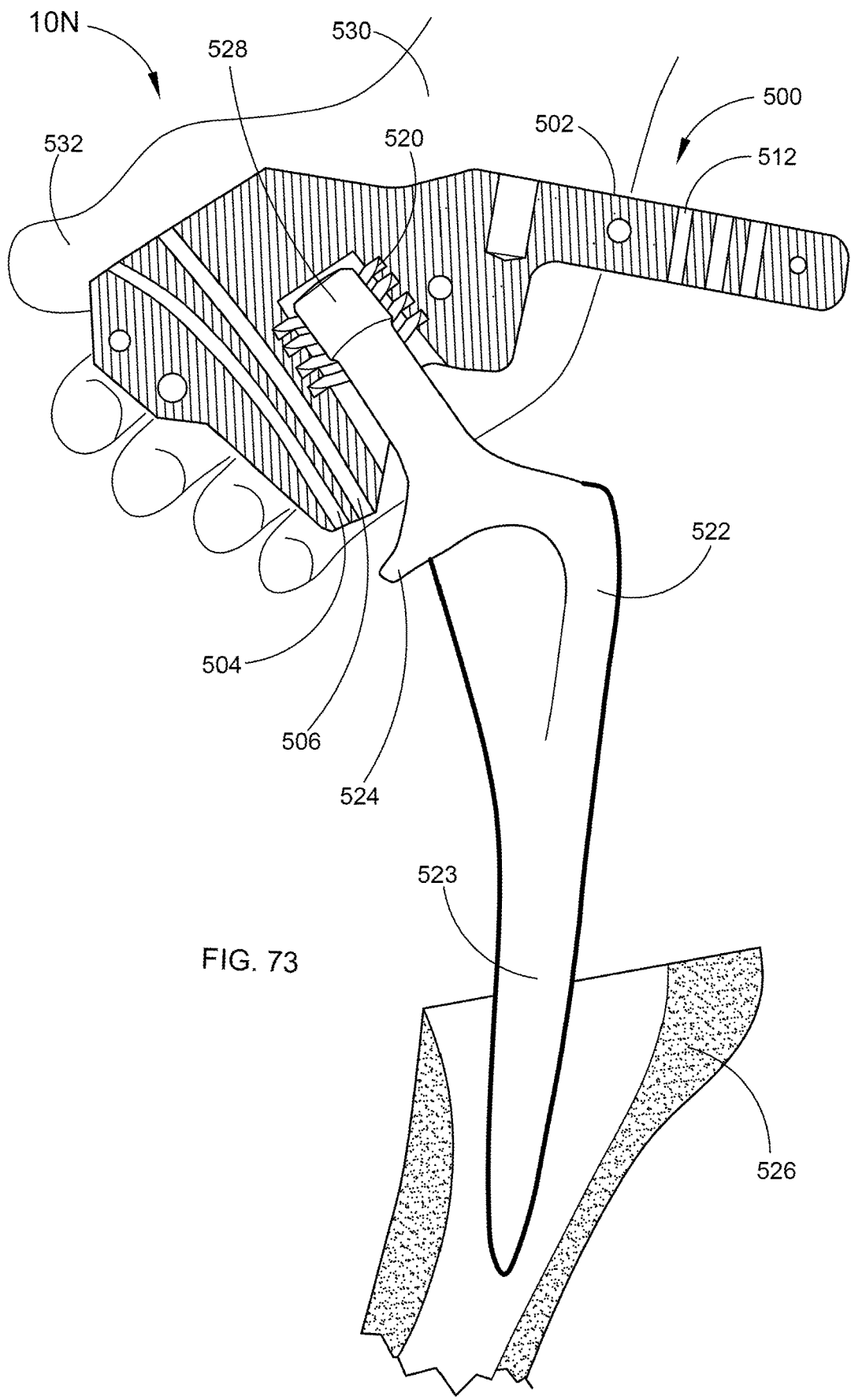
FIG. 73 depicts a cross-sectional view of the surgical knife blade guide block having a multiple channel front slot and multiple channel rear slots, illustrating the surgeon's hand grasping the surgical knife blade guide block to complete removal of the stem after all stem cement cutting operations have been completed.

FIG. 73 depicts a cross-sectional view of the Joint Revision Surgery Apparatus 10N surgical knife blade guide block 500 having a multiple channel front slots 504 and 506 and multiple channel rear slots 512, illustrating the surgeon's hand 530 grasping the surgical knife blade guide block 500 to complete removal of the femoral stem 522 lower section 523 from the patient's femur bone 526 after all stem cement cutting operations have been completed and the stem has been cut free of the femur. It is possible to pull out the collared stem because the upper trunnion section 520 is retained securely by the plurality of retaining rings within retaining ring cavity 520 (see FIG. 60 for the position of the retaining rings within the retaining ring cavity). If it is not possible to remove the stem by hand at this point, then a surgical hammer may be employed to tap upwardly on the surgical knife blade wide block 500.

FIG. 74 depicts a curved rigid surgical knife blade 540 with a shaft 542 and a mounting section 544 for attachment to an osteotome to act to guide a flexible cutting blade. This rigid surgical knife blade 540 is flexible in the lateral directions (see movement arrows).

FIG. 75 depicts a curved flexible cutting surgical knife blade 546 with a shaft 552 and a mounting section 554 for attachment to an osteotome to act to guide a flexible cutting surgical knife blade. The top portion 548 of this surgical knife blade 546 includes a plurality of protrusions 550 capable of cutting through tough cement found at the interface between the stem and the femur bone, which is typically used to originally affix the stem to the femur.

FIG. 76 depicts a longer length straight flexible cutting surgical knife blade 556 with a shaft 558 and a mounting section 560 for attachment to an osteotome, this knife blade 556 is used to cut through cement on the stem after being guided by any one of the disclosed rigid guide surgical knife blade.

FIG. 77 depicts another long flexible cutting surgical knife blade 562 with no shaft (all blade) and a mounting portion 564 for attachment to an osteotome used to cut through cement on longer implanted stems after being guided by the rigid guide surgical knife blade.

FIG. 78A depicts another long flexible surgical spoon shaped knife blade 566 with no shaft (all blade here) and a mounting section 572 for attachment to an osteotome, having a spoon shaped blade end 568 including a plurality of protrusions 570 on the cutting edge. This blade with protrusions is used to cut through tough cement on the interface of the stem and femur bone, after being guided by the rigid guide surgical knife blade.

FIG. 78B depicts an enlarged partial side view of the flexible surgical knife blade 566 shown in FIG. 78A, illustrating the blade end 568 having a plurality of protrusions 570 on the cutting edge, used to cut through tough cement on the interface of the stem and the femur bone after being guided by the rigid guide surgical knife blade.

FIG. 79 depicts a lateral side cutting blade 572 for extending down the lateral sides of a stem to be removed. This blade includes a shaft 574 and an osteotome mounting section 576. It is possible to use this blade mounted in an adjustable H-block guide block system configuration similar to that for a Prothesis Extraction Apparatus as disclosed in U.S. patent application Ser. No. 17/198,396, which US utility patent application, namely, U.S. patent application Ser. No. 17/198,396 is incorporated in its entirely by reference herein.

FIG. 80 depicts another lateral side cutting blade 578 for extending down the lateral sides of a stem to be removed. This blade includes a shaft 580 and an osteotome mounting section 582. It is possible to use this blade 578, in conjunction with the blade shown in FIG. 79 above 572, mounted in an adjustable H-block guide block configuration similar to that for a Prothesis Extraction Apparatus as disclosed in U.S. application Ser. No. 17/198,396, which US utility patent application, namely, U.S. patent application Ser. No. 17/198, 396 is incorporated in its entirely by reference herein.

FIG. 81 depicts another long flexible knife blade 584 having an elongated flexible blade section 586 in place of a shaft, and a mounting section 588 for attachment to an osteotome used to cut through cement on longer length stems after being guided by the rigid guide knife blade.

Figure 82:
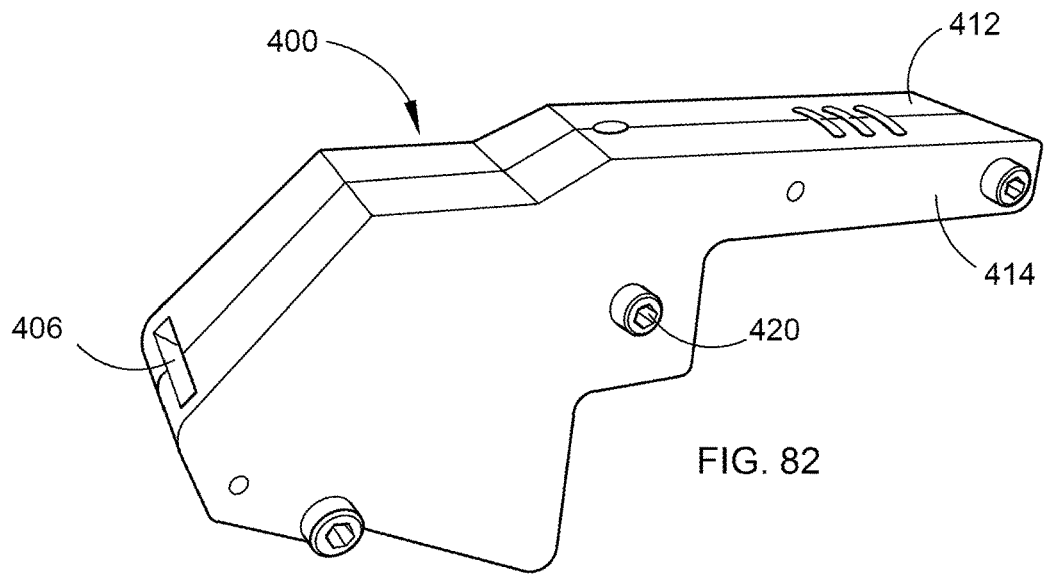
FIG. 82 depicts a top and side perspective view of an assembled surgical knife blade guide block illustrating the two-piece construction and the relative position of the surgical knife blade slots therein.

FIG. 82 depicts a top and side perspective view of the Joint Revision Surgery Apparatus 10K illustrating an assembled surgical knife blade guide block 400 illustrating the two-piece construction of half sections 412 and 414 having been affixed together using Allen screws 420, as well as the relative position of the surgical knife blade slots 406 and 410 therein which extend through the assembled body of the surgical knife blade guide block 400.

Figure 83:
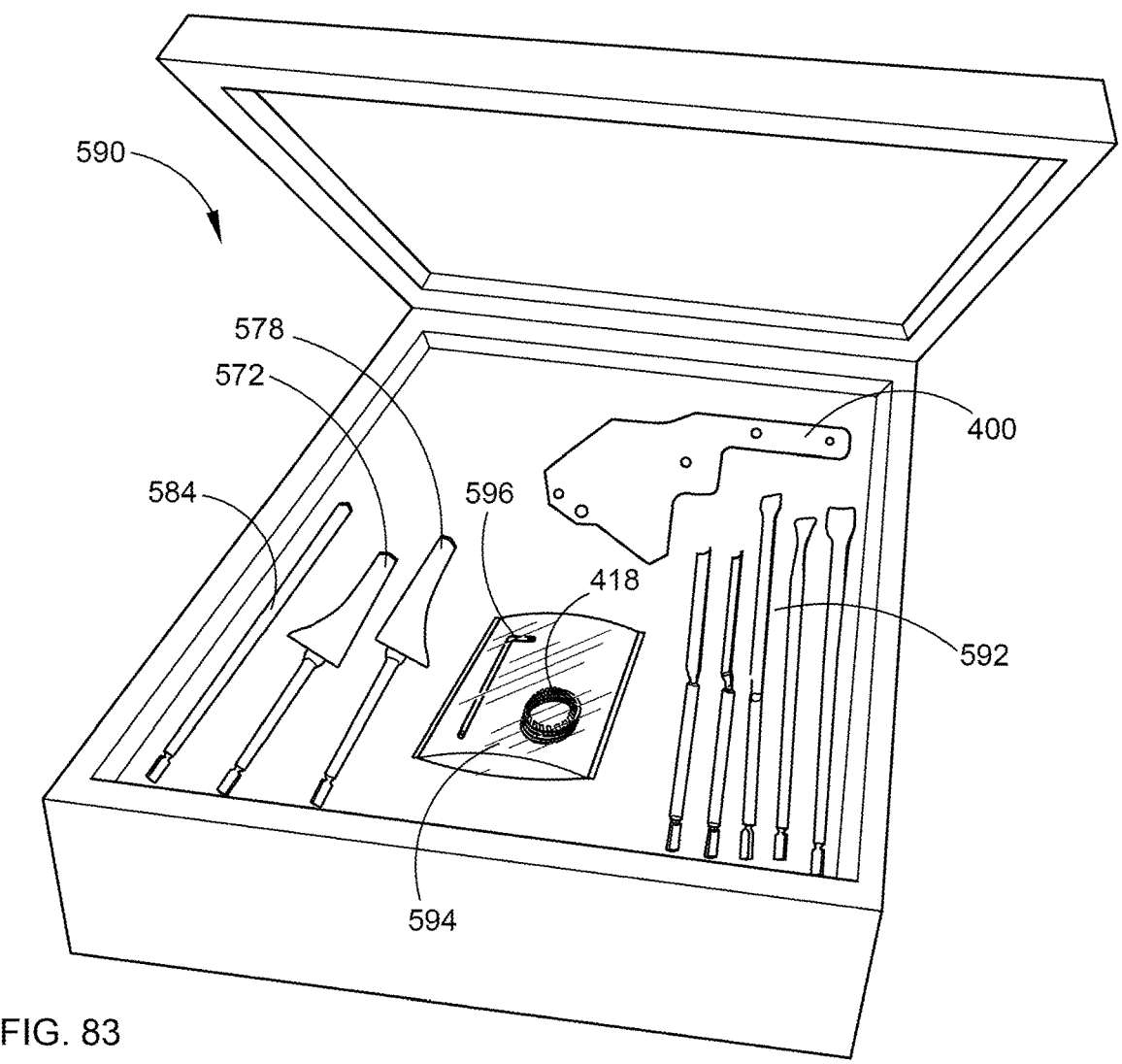
FIG. 83 depicts a boxed surgeon's hospital kit having all of the tools required for prosthesis extraction according to the present invention.

FIG. 83 depicts a boxed surgeon's hospital kit 590 having all of the tools required for prosthesis extraction assembled in one boxed kit, according to the present invention. Within the kit is a surgical knife blade guide block 400, a plurality of rigid guide blades and flexible cutting blades 592, and elongated cutting blade 584, lateral cutting blades 572 and 578 and a container 594 with spare parts and associated tools. The spare parts include a disassembly tool Allen wrench 596 and a plurality of extra retaining rings 418 of differing sizes, which when secured to stem trunnions, are not removable following extraction. Thus, the surgeon must disassemble the guide block half sections in order to remove the stem, trunnion, and retaining rings, then replace the retaining rings within the retaining ring cavity if continued sterilization and further use of the Joint Revision Surgery Apparatus is anticipated.

Figure 84:
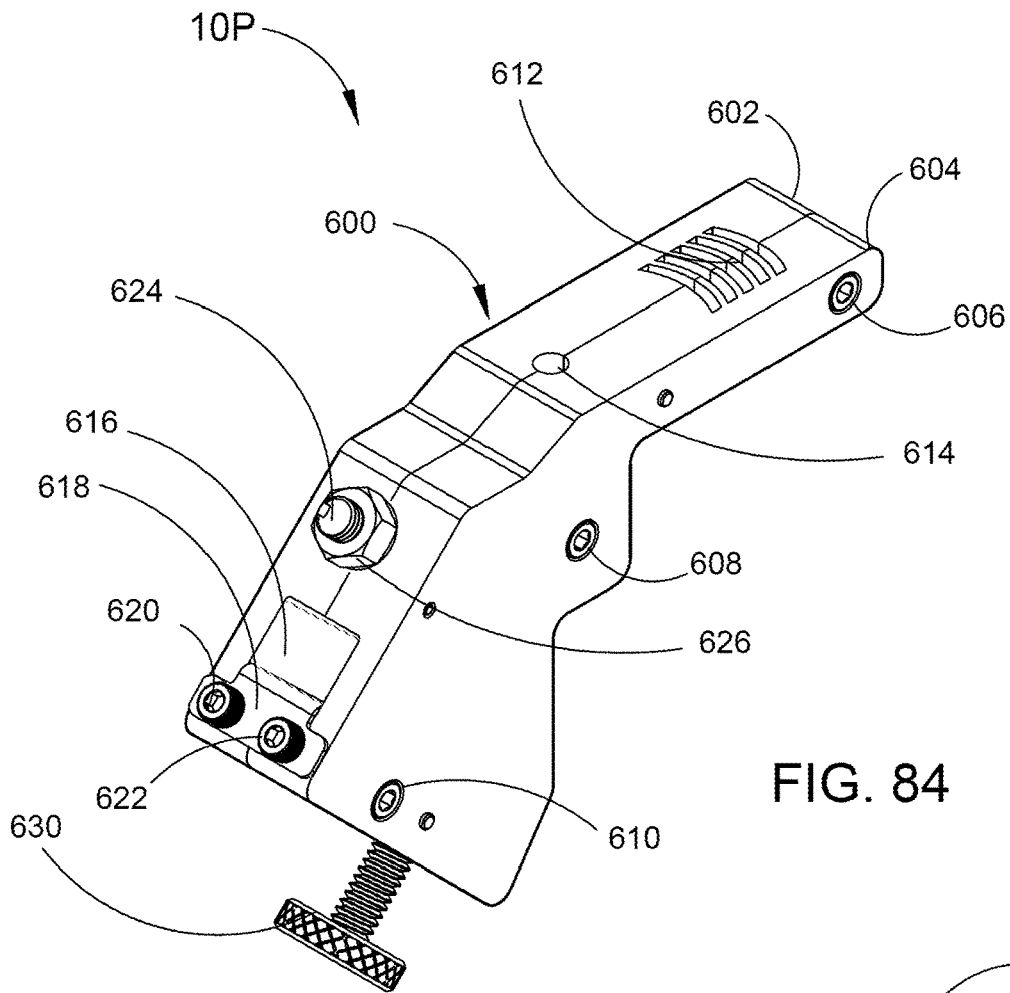
FIG. 84 depicts a top and side perspective view of an assembled surgical knife blade guide block illustrating the two-piece construction and the relative position of the surgical knife blade large forward slot with adjustable guide plate and the rearward multiple surgical knife blade slots therein.

FIG. 84 depicts a top and side perspective view of an assembled surgical knife blade guide block 10P illustrating the two-piece construction of the assembled surgical knife blade guide block 600 and the two pieces 602 and 604 which are secured together using Allen screws 606, 608 and 610. There are shown rearward knife blade slots 612 and a female threaded orifice 614. The relative position of the surgical knife blade large forward slot 616 with an adjustable guide pressure plate 618 is located in the forward section of the surgical knife blade guide block 600. The adjustable guide pressure plate 618 is secured using two Allen screws 620 and 622. The threaded upper portion of a stem trunnion securing member 624 is visible, and is adjustably attached to the assembled surgical knife blade guide block 600 by a securing nut 626. A knurled knob 630 is threaded through the assembled surgical knife blade guide block 600, and is used to adjust the adjustable guide pressure plate having upper portion 618 and lower portion 628 (not shown in FIG. 84). In addition to the two-piece construction of the assembled surgical knife blade guide block 600, it is anticipated that the surgical knife blade guide block of the present invention could be manufactured and formed in one piece by being molded or computer numerical control (CNC) formed from a piece of material, including but not limited to metal, plastic, wood, ceramic and composite.

Figure 85:
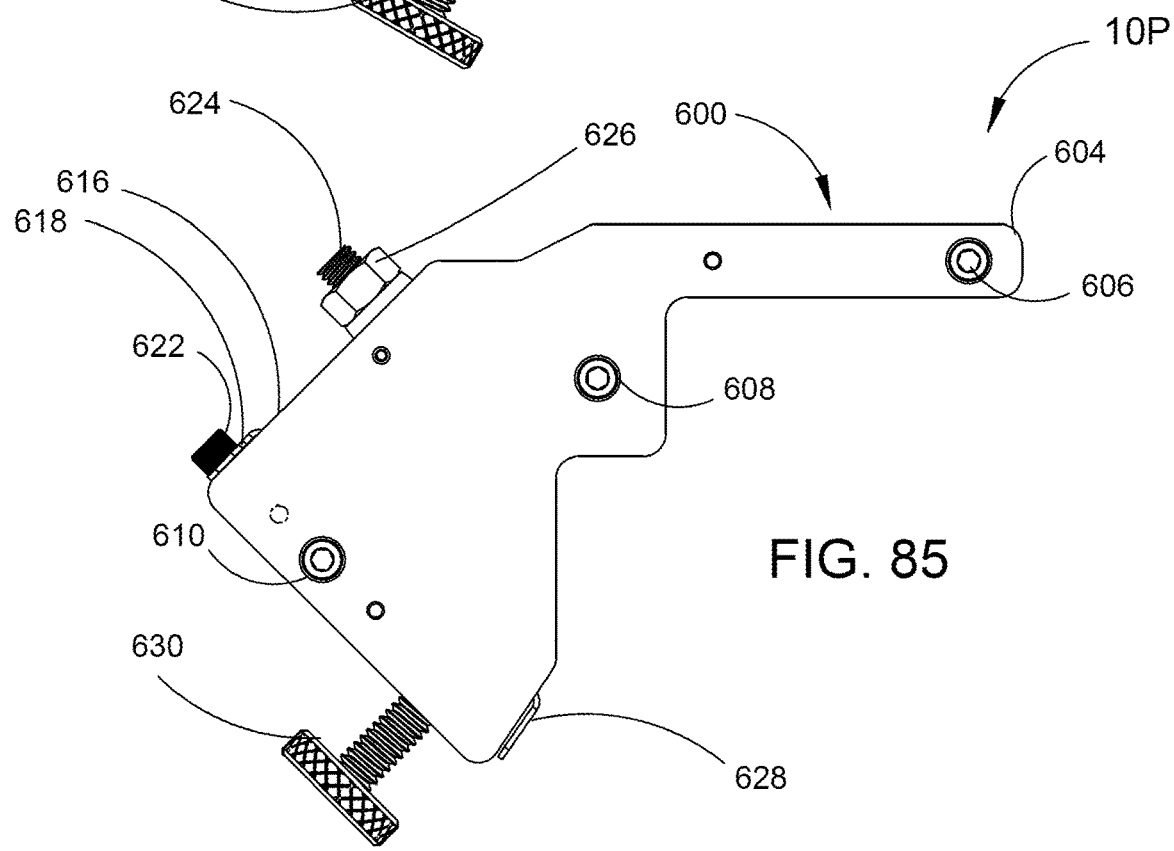
FIG. 85 depicts a right side view of an assembled surgical knife blade guide block illustrating the position of a knurled knob threaded plate adjustment screw and the adjustment plate mounting screws.

FIG. 85 depicts a right side view of an assembled surgical knife blade guide block 10P illustrating an assembled surgical knife blade guide block 600 and the position of a knurled knob threaded plate adjustment screw 630 and the adjustment plate mounting Allen screws 620 (not shown) and 622. The lower portion of the adjustable guide pressure plate 628 is visible on the bottom of the assembled surgical knife blade guide block 600.

Figure 86:
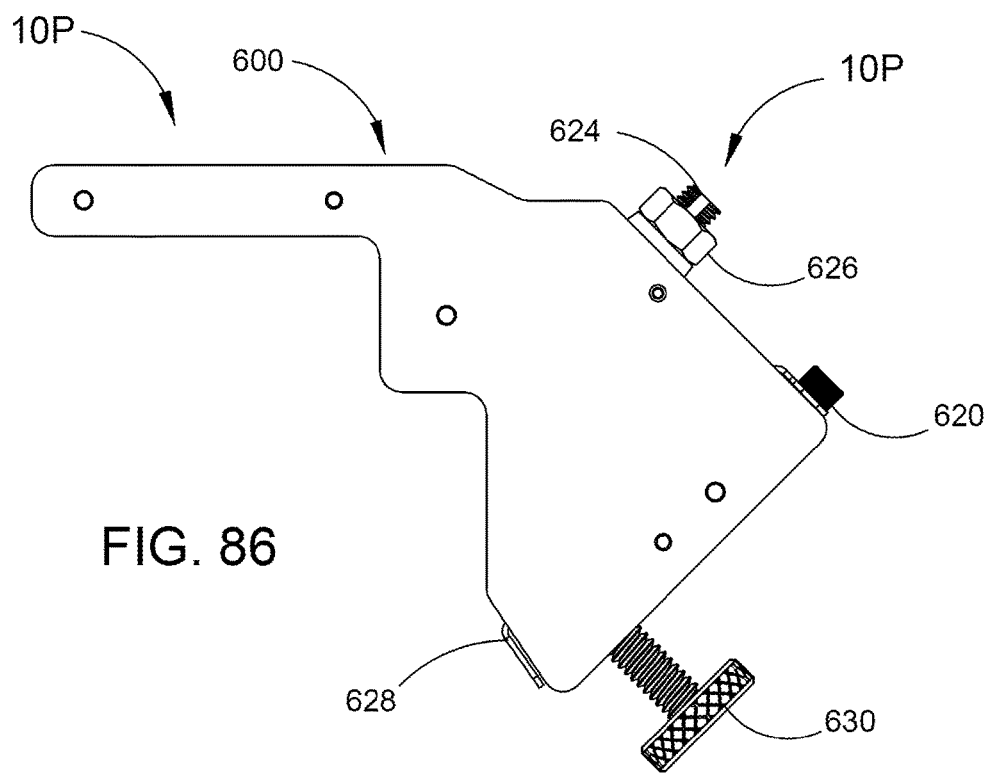
FIG. 86 depicts a left side view of an assembled surgical knife blade guide block illustrating the position of a knurled knob threaded plate adjustment screw and the adjustment plate mounting screws.

FIG. 86 depicts a left side view of an assembled surgical knife blade guide block 10P, the opposite view of FIG. 85, illustrating an assembled surgical knife blade guide block 600 and the position of a knurled knob threaded plate adjustment screw 630 and the adjustment plate mounting Allen screws 620 and 622 (not shown). The lower portion of the adjustable guide pressure plate 628 is visible on the bottom of the assembled surgical knife blade guide block 600. Also shown is the stem trunnion securing member 624 and the stem trunnion securing member 624 securing nut 626.

Figure 87:
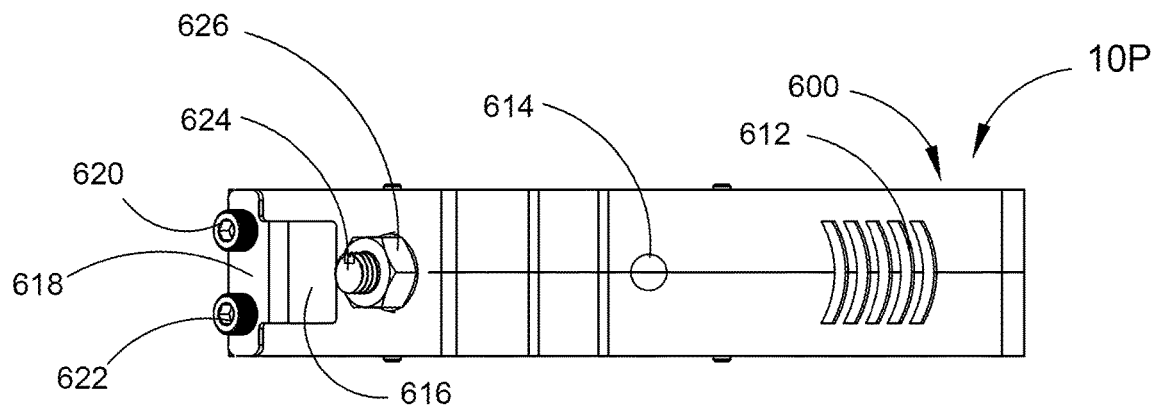
FIG. 87 depicts a top view of an assembled surgical knife blade guide block illustrating the position of a knurled knob threaded plate adjustment screw and the adjustment plate mounting screws.

FIG. 87 depicts a top view of an assembled surgical knife blade guide block 10P illustrating an assembled surgical knife blade guide block 600 and the position of the rearward knife blade slots 612 and a female threaded orifice 614, the adjustment plate mounting screws 620 and 622, and adjustable guide pressure plate 618 is secured using two Allen screws 620 and 622. Also shown is the stem trunnion securing member 624 and the stem trunnion securing member 624 securing nut 626.

Figure 88:
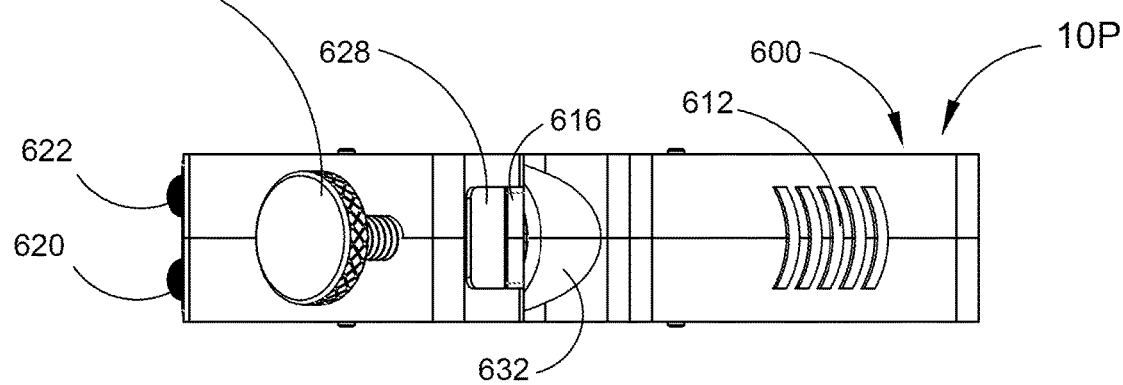
FIG. 88 depicts a bottom view of an assembled surgical knife blade guide block illustrating the position of a knurled knob threaded plate adjustment screw and the adjustment plate mounting screws.

FIG. 88 depicts a bottom view of an assembled surgical knife blade guide block 10P illustrating an assembled surgical knife blade guide block 600 and the position of the rearward knife blade slots 612 and a central cavity 632 to accommodate the stem trunnion securing member 624 (not shown, see FIG. 91 below), the adjustment plate mounting screws 620 and 622, the knurled knob 630, the lower portion of the adjustable guide pressure plate 628 located within the surgical knife blade large forward slot 616.

FIG. 89 depicts a rear perspective view of an assembled surgical knife blade guide block 10P illustrating an assembled surgical knife blade guide block 600 and the position of the surgical knife blade large forward slot 616 with the lower portion of the adjustable guide pressure plate 628 visible. Also shown is the stem trunnion securing member 624 located within central cavity 632, and secured to the assembled surgical knife blade guide block 600 by nut 626 (not shown, see FIG. 91 below). The upper portion adjustable guide pressure plate 618 is secured using two Allen screws 620 and 622. Knurled knob 630 is located in the lower front portion of the assembled surgical knife blade guide block 600.

FIG. 90 depicts a front perspective view of an assembled surgical knife blade guide block 10P illustrating an assembled surgical knife blade guide block 600 and the position of the surgical knife blade large forward slot 616. Also shown is the surgical knife blade large forward slot 616 with the location of the lower portion of the adjustable guide pressure plate 618 visible. The adjustable guide pressure plate 618 is secured using two Allen screws 620 and 622. The threaded upper portion of a stem trunnion securing member 624 is visible, and is adjustably attached to the assembled surgical knife blade guide block 600 by a securing nut 626. A knurled knob 630 is threaded through the assembled surgical knife blade guide block 600.

FIG. 91 depicts a cross-sectional view of the surgical knife blade guide block 10P illustrating the assembled surgical knife blade guide block 600 shown in FIG. 90. Here in FIG. 91 there is shown the position of the upper portion of the adjustable guide pressure plate 618 and the lower portion of the adjustable guide pressure plate 628 within the surgical knife blade large forward slot 616. Allen screws 620 and 622 (not shown) secure the upper portion of the adjustable guide pressure plate 618 and the lower portion of the adjustable guide pressure plate 628 is actuated inwardly and outwardly by turning the threaded knurled knob 630. It is anticipated that the two Allen screws 620 and 622 could also be used to adjust the position of the adjustable guide pressure plate 616 and 628 in the upwardly (superior) and downwardly (inferior) directions, thereby making superior and inferior adjustments of the guide pressure plate possible. In addition, the stem trunnion securing member 624 is secured to the assembled surgical knife blade guide block 600 within the large central cavity 632 by nut 626, and when the nut 626 is tightened, this tightens the stem trunnion securing member 624 onto the stem trunnion to be removed (not shown, see FIG. 95 below). Also shown here in FIG. 91 is the rearward knife blade slots 612 and a female threaded orifice 614. The female threaded orifice 614 is used to secure an eyebolt or hook to facilitate removal of a stem from a femur during joint revision surgery. It is anticipated that this female threaded orifice 614 could also receive a surgical slap hammer directly threaded into the surgical knife blade guide block without the use of an attached eyebolt or hook.

Figure 92:
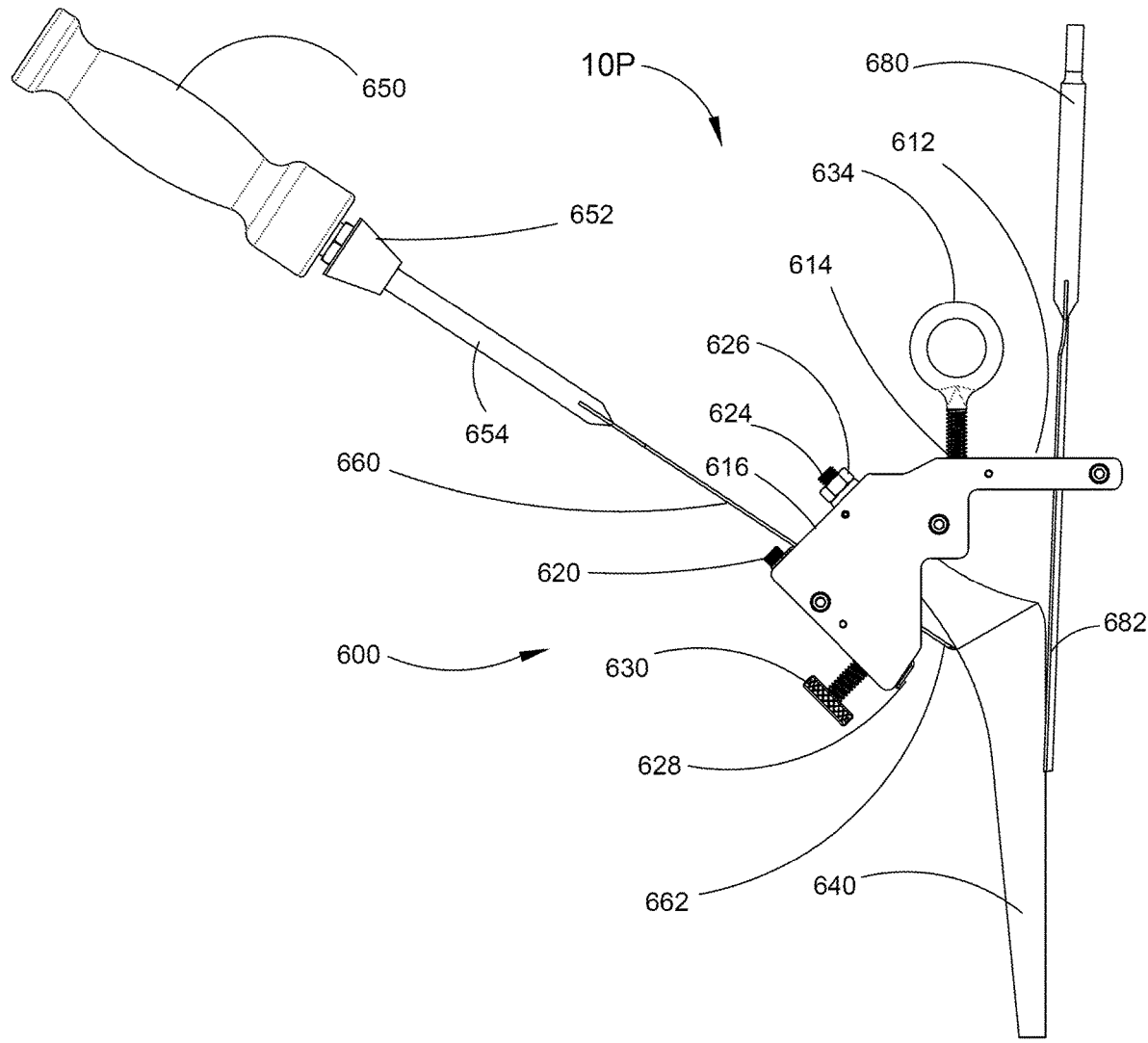
FIG. 92 depicts a right side view of an assembled surgical knife blade guide block illustrating the position of a forward inserted flexible cutting blade, adapter and handle and a rearward inserted rigid cutting blade.

FIG. 92 depicts a right side elevational view of an assembled surgical knife blade guide block 10P illustrating the assembled surgical knife blade guide block 600 in position for use in joint revision surgery. The stem trunnion securing member 624 is secured to the assembled surgical knife blade guide block 600 within the large central cavity 632 by nut 626, and when the nut 626 is tightened, this tightens the stem trunnion securing member 624 onto the stem. A cutting blade handle 650 is attached to a blade/handle adapter 652 which allows for the connecting of various forward flexible cutting blades 660 as required. The flexible lower portion 662 of flexible cutting blade 660 extends through the assembled surgical knife blade guide block 600 and rests on the stem 640 to be removed during joint revision surgery. Rigid cutting blade 680 extends down through blade slots 612 to allow the rigid lower portion 682 of rigid cutting blade 680 to cut the stem 640 away from the bone (not shown). Eye bolt 634 has been threaded into threaded orifice 614 to facilitate the removal of the stem 640. The next step involves rotating the knurled knob 630 to actuate the lower portion of the adjustable guide pressure plate 628 is actuated inwardly. This operation will align the flexible lower portion 662 of flexible cutting blade 660 to properly slide downwardly along the medial surface of the stem 640.

This FIG. 92 represents Step 1 of the stem removal process: securing the stem trunnion to the stem trunnion securing member 624 to the assembled surgical knife blade guide block 600, and inserting the rearward and forward cutting blades into rearward blade slots 612 and the surgical knife blade large forward slot 616, respectively.

Figure 93:
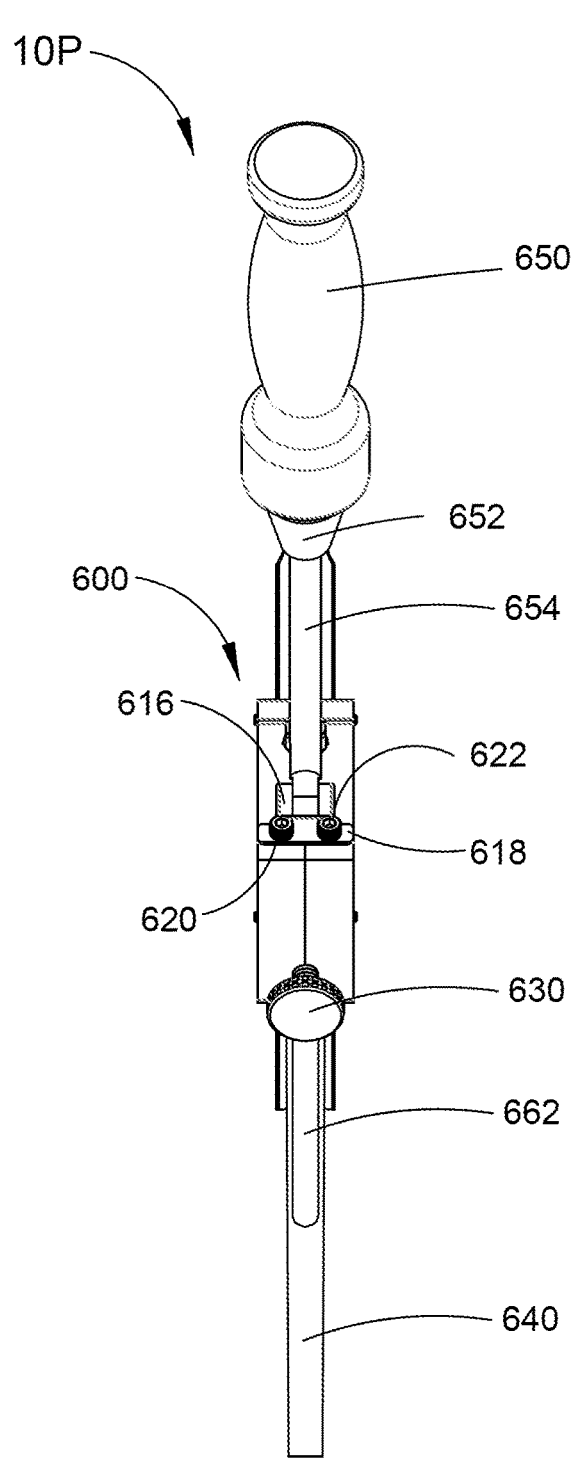
FIG. 93 depicts a front view of an assembled surgical knife blade guide block illustrating the position of a rearward inserted rigid cutting blade.

FIG. 93 depicts a front view of an assembled surgical knife blade guide block 10P illustrating an assembled surgical knife blade guide block 600 and the position of the forward inserted flexible cutting blade 660 extended down into the surgical knife blade large forward slot 616. The flexible cutting blade 660 is attached to a blade/handle adapter 652 which is connected to a handle 650. The lower portion 662 of the flexible cutting blade 660 is in contact with the medial surface of stem 640. Allen screws 620 and 622 secure the upper portion of the adjustable guide pressure plate 618. Knurled knob 630 is used to actuate the pressure plate inwardly or outwardly when rotated clockwise or counterclockwise. When rotated clockwise, the knurled knob 630 moves the lower portion of the adjustable guide pressure plate 628 inward to put pressure on the inserted lower portion of the flexible cutting blade 662.

Figure 94:
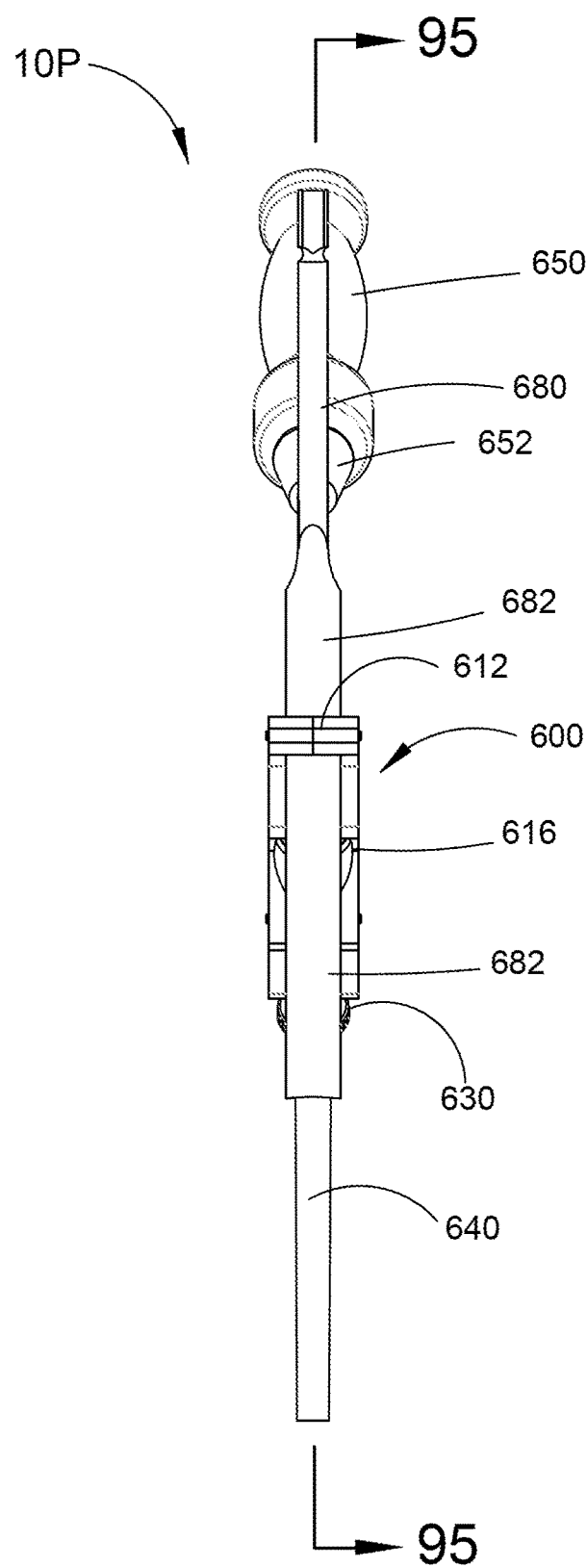
FIG. 94 depicts a rear view of an assembled surgical knife blade guide block illustrating the position of a rearward inserted rigid cutting blade.

FIG. 94 depicts a rear view of an assembled surgical knife blade guide block 10P illustrating an assembled surgical knife blade guide block 600 and the position of a rearward inserted rigid cutting blade 680 extending through blade slots 612. The lower portion 682 of rigid cutting blade 680 extends through blade slots 612 to make contact with the surface of the stem 640 to be removed in joint revision surgery. The lower portion 682 of rigid cutting blade 680 is extended through blade slots 612 at a distance needed to cut the surface of the stem and thereby extract the stem from the bone. This distance will vary depending on the overall length of the stem to be extracted.

Figure 95:
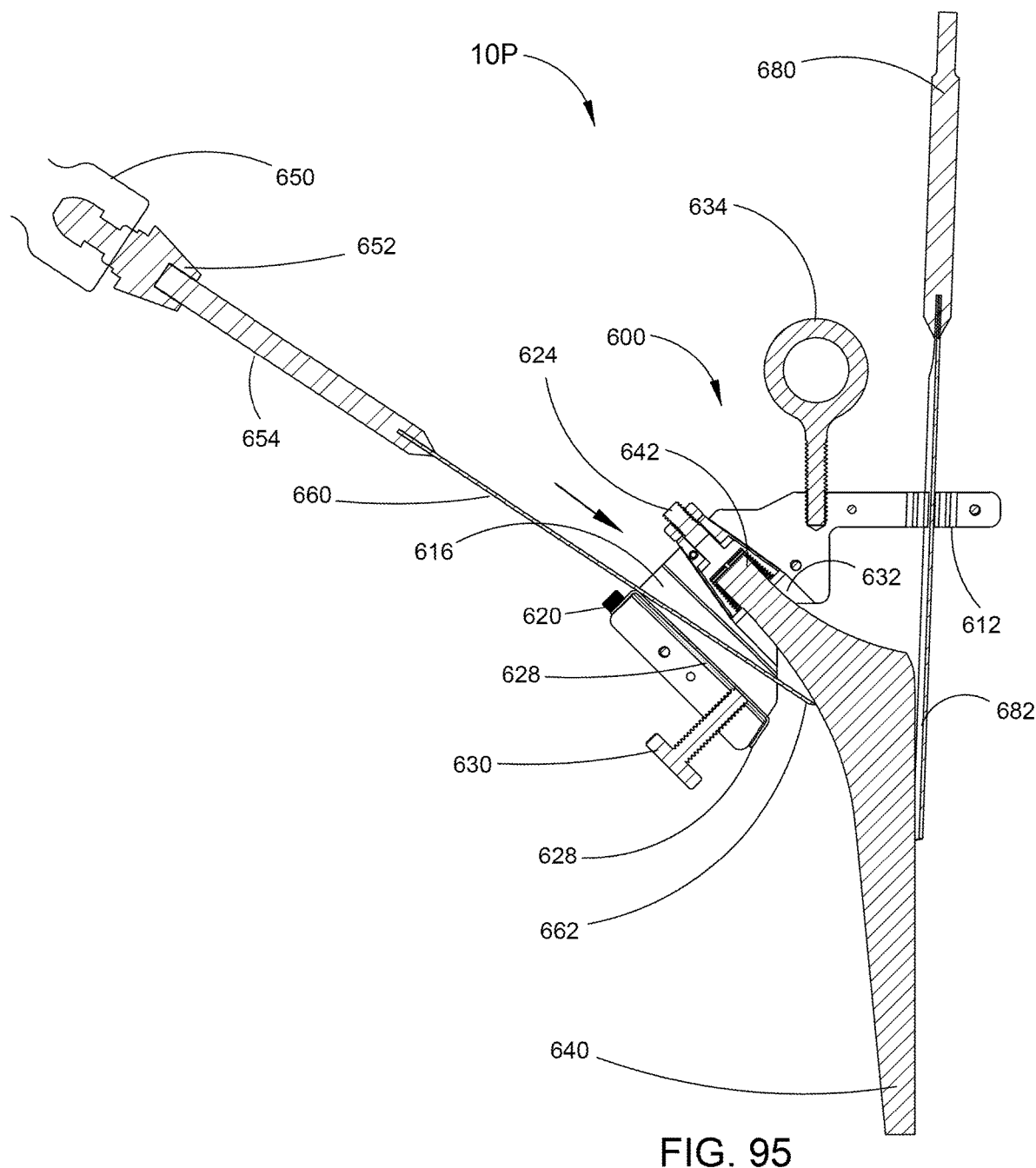
FIG. 95 depicts a cross-sectional view of the surgical knife blade guide block illustrating the position of the knurled knob threaded plate adjustment screw, adjustment plate, a forward inserted flexible cutting blade, adapter and handle, a rearward inserted rigid cutting blade and a stem trunnion securing piece within a central cavity, shown in FIG. 94.

FIG. 95 depicts a cross-sectional view of the surgical knife blade guide block 10P illustrating the position of the assembled surgical knife blade guide block 600, shown in FIG. 94. This represents Step 1 of the stem removal process, namely, securing the stem trunnion 642 to the stem trunnion securing member 624 to the assembled surgical knife blade guide block 600, and inserting the rearward and forward cutting blades into rearward blade slots 612 and the surgical knife blade large forward slot 616, respectively. Once the stem trunnion 642 is secured to the assembled surgical knife blade guide block 600 and nut 626 is tightened to firmly hold the stem trunnion 642 with cavity 632, then rigid cutting blade 680 is extended through guide slots 612 and flexible cutting blade 660 is extended through surgical knife blade large forward slot 616. Once the stem trunnion is secured, and the cutting blades are in position, the surgeon is ready to move on to Step 2.

Figure 96:
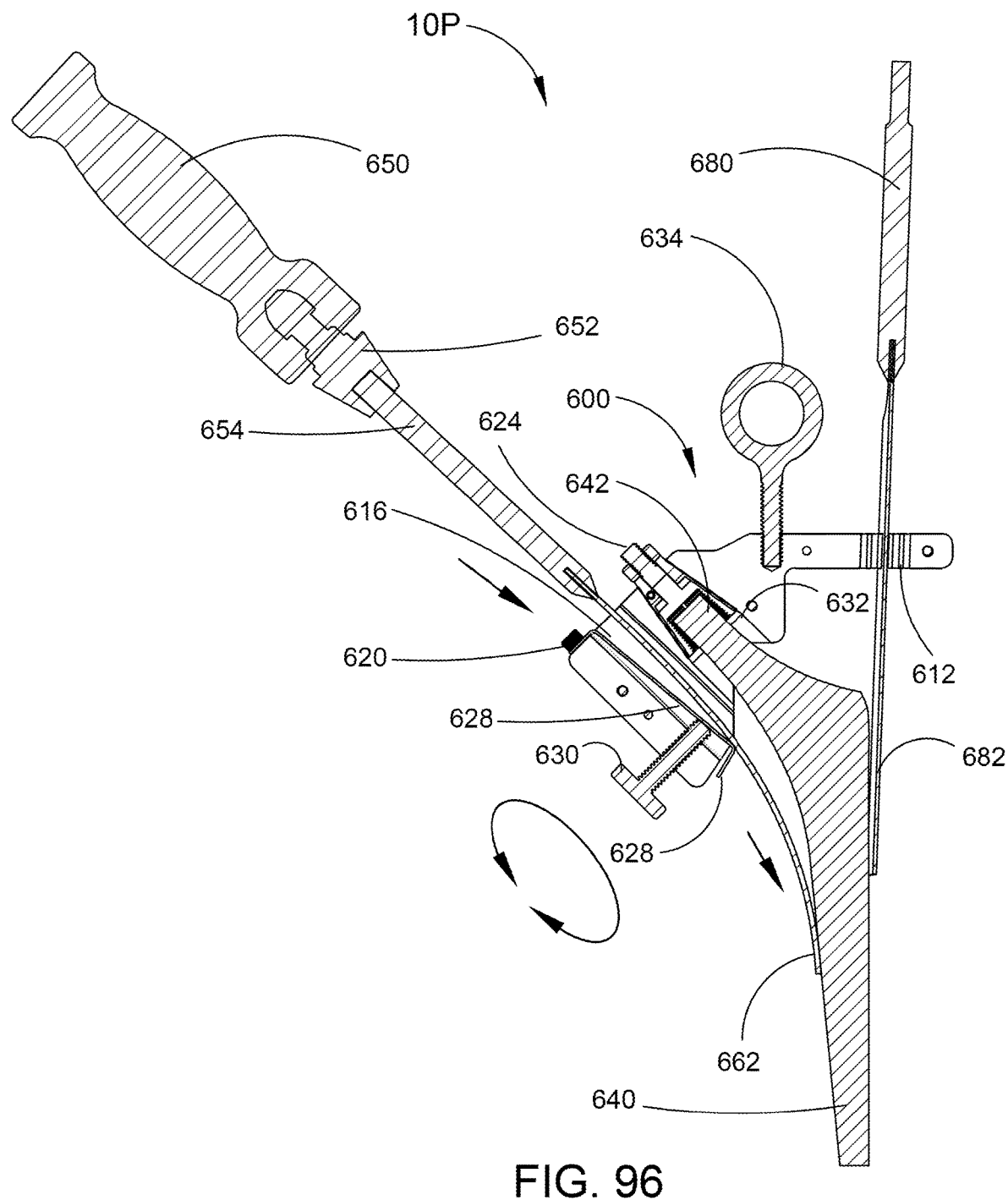
FIG. 96 depicts another cross-sectional view of the surgical knife blade guide block illustrating the position of the knurled knob threaded plate adjustment screw, adjustment plate, a forward inserted flexible cutting blade, adapter and handle, a rearward inserted rigid cutting blade and a stem trunnion securing piece within a central cavity, shown in FIG. 94.

FIG. 96 depicts another cross-sectional view of the surgical knife blade guide block 10P illustrating the position of the assembled surgical knife blade guide block 600, shown in FIG. 94. This represents Step 2 in which the knurled knob 630 is rotated (see direction arrows) to actuate the lower portion of the adjustable guide pressure plate 628 inward to put pressure on the inserted lower portion of the flexible cutting blade 662. The flexible cutting blade 660 is then extended downward (see direction arrows) to begin cutting the stem 640 away from the bone. In this Step 2, the knurled knob 630 is rotated clockwise to actuate the adjustable guide pressure plate 628 inwardly to put pressure on the inserted lower portion of the flexible cutting blade 662. In this way, the flexible cutting blade cuts closely along the medial surface of the stem to be removed, in between the stem and the bone right at the stem/bone interface. This allows for a very fast and efficient extraction of the stem with significantly less blood loss by the patient.

Figure 97:
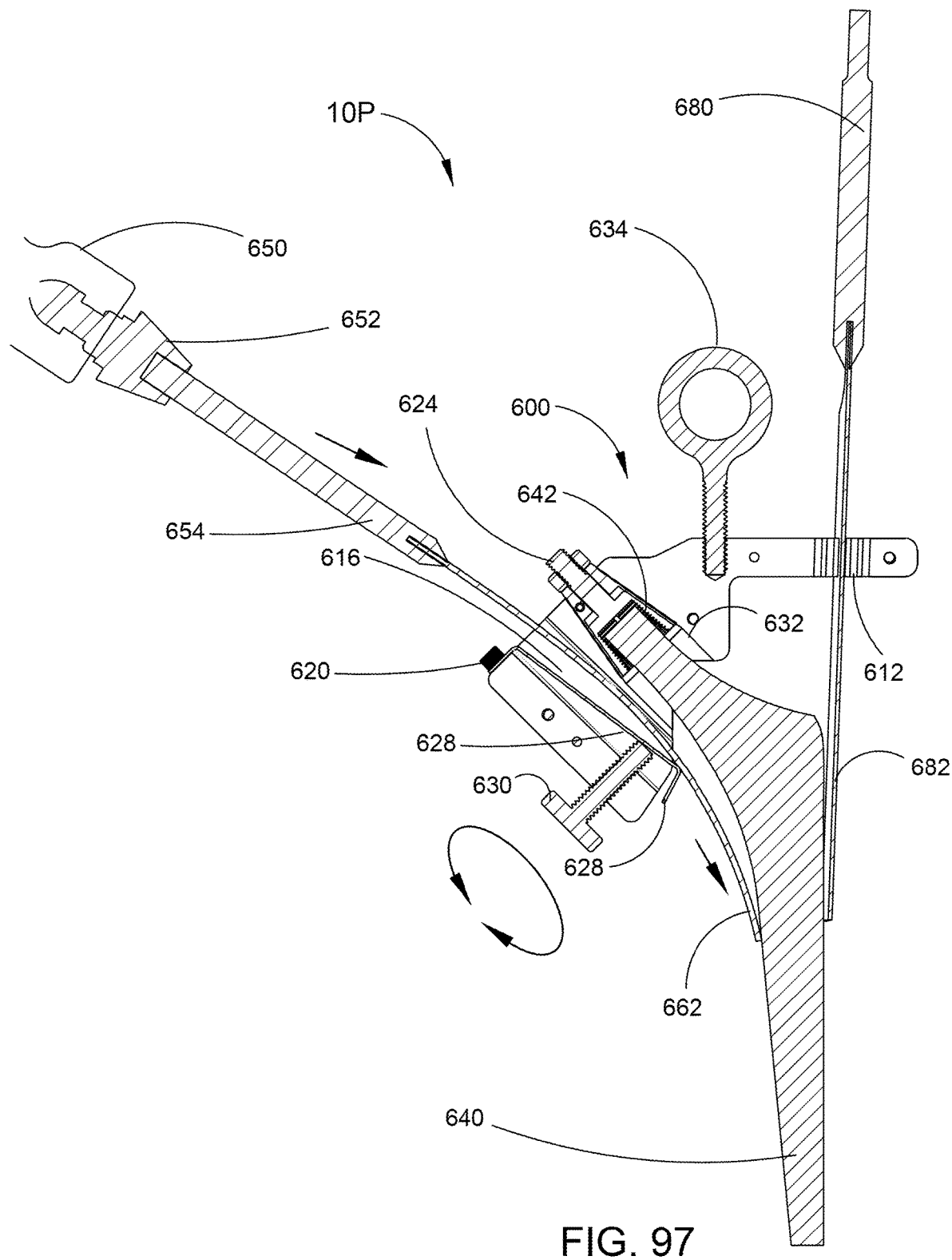
FIG. 97 depicts another cross-sectional view of the surgical knife blade guide block illustrating the position of the knurled knob threaded plate adjustment screw, adjustment plate, a forward inserted flexible cutting blade, adapter and handle, a rearward inserted rigid cutting blade and a stem trunnion securing piece within a central cavity, shown in FIG. 94.

FIG. 97 depicts another cross-sectional view of the surgical knife blade guide block 10P illustrating the position of the assembled surgical knife blade guide block 600, shown in FIG. 95. This represents Step 3 in which the knurled knob 630 is rotated to actuate the lower portion of the adjustable guide pressure plate 628 further inward to put the maximum desired pressure on the inserted lower portion of the flexible cutting blade 662. In operation, when maximum pressure is applied to the flexible cutting blade 660 by the lower portion of the adjustable guide pressure plate 628, through the adjustment rotation of knurled knob 630, the blade is effectively guided down the medial surface of the stem 640 to be removed. The length and flexibility of the flexible cutting blade 660 allows the medial surface of the stem 640 to be fully detached from the bone, facilitating fast and efficient removal of the stem 640. Because the operation is quick, there is significantly less blood loss by the patient.

Figure 98:
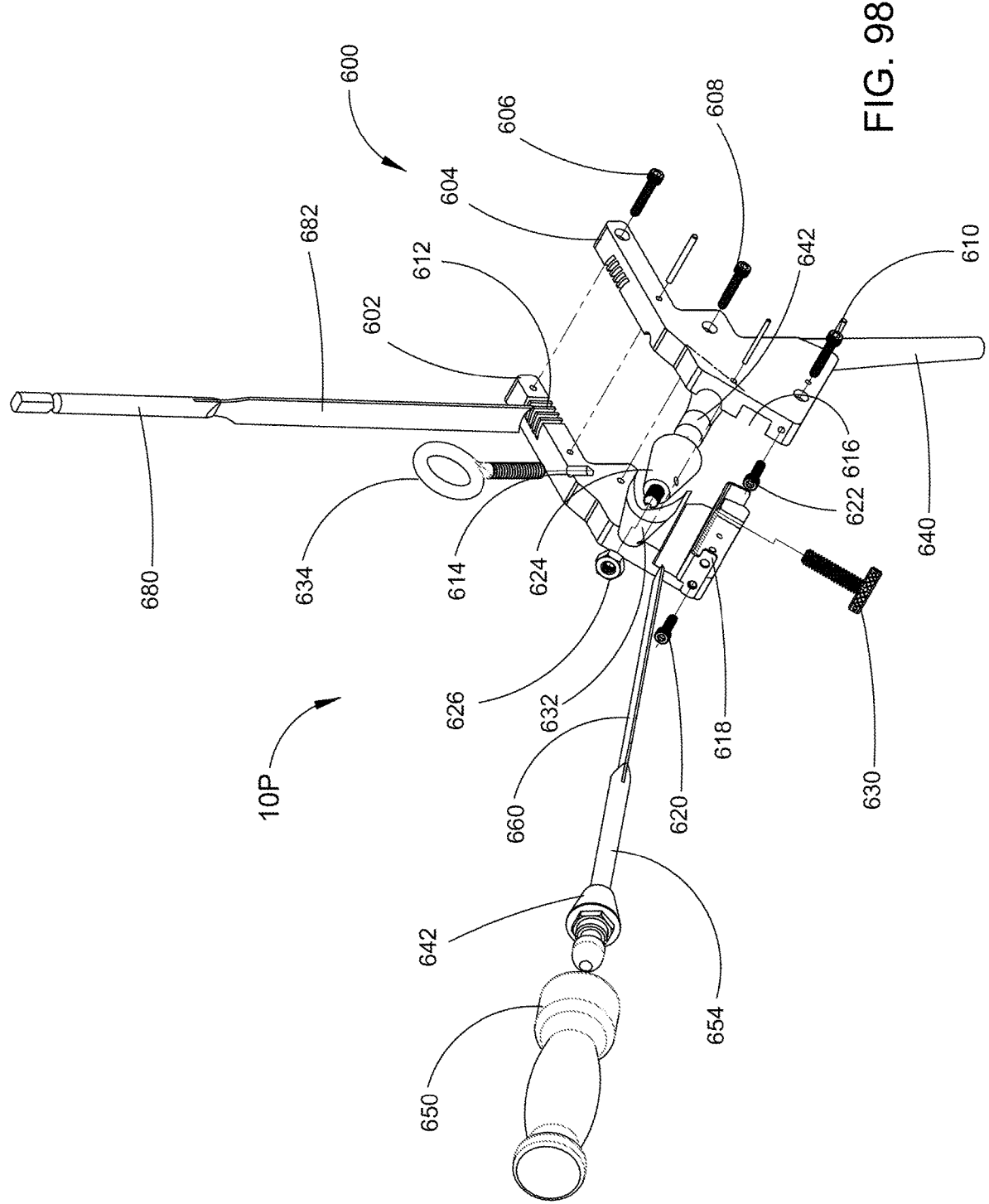
FIG. 98 depicts an exploded perspective view of an assembled surgical knife blade guide block illustrating the position of the knurled knob threaded plate adjustment screw, adjustment plate, a forward inserted flexible cutting blade, adapter and handle, a rearward inserted rigid cutting blade and a stem trunnion securing piece within a central cavity.

FIG. 98 depicts an exploded perspective view of 10P a disassembled surgical knife blade guide block 600 illustrating the position of the knurled knob threaded plate adjustment screw 630, the surgical knife blade large forward slot 616, adjustable guide pressure plate 618 is secured using two Allen screws 620 and 622, a forward flexible cutting blade 660, blade adapter 652 and handle 650, a rearward rigid cutting blade 680 with lower portion 682, and a stem trunnion securing member 624 within a central cavity 632. Also shown is the two-piece construction of the assembled surgical knife blade guide block 600 and the two pieces 602 and 604 which are secured together using Allen screws 606, 608 and 610. There is also shown the rearward knife blade slots 612 and a female threaded orifice 614 for accommodating a hook or eyebolt 634. The relative position of the surgical knife blade large forward slot 616 with an adjustable guide pressure plate 618 is located in the forward section of the surgical knife blade guide block 600. An eye bolt 634 is shown above the threaded orifice 614 used for securing the eye bolt 634 to the assembled surgical knife blade guide block 600.

Figure 99:
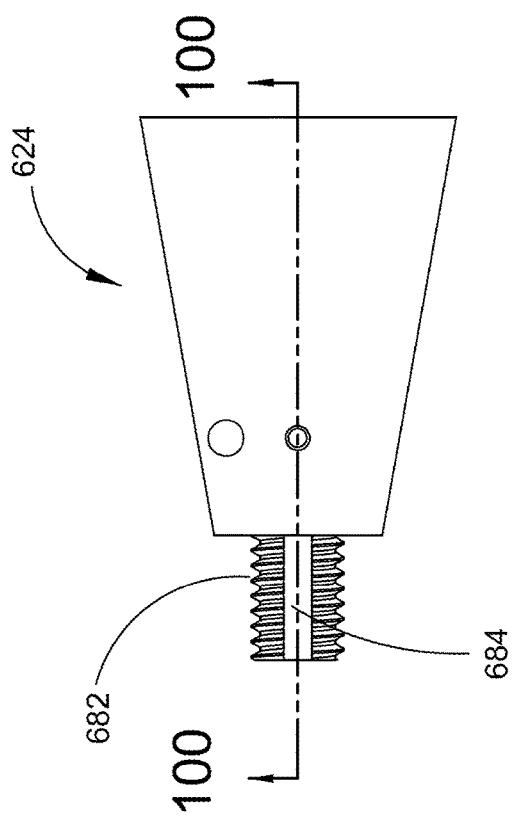
FIG. 99 depicts a side view of a stem trunnion securing piece.

FIG. 99 depicts a side elevational view of a stem trunnion securing piece 624 having a threaded portion 682 and a groove 684 running the length of the threaded portion 682. The stem trunnion securing piece 624 is conical in shape and tapers from a large diameter to a small diameter towards the threaded portion 682. The groove 684 is used to orient mounting the stem trunnion securing piece 624 within the central cavity 634 and when mounted, to keep the stem trunnion securing piece 624 from rotating during operation.

Figure 100:
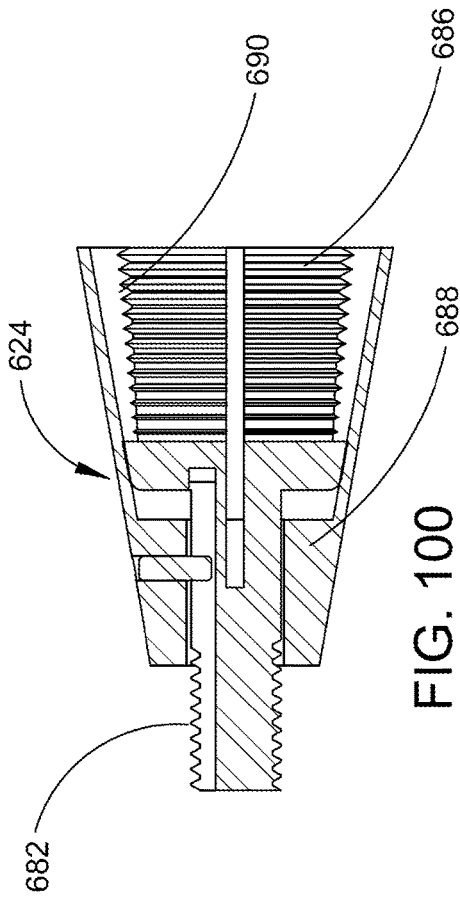
FIG. 100 depicts a cross-sectional view of the stem trunnion securing piece, as shown in FIG. 99.

FIG. 100 depicts a cross-sectional view of the stem trunnion securing piece 624, as shown in FIG. 99. The stem trunnion securing piece 624 has a partially hollow body 688, having a ribbed inner portion 686 running roughly half way from the large diameter to the small diameter proximal to the threaded portion 682. Within the outer body 688 of the stein trunnion securing piece 624 is a ribbed inner portion 686 having a plurality of circular ribs 690 thereon. The ribbed inner portion 686 is slidably affixed to the outer body. The ribbed inner portion 690 within the hollow section 686 also has exterior slots (not shown, see FIG. 101 below). When the nut 626 is placed on the threaded portion 682 and tightened, this moves the inner ribbed portion 686 upwardly the outer body 688 of the stem trunnion securing piece 624 and tightens the stem trunnion securing piece 624 around the stem trunnion 642. by decreasing the overall diameter of the inner ribbed portion 686. See further description of this operation below.

Figure 101:
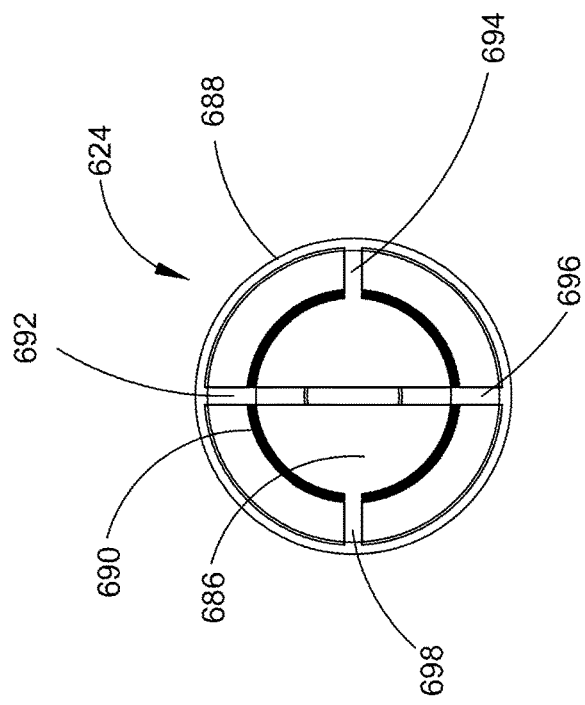
FIG. 101 depicts a bottom view of a stem trunnion securing piece.

FIG. 101 depicts a bottom view of a stem trunnion securing piece 624 illustrating the outer body 688 and the inner ribbed portion 690 within the hollow section 686. Four slots 692, 694, 696 and 698 are located at 90 degrees from each other around the ribbed inner portion 686. In operation, the stem trunnion securing piece 624 is placed on the stem trunnion 642 and the plurality of circular ribs 690 make contact with the stem trunnion 642 upper section. When the nut 626 is placed on the threaded portion 682 and tightened, this moves the inner ribbed portion upwardly in the outer body 688 and tightens the stem trunnion securing piece 624 around the stem trunnion 642 by decreasing the overall diameter of the ribbed inner portion 686 around the stem trunnion. The four slots 692, 694, 696 and 698 pinch together and the slot gap distance decreases as the nut 626 is tightened and the inner ribbed portion 686 moves relative to the outer body 688. This effectively tightly and securely clamps the stem trunnion securing piece 624 to the stem trunnion 642. Once secured, the stein trunnion 642 cannot be released from the stem trunnion securing piece 624 until the nut 626 is loosened and the diameter of the ribbed inner portion 686 is increased to its original size. The nut 626 may be tightened and loosened using a standard wrench, such as a 10 mm box wrench.

Figure 102:
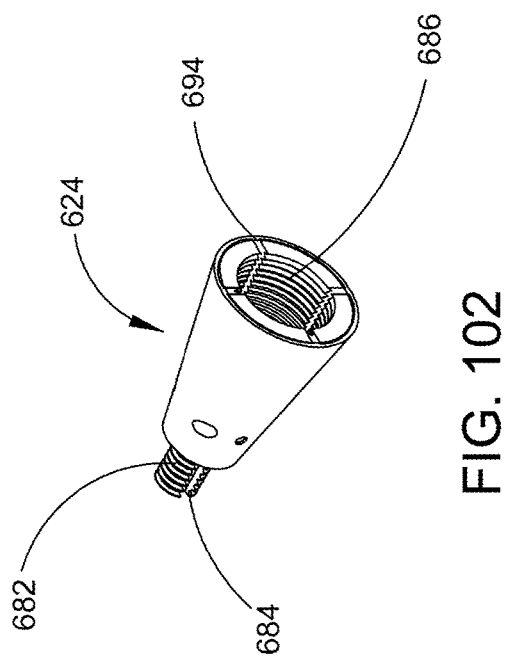
FIG. 102 depicts a side perspective view of a stem trunnion securing piece.

FIG. 102 depicts a side perspective view of a smaller sized stem trunnion securing piece 624 similarly illustrating the threaded portion 682 having a slot 684 therein, and the inner ribbed portion 686 having four slots therein, here with one slot 694 shown labeled by a reference character. It is anticipated that varying sizes of the stem trunnion securing piece 624 will be made available to accommodate the varying sizes of the stem trunnions, integral to the varying stem implants to be surgically extracted employing the present system. These provided differing sizes of the stem trunnion securing piece 624 will be readily mounted in exactly the same fashion by placing the stem trunnion securing piece 624 into the central cavity then securing it in place using the nut 626. In this way, the stem trunnion securing piece 624 will also be replaceable and reusable as when the nut 626 is loosened the stem trunnion 642 is released from the extracted stem trunnion after extraction of the stem.

Figure 103:
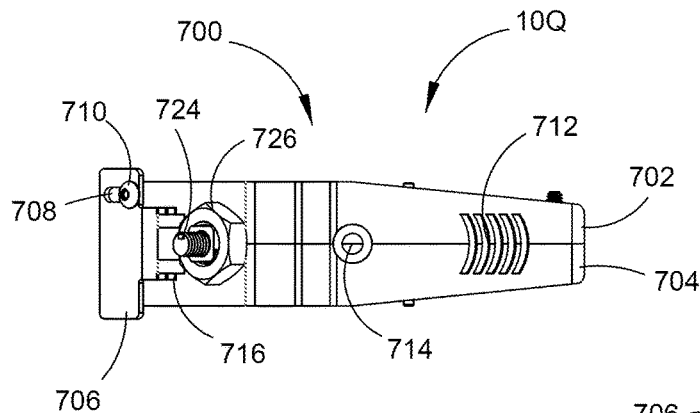
FIG. 103 depicts a top plan view of an alternate embodiment of the joint revision surgery apparatus illustrating an assembled knife blade guide block having an adjustable L-shaped knife blade guide plate.

FIG. 103 depicts a top plan view of an alternate embodiment of the joint revision surgery apparatus 10Q illustrating an assembled knife blade guide block 700 having an adjustable L-shaped knife blade guide plate. As before, the guide block is made from two half sections 702 and 704 held together using Allen screws and alignment pins (see FIG. 120 below). The L-shaped knife blade guide plate has an upper portion 706 and a lower portion 718. The guide plate upper portion includes an adjustable guide plate retaining screw slot 708 in which the adjustable guide plate retaining screw 710 is threaded into an threaded orifice (not shown here) with in the guide block assembly 700. Integral to the guide block assembly 700 is a plurality of forward blade guide slots 716 for accepting the adjustable guide plate 718 and the knife blades (not shown, see below), and a central cavity 720. The central cavity 720 is configured to accept a trunnion securing member 724 (best seen in FIG. 111), and the trunnion securing member is secured using securing nut 726. Additionally, the assembled guide block 700 defines a plurality of rearward blade guide slots. In this way, the guide block can be adjusted for any size femoral stem implant encountered for removal during revision surgery. The various adjustments are described in greater detail below.

Figure 104:
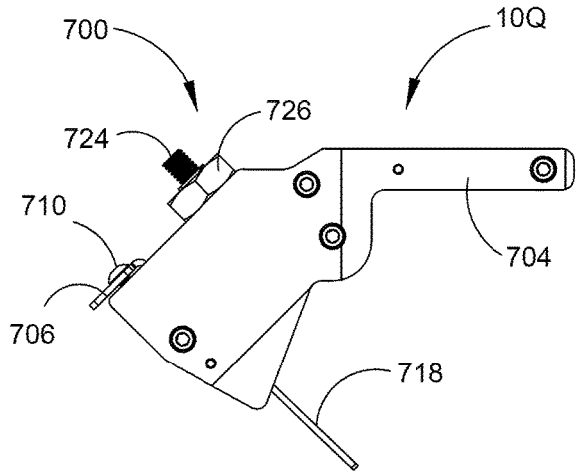
FIG. 104 depicts a side elevational view of an alternate embodiment of the joint revision surgery apparatus illustrating an assembled knife blade guide block having an adjustable L-shaped knife blade guide plate.

FIG. 104 depicts a side elevational view of an alternate embodiment of the joint revision surgery apparatus 10Q illustrating an assembled knife blade guide block 700 having an adjustable L-shaped knife blade guide plate upper section 706 and lower section 718, which drawing figure includes the same parts. This view better shows the lower guide plate 718 extending downward below the guide block assembly 700.

Figure 105:
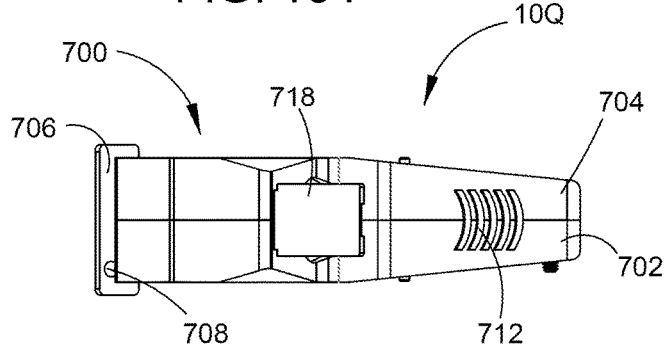
FIG. 105 depicts a bottom view of an alternate embodiment of the joint revision surgery apparatus illustrating an assembled knife blade guide block having an adjustable L-shaped knife blade guide plate.

FIG. 105 depicts a bottom view of an alternate embodiment of the joint revision surgery apparatus 10Q illustrating an assembled knife blade guide block 700 having an adjustable L-shaped knife blade guide plate upper section 706 and lower section 718, which drawing figure includes the same parts. This view better shows the upper guide plate retaining screw slot 708 as well as the rearward blade guide slots 712 integral to the guide block assembly 700.

Figure 106:
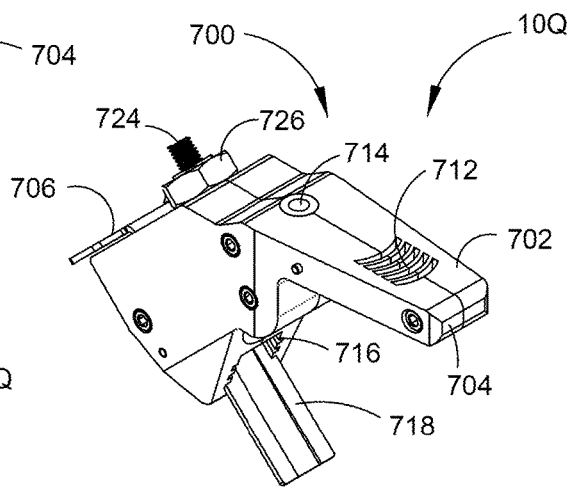
FIG. 106 depicts a top, side elevational and perspective view of an alternate embodiment of the joint revision surgery apparatus illustrating an assembled knife blade guide block having an adjustable L-shaped knife blade guide plate.

FIG. 106 depicts a top, side elevational and perspective view of an alternate embodiment of the joint revision surgery apparatus 10Q illustrating an assembled knife blade guide block 700 having an adjustable L-shaped knife blade guide plate upper section 706 and lower section 718, which drawing figure includes the same parts. This view better shows the lower guide plate 718 extending downward below the guide block assembly 700 as well as the trunnion securing member 724 retaining nut 726.

Figure 107:
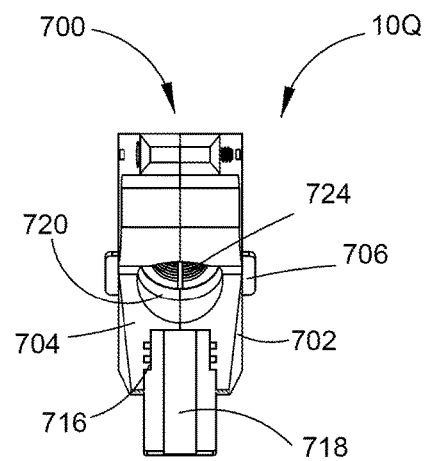
FIG. 107 depicts a bottom rear view of an alternate embodiment of the joint revision surgery apparatus illustrating an assembled knife blade guide block having an adjustable L-shaped knife blade guide plate.

FIG. 107 depicts a bottom rear view of an alternate embodiment of the joint revision surgery apparatus 10Q illustrating an assembled knife blade guide block 700 having an adjustable L-shaped knife blade guide plate upper section 706 and lower section 718, which drawing figure includes the same parts. This view better shows the lower guide plate 718 extending downward below the guide block assembly 700, as well as the central cavity 720 and the plurality of guide blade slots 716.

Figure 108:
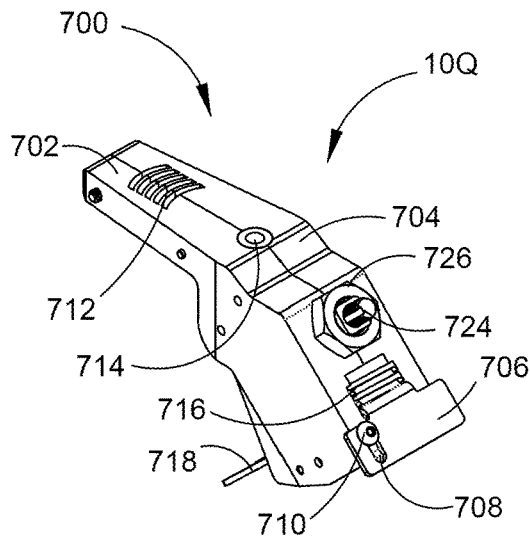
FIG. 108 depicts a top, side elevational and perspective view of an alternate embodiment of the joint revision surgery apparatus illustrating an assembled knife blade guide block having an adjustable L-shaped knife blade guide plate fully extended downwardly.

FIG. 108 depicts a top, side elevational and perspective view of an alternate embodiment of the joint revision surgery apparatus 10Q illustrating an assembled knife blade guide block 700 having an adjustable L-shaped knife blade guide plate 718 fully extended downwardly and positioned in the frontmost blade guide slot within the plurality of blade guide slots 716. This view clearly illustrates the position of the guide plate adjustment screw 710 and the adjustment screw slot 708 within the upper section of the L-shaped guide plate 706. The adjustment screw 710 can be adjusted upwardly and downwardly by threading in or out of the assembled guide block 700, and it can be placed in any of the plurality of blade guide slots 716 within the guide block 700. To move the lower section guide plate 718 to another guide slot in the plurality of guide lots 716, one must unthread and remove the adjustment screw 710 then replace it by sliding it to another position so the guide plate lower section 718 can be placed in a different guide slot 716.

Figure 109A:
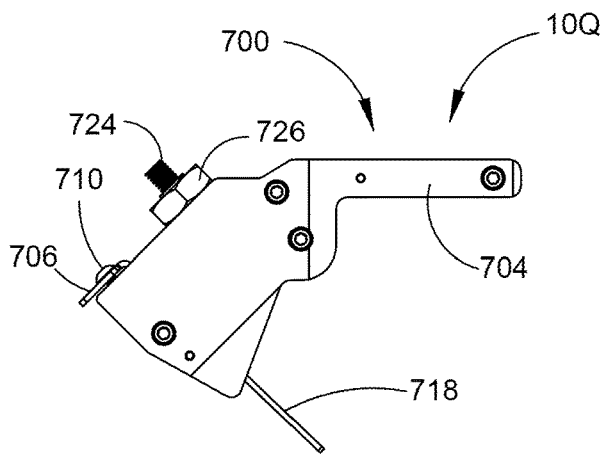
FIG. 109A depicts a side elevational view of an alternate embodiment of the joint revision surgery apparatus illustrating an assembled knife blade guide block having an adjustable L-shaped knife blade guide plate fully extended downwardly.

FIG. 109A depicts a side elevational view of an alternate embodiment of the joint revision surgery apparatus 10Q illustrating an assembled knife blade guide block 700 having an adjustable L-shaped knife blade guide plate 718 fully extended downwardly. This view better shows the lower guide plate 718 extending downward below the guide block assembly 700.

Figure 109B:
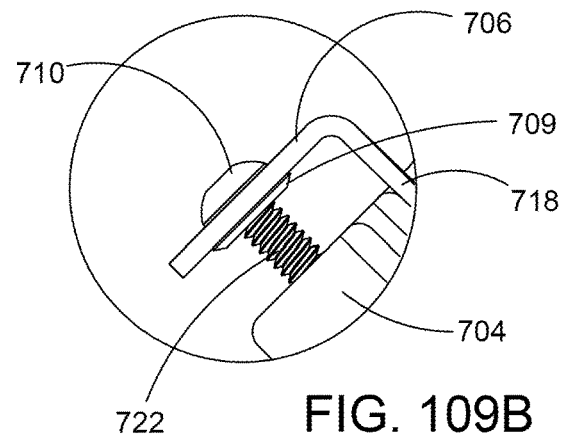
FIG. 109B depicts an enlarged side elevational view of the upper section guide plate and guide plate adjustment screw having an integral retaining washer welded to the underside of the upper section guide plate.

FIG. 109B depicts an enlarged side elevational view of the upper section guide plate 706 and guide plate adjustment screw 710 having an integral retaining washer 709 welded to the underside of the upper section guide plate 706. The guide plate retaining screw 710 here is partially threaded out exposing the threaded section 722. This retaining washer makes it possible for the guide plate upper section 706 to rise and be secured in an upward position when the adjustment plate retaining screw 710 is threaded upwardly or to be lowered when the retaining screw 710 is threaded in downwardly. It is anticipated that a free spinning retaining washer (see retaining washer 711 as shown in FIGS. 113 and 115) can be used in place of this welded on retaining washer 709 to accomplish the same task of securing the adjustment plate 706 and 718.

Figure 110:
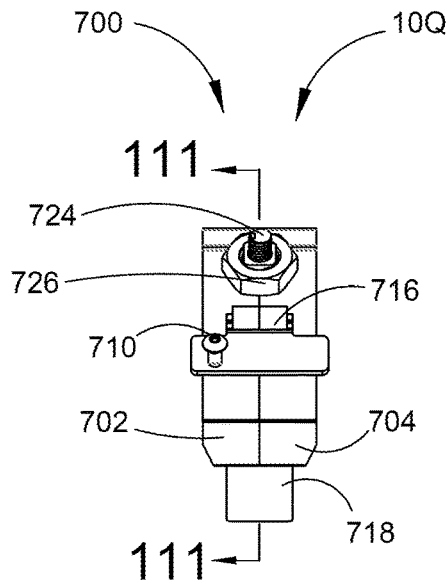
FIG. 110 depicts a front view of an alternate embodiment of the joint revision surgery apparatus illustrating an assembled knife blade guide block having an adjustable L-shaped knife blade guide plate fully extended downwardly.

FIG. 110 depicts a front view of an alternate embodiment of the joint revision surgery apparatus 10Q illustrating an assembled knife blade guide block 700 having an adjustable L-shaped knife blade guide plate 718 fully extended downwardly. This view better shows the lower guide plate 718 extending downward into the plurality of forward blade guide slots 716 within the guide block assembly 700.

Figure 111:
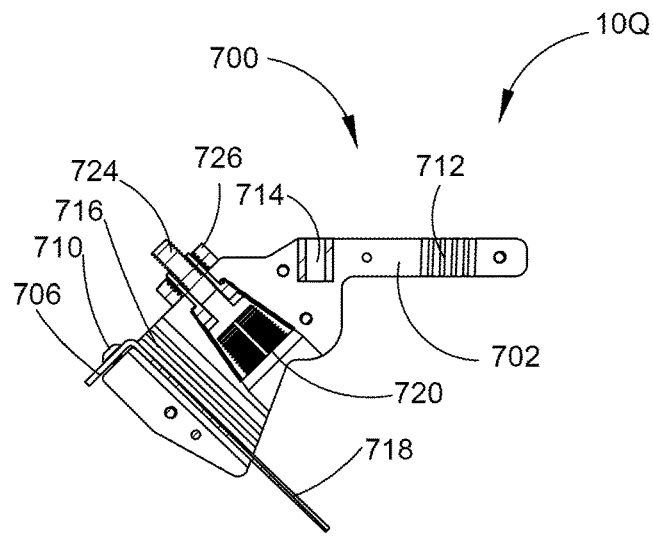
FIG. 111 depicts a cross-sectional view of an alternate embodiment of the joint revision surgery apparatus illustrating an assembled knife blade guide block having an adjustable L-shaped knife blade guide plate fully extended downwardly of FIG. 110.

FIG. 111 depicts a cross-sectional view of an alternate embodiment of the joint revision surgery apparatus 10Q illustrating an assembled knife blade guide block 700 having an adjustable L-shaped knife blade guide plate upper section 706 and lower section 718 fully extended downwardly of FIG. 110. This view illustrates the position of the central cavity 720 and the trunnion securing member 724 within the central cavity 720 secured by the securing nut 726. It also clearly shows the plurality of blade guide slots 716 and the lower guide plate 718 extending down into the foremost of the plurality of guide slots 716. The lower guide plate 718 can be adjusted by being positioned in any one of the plurality of guide slots 716 by removing the retaining screw 710 and shifting the lower guide plate 718 to a different slot within the plurality of guide slots 716.

FIG. 112 depicts a top, side elevational and perspective view of an alternate embodiment of the joint revision surgery apparatus 10Q illustrating an assembled knife blade guide block 700 having an adjustable L-shaped knife blade guide plate upper section 706 and lower section 718 fully retracted upwardly. This view better shows the adjustment slot 708 in the guide plate upper section 706 which allows for the repositioning of the guide plate lower section 718 into differing slots within the plurality of guide slots 716. In this way, the lower guide plate 718 can be positioned in any one of the slots making up the plurality of guide slots 716 and thus, is adjustable forward (toward the femoral stem implant) and backward (away from the femoral stem implant) to accommodate differing sizes of femoral stem implants to be removed during revision surgery.

FIG. 113 depicts a side elevational view of an alternate embodiment of the joint revision surgery apparatus 10Q illustrating an assembled knife blade guide block 700 having an adjustable L-shaped knife blade guide plate upper section 706 and lower section 718 having the lower section guide plate 718 fully retracted upwardly. Here, the retaining screw 710 has been rotated to extend outwardly along screw threads 722. Retaining washer 711 keeps the upper section guide plate 706 from falling back down toward the guide block assembly 700. In this way, the lower guide plate 718 is adjustable upwardly away from the femoral stem implant and downwardly toward the femoral stem implant to accommodate differing sizes of femoral stem implants to be removed during revision surgery.

FIG. 114 depicts a front view of an alternate embodiment of the joint revision surgery apparatus 10Q illustrating an assembled knife blade guide block 700 having an adjustable L-shaped knife blade guide plate 706 and 718 partially retracted upwardly. This front view better shows the threaded portion 722 of retaining screw 710.

FIG. 115 depicts a cross-sectional view of an alternate embodiment of the joint revision surgery apparatus 10Q illustrating an assembled knife blade guide block 700 having an adjustable L-shaped knife blade lower guide plate 718 and upper guide plate section 706 fully retracted upwardly as seen in FIG. 114. Here the guide plate retaining screw 710 is threaded 722 all the way out and the upper section guide plate 706 is being held up by retaining washer 711. Again, the lower section guide plate 718 is in the foremost guide slot position within the plurality of guide slots 716. This cross-sectional view also clearly shows the central cavity 720, the trunnion securing member 724 and securing nut 726, along with the rearward blade guide slots 712 and the threaded orifice 714 for accepting an eyebolt (not shown see FIGS. 120-127). This position, farthest from the medial calcar, would accommodate a larger or collared femoral stem implant.

Figure 116:
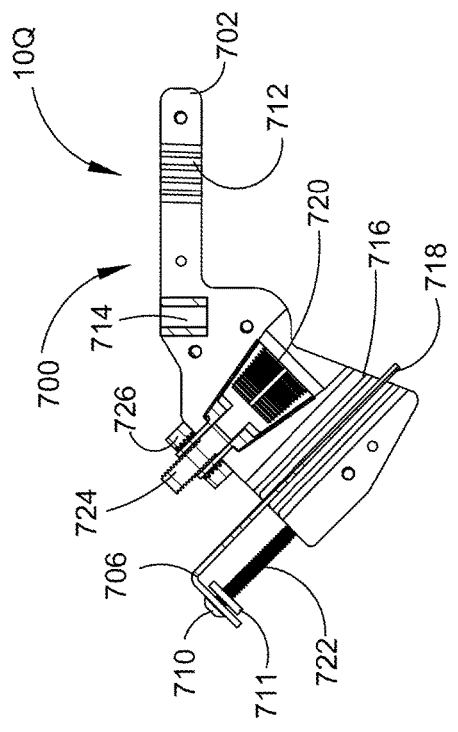

FIG. 116 depicts a cross-sectional view of an alternate embodiment of the joint revision surgery apparatus 10Q illustrating an assembled knife blade guide block 700 having an adjustable L-shaped knife blade guide plate upper section 706 and lower section 718 fully extended downwardly and positioned in the middle knife blade guide slot within the guide block. This view clearly shows that the lower section guide plate 718 has been moved and repositioned in one of the middle guide slots within the plurality of guide slots 716. This position, a medium distance to the medial calcar, would accommodate a medium sized femoral stem implant.

Figure 117:
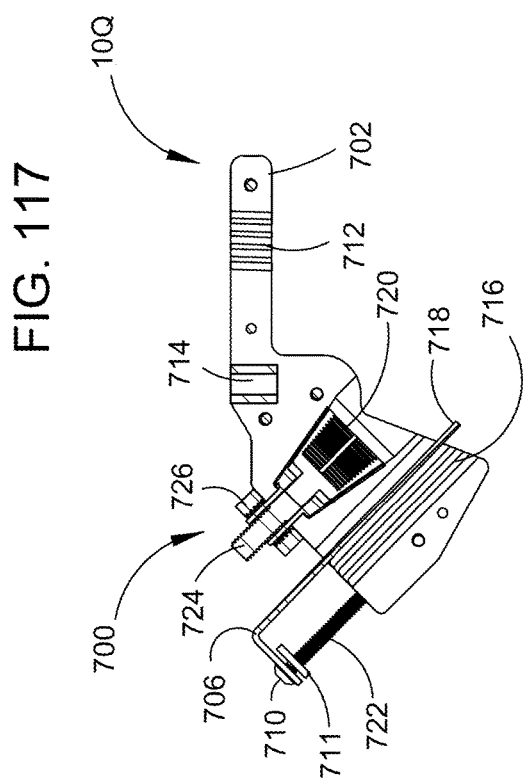

FIG. 117 depicts a cross-sectional view of an alternate embodiment of the joint revision surgery apparatus 10Q illustrating an assembled knife blade guide block 700 having an adjustable L-shaped knife blade guide plate lower section 718 fully retracted upwardly and positioned in the middle knife blade guide slot within the plurality of guide slots 716 integral to the guide block assembly 700. It also shows the retaining washer 711 which holds the upper section guide plate 706 in the upward position.

Figure 118:
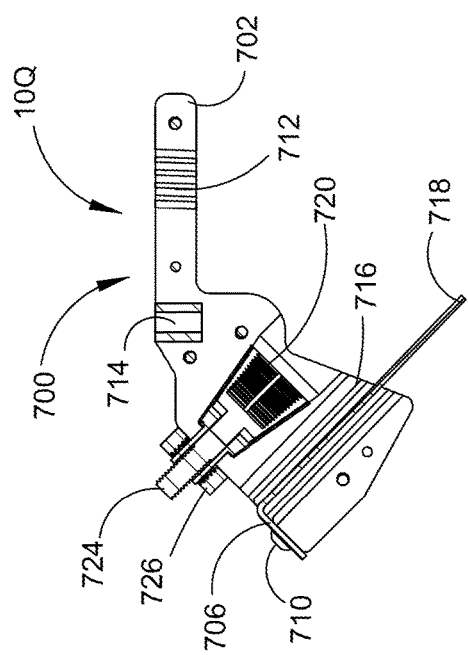

FIG. 118 depicts a cross-sectional view of an alternate embodiment of the joint revision surgery apparatus 10Q illustrating an assembled knife blade guide block 700 having an adjustable L-shaped knife blade guide plate upper section 706 and lower section 718 fully extended downwardly and positioned in the knife blade guide slot closest to the central cavity 720 within the guide block. This view clearly shows that the lower section guide plate 718 has been moved and repositioned in the closest guide slot to the central cavity 720 and thereby, is now positioned closest to the femoral stem implant to be removed during revision surgery. This position, closest to the medial calcar, would accommodate a smaller femoral stem implant.

Figure 119:
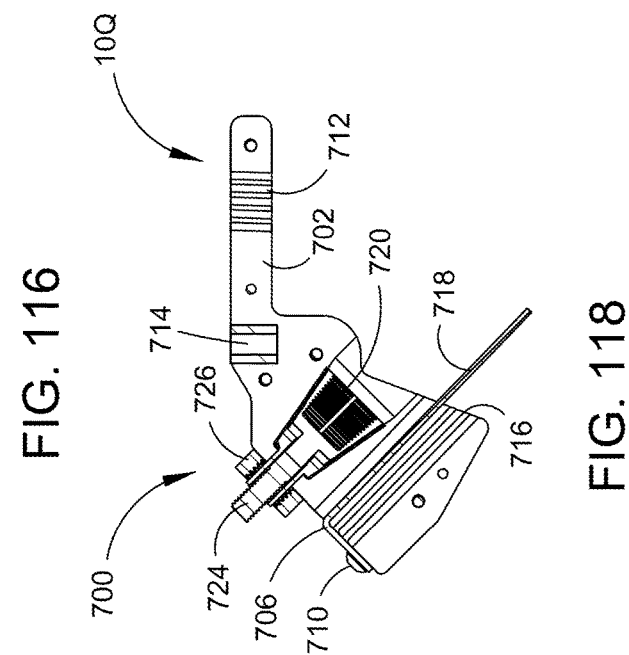

FIG. 119 depicts a cross-sectional view of an alternate embodiment of the joint revision surgery apparatus 10Q illustrating an assembled knife blade guide block 700 having an adjustable L-shaped knife blade guide plate lower section 718 fully retracted upwardly and positioned in the middle knife blade guide slot within the plurality of guide slots 716 integral to the guide block assembly 700. It also shows the retaining washer 711 which holds the upper section guide plate 706 in the upward position. This position, closest to the medial calcar but fully retracted upwardly, would accommodate a smaller to medium sized femoral stem implant.

Figure 120:
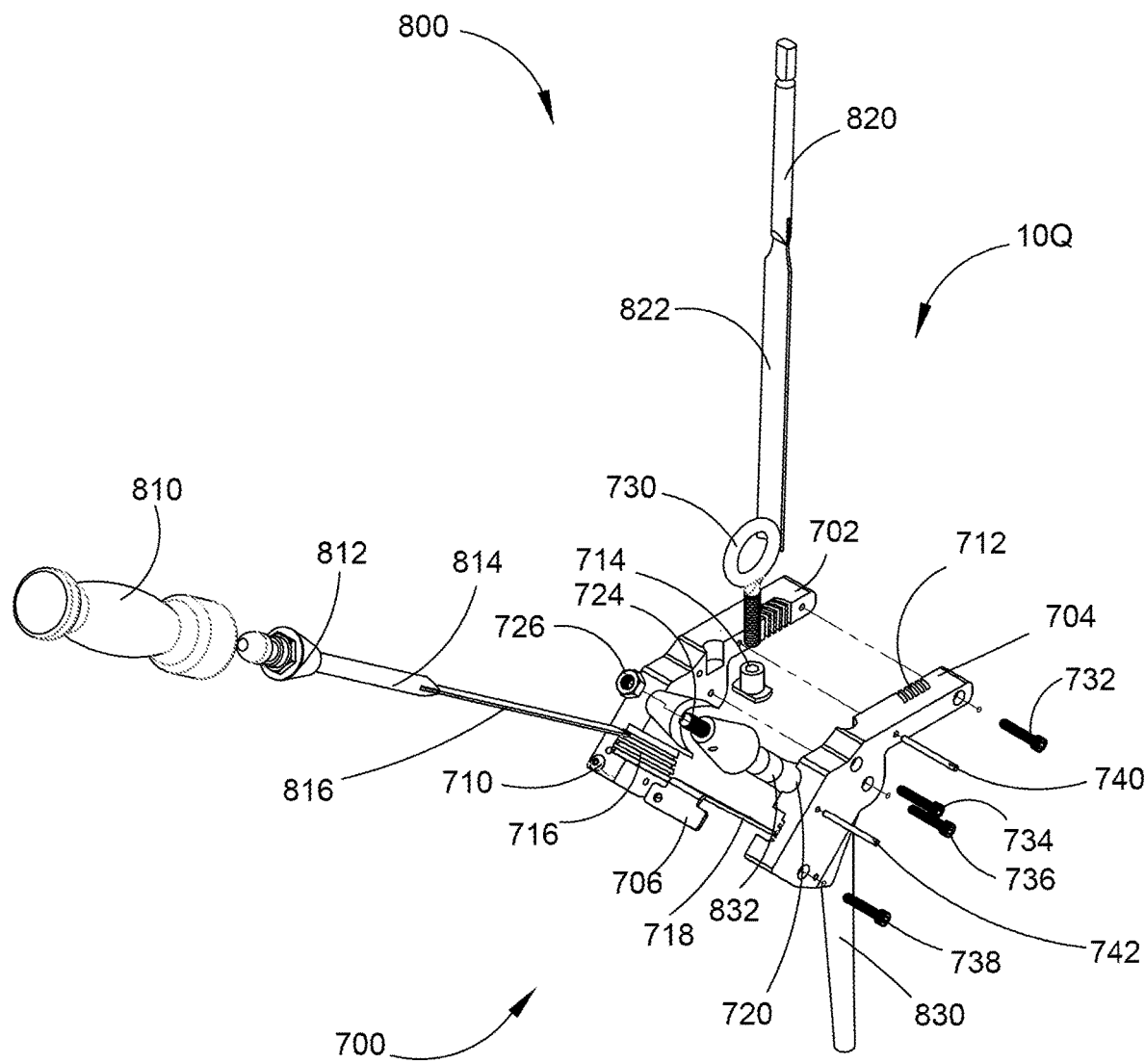

FIG. 120 depicts an exploded view of the alternate embodiment of the joint revision surgery apparatus 10Q illustrating a disassembled knife blade guide block assembly 700 having an adjustable L-shaped knife blade guide plate 706 and 718, and showing its use during revision surgery 800 with respect to the relative positions of the medial calcar knife blade 816 and posterior knife blade 822 before insertion into the forward knife blade guide slots 716 and rearward knife blade guide slots 712 within the guide block assembly 700, as its relative position to the femoral stem implant 830 and femoral stem implant trunnion portion 832. Assembly of the two half sections 702 and 704 is accomplished using Allen screws 732, 734, 736 and 738 along with alignment pins 740 and 742. Also shown is eyebolt 730 and threaded orifice 714 to accept the eyebolt 730. The medial calcar blade 816 includes blade shaft 814 is attached to handle adapter 812 which allows for fastening to handle 810. The posterior blade 822 includes blade shaft 820.

Figure 121:
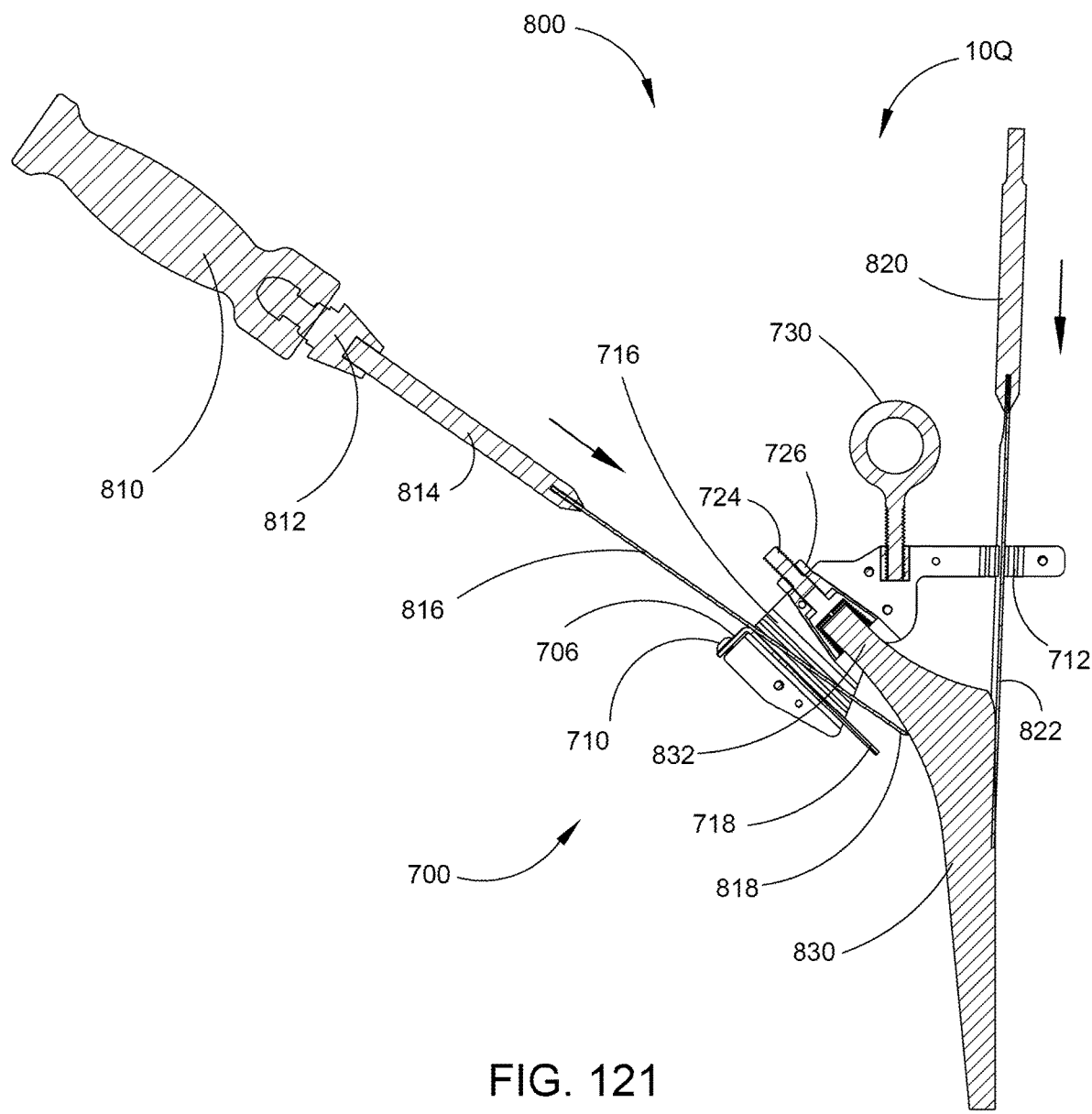

FIG. 121 depicts a cross-sectional view of the alternate embodiment of the joint revision surgery apparatus 10Q illustrating an assembled knife blade guide block 700 having an adjustable L-shaped knife blade guide plate, in use during revision surgery 800 showing the surgical knife blades 816 and 822 inserted into the forward 716 and rearward 712 knife blade guide slots within the assembled guide block 700, for removal of a non-collared implanted femoral stem 830. Note that the guide plate lower section 718 has been inserted into the farthest most (away from the femoral stem implant) guide slot within the plurality of guide slots 716. Also, note that the guide plate adjustment screw 710 is threaded all the way into the block such that the guide plate lower section 718 is farthest from the femoral stem implant to be removed. Trunnion securing member 724 is securely fastened to the trunnion portion 832 of the stem 830. Posterior blade shaft 820 and cutting blade 822 extend down through rearward guides slots 712 and cut the posterior portion of the stem 830. Medial calcar blade 816 runs down through the plurality of guide slots 716 and is guided by the position of the guide plate lower section 718. The blade 816 makes contact with the stem 830. This FIG. 121 represents Steps 1-4 of the procedure for revision surgery to remove a femoral stem implant, namely, Step 1: adjust the guide plate height and slot position for the type and size of the femoral stem implant to be removed; Step 2: secure the trunnion portion 832 to the trunnion securing member 724; Step 3: insert the posterior cutting blade through the rearward blade guide slots 712; Step 4: after all adjustments have been made to the guide plate, and the rearward or posterior cutting blade 822 has been inserted, then the medial calcar blade 816 insertion is initiated. In this way, the correct and appropriate adjustments have been made to accommodate the size and shape of the femoral stem implant 830 to be removed during the subsequent steps of the revision surgery procedure using the joint revision surgery apparatus 10Q guide block assembly 700.

Figure 122:
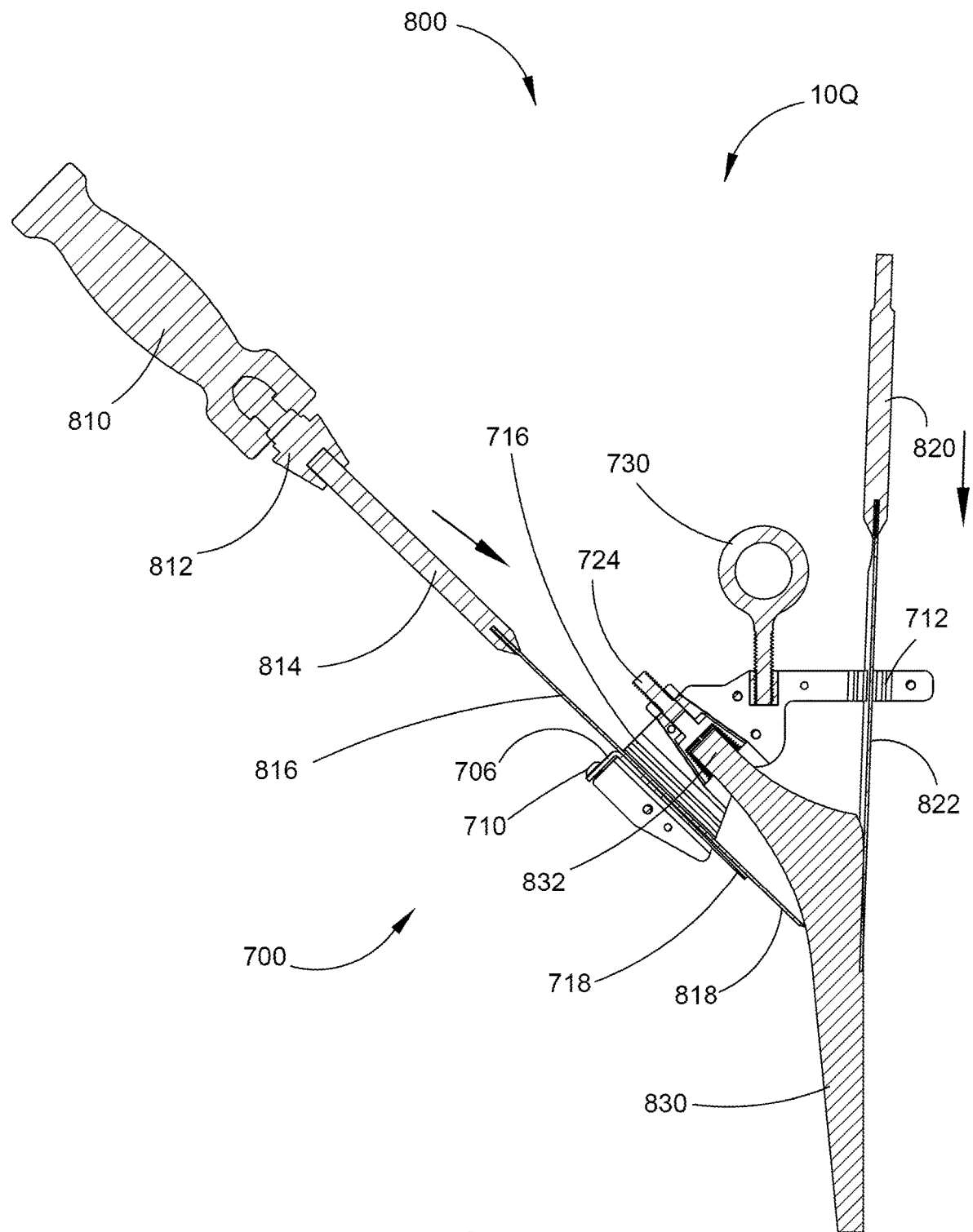

FIG. 122 depicts a cross-sectional view of the alternate embodiment of the joint revision surgery apparatus 10Q illustrating an assembled knife blade guide block 700 having an adjustable L-shaped knife blade guide plate 706 and 718, in use during revision surgery 800 showing the surgical knife blades 816 and 822 inserted into the forward 716 and rearward 712 knife blade guide slots within the assembled guide block 700, for removal of a non-collared implanted femoral stem. This FIG. 122 represents Step 5 of the procedure for revision surgery to remove a femoral stem implant, namely, Step 5: insert medial calcar cutting blade 816 until it makes contact with the femoral stem implant 830 to be removed.

Figure 123:
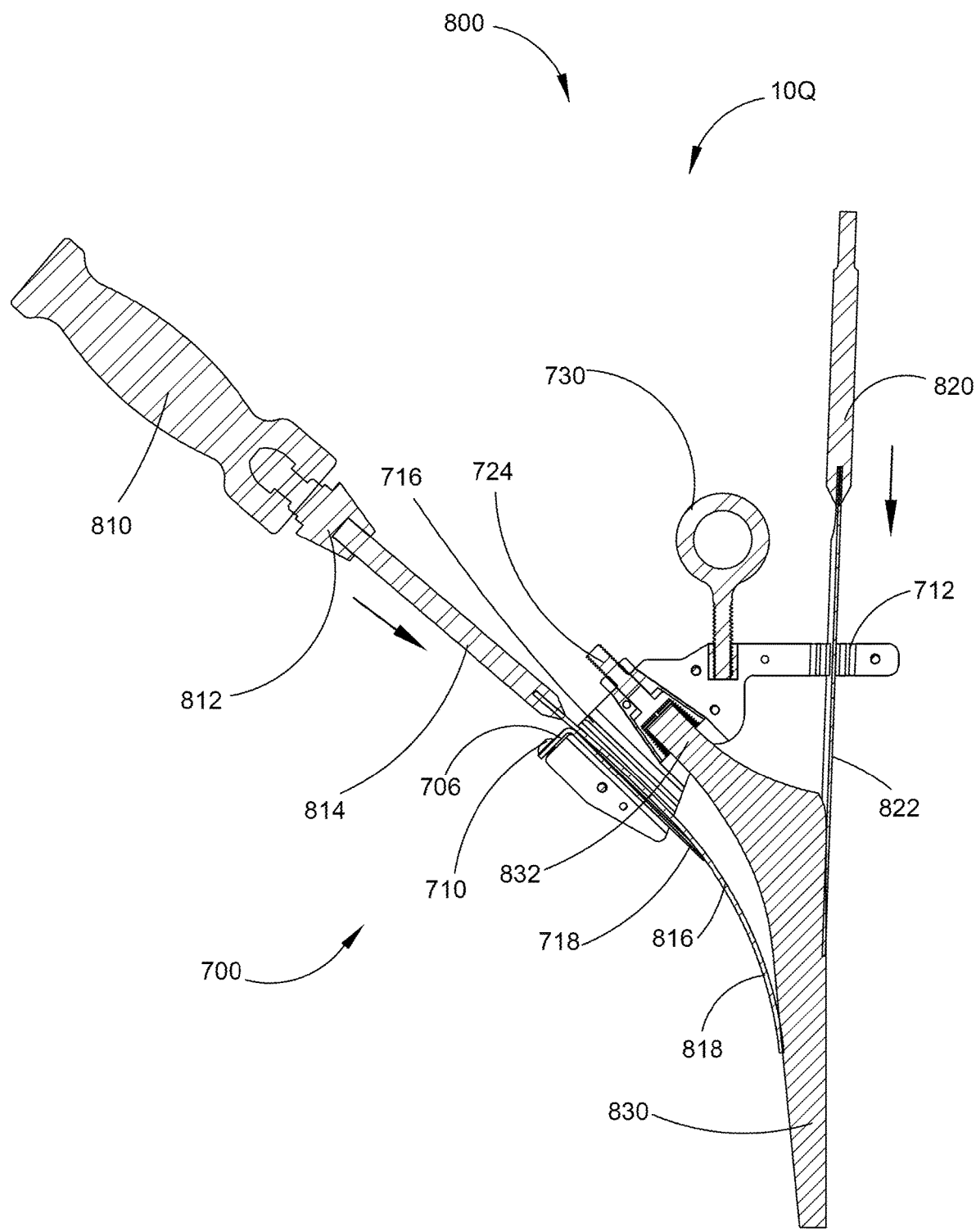

FIG. 123 depicts a cross-sectional view of the alternate embodiment of the joint revision surgery apparatus 10Q illustrating an assembled knife blade guide block 700 having an adjustable L-shaped knife blade guide plate 706 and 718, in use during revision surgery 800 showing the surgical knife blades 816 and 822 inserted into the forward 716 and rearward 712 knife blade guide slots within the assembled guide block 700, for removal of a non-collared implanted femoral stem. This FIG. 123 represents Step 6 of the procedure for revision surgery to remove a femoral stein implant 830, namely, Step 6: continue downward pressure and motion of the medial calcar cutting blade 816 until it advances past the point of initial contact with the femoral stem implant 830 to be removed, and begins cutting the femoral stein implant away from the femur bone. In this FIG. 123 note that the L-shaped guide plate 706 and 718 are positioned within the guide slot farthest away from the femoral stem implant 830. Also note that the guide plate lower section 718 is secured at its lowest point possible, closest to the femoral stem implant 830 to be removed during revision surgery.

Figure 124:
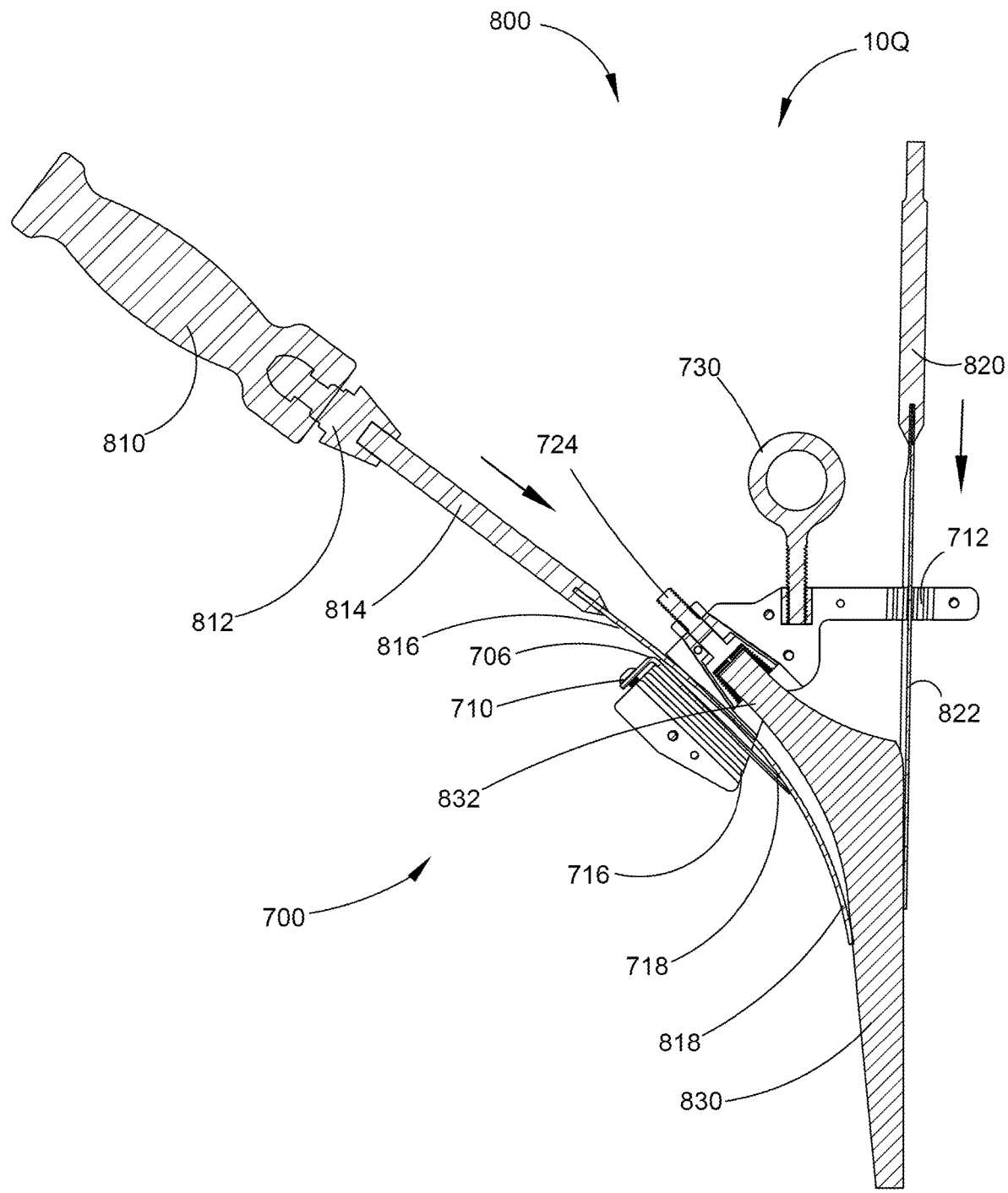

FIG. 124 depicts a cross-sectional view of the alternate embodiment of the joint revision surgery apparatus 10Q illustrating an assembled knife blade guide block 700 having an adjustable L-shaped knife blade guide plate 706 and 718, in use during revision surgery 800 showing the surgical knife blades 816 and 822 inserted into the forward 716 and rearward 712 knife blade guide slots within the assembled guide block 700, for removal of a non-collared implanted femoral stem. This FIG. 124 again represents Step 6 of the procedure for revision surgery to remove a femoral stem implant 830, namely, Step 6: continue downward pressure and motion of the medial calcar cutting blade 816 until it advances past the point of initial contact with the femoral stem implant 830 to be removed, and begins cutting the femoral stem implant away from the femur bone. In this FIG. 124 note that the L-shaped guide plate 706 and 718 are positioned within the guide slot closest to the femoral stem implant 830. Also note that the guide plate lower section 718 is secured at a slightly raised position relative to its lowest point possible, a bit farther away from the femoral stem implant 830 to be removed during revision surgery.

Figure 125:
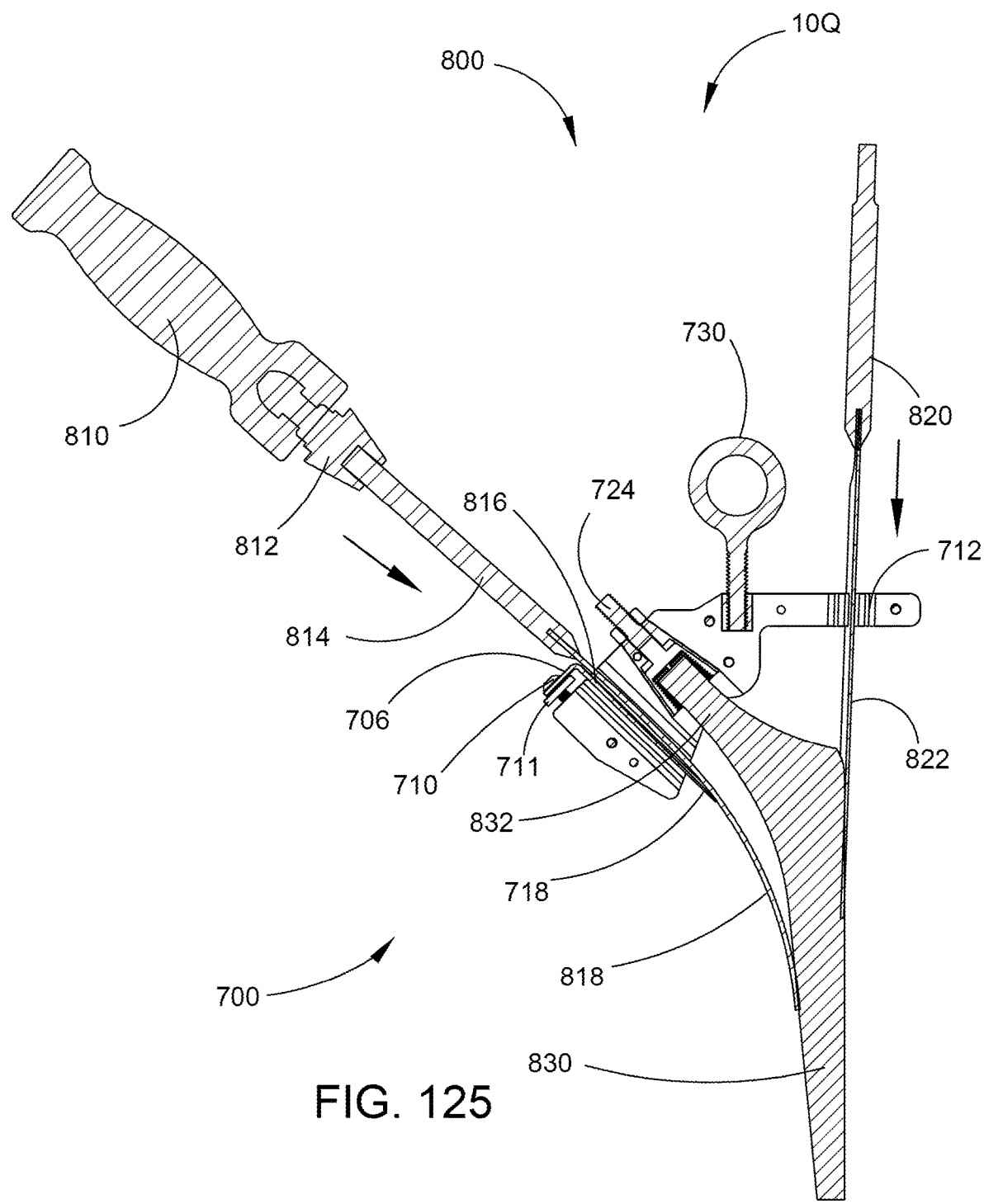

FIG. 125 depicts a cross-sectional view of the alternate embodiment of the joint revision surgery apparatus 10Q illustrating an assembled knife blade guide block 700 having an adjustable L-shaped knife blade guide plate 706 and 718, in use during revision surgery 800 showing the surgical knife blades 816 and 822 inserted into the forward 716 and rearward 712 knife blade guide slots within the assembled guide block 700, for removal of a non-collared implanted femoral stem. This FIG. 125 again represents Step 6 of the procedure for revision surgery to remove a femoral stem implant 830, namely, Step 6: continue downward pressure and motion of the medial calcar cutting blade 816 until it advances past the point of initial contact with the femoral stem implant 830 to be removed, and begins cutting the femoral stem implant away from the femur bone. In this FIG. 124 note that the L-shaped guide plate 706 and 718 are positioned within the guide slot closest to the femoral stem implant 830. This view better shows the retaining washer 711 used to keep the guide plate upper section 706 up when the adjustment plate retaining screw 710 is raised. Also note that the guide plate lower section 718 is secured at a more raised position relative to its lowest point possible, a bit farther away from the femoral stem implant 830 to be removed during revision surgery.

FIG. 126 depicts a cross-sectional view of the alternate embodiment of the joint revision surgery apparatus 10Q illustrating an assembled knife blade guide block 700 having an adjustable L-shaped knife blade guide plate 706 and 718, in use during revision surgery 800 showing the surgical knife blades 816 and 822 inserted into the forward 716 and rearward 712 knife blade guide slots within the assembled guide block 700, for removal of a collared implanted femoral stem 840 including a collar 850. The femoral stem trunnion section 842 has been secured to the trunnion securing member 724. This FIG. 126 represents Step 5 of the procedure for revision surgery to remove a collared femoral stem implant, namely, Step 5: inserting the medial calcar cutting blade 816 until it makes initial contact with the femoral stem implant 840 to be removed, here bypassing the collar 850 on the collared stem 840. In this FIG. 126 note that the L-shaped guide plate 706 and 718 are positioned within the guide slot in the middle section of the plurality of guide slots 716 a medium distance from the femoral stem implant 840. Also note that the adjustment plate retaining screw 710 is slightly raised allowing the guide plate lower section 718 to guide a cutting blade 816 beneath the collar 850 on the collared stem 840. This view better shows the retaining washer 711 used to keep the guide plate upper section 706 up when the adjustment plate retaining screw 710 is raised. Also note that the guide plate lower section 718 is secured at a more raised position relative to its lowest point possible, a bit farther away from the collared femoral stem implant 840 to be removed during revision surgery.

FIG. 127 depicts a cross-sectional view of the alternate embodiment of the joint revision surgery apparatus 10Q illustrating an assembled knife blade guide block 700 having an adjustable L-shaped knife blade guide plate 706 and 718, in use during revision surgery 800 showing the surgical knife blades 816 and 822 inserted into the forward 716 and rearward 712 knife blade guide slots within the assembled guide block 700, for removal of a non-collared implanted femoral stem. The femoral stem trunnion section 842 has been secured to the trunnion securing member 724. This FIG. 127 again represents Step 6 of the procedure for revision surgery to remove a collared femoral stem implant 840, namely, Step 6: continue downward pressure and motion of the medial calcar cutting blade 816 until it advances past the point of initial contact with the collared femoral stem implant 840 to be removed, and begins cutting the collared femoral stem implant 840 away from the femur bone. In this FIG. 127 note that the L-shaped guide plate 706 and 718 are positioned within the guide slot closest to the femoral stem implant 840. Note that the guide plate lower section 718 is secured at a more raised position relative to its lowest point possible, a bit farther away from the femoral stem implant 840 to be removed during revision surgery. This allows the guide plate 718 to guide the cutting blade 816 down passed the collar 850 on the collared stem 840. These two aforementioned adjustments allow the guide block 700 to be used with varying sized collared and non-collared femoral stem implants.

In summary, the alternate embodiment of the joint revision surgery apparatus 10Q illustrating an assembled knife blade guide block 700 having an adjustable L-shaped knife blade guide plate 706 and 718, can be adjusted in two separate ways. First, the adjustment plate retaining screw 710 can be threaded outwardly (lifted) or threaded inwardly (lowered) to retract or extend the lower adjustment plate 718 towards or away from the stem. Second, the adjustment plate retaining screw 710 can be removed altogether and the guide plate lower section 718 shifted to a different guide slot within the plurality of guide slots 716, with that guide slot being closer or farther away from the stem to be extracted. One or both of the aforementioned guide plate adjustments can be made to successfully guide a cutting blade down to a stem of varying size, and in this way the guide block assembly 700 can accommodate varying sized stems to be removed during revision surgery. Moreover, both a collared and non-collared stem can be extracted by making the appropriate adjustments to the length and distance of the adjustable guide plate.

In addition to the two-piece construction of the assembled surgical knife blade guide block 600 and 700, it is anticipated that the surgical knife blade guide block 600 and 700 of the present invention could be manufactured and formed in one piece by being molded or computer numerical control (CNC) formed from a piece of material, including but not limited to metal, plastic, wood, ceramic and composite. Likewise, it is anticipated that the stem trunnion securing member of the present invention could be manufactured and formed in one or two pieces by being molded or computer numerical control (CNC) formed from one or two pieces of material, including but not limited to metal, plastic, wood, ceramic and composite.

In joint revision surgery, a extraction of an implanted prosthesis, like a femoral stem presents a challenging problem to the surgeon. The present invention makes the process of extraction significantly easier, quicker, more efficient and much less damaging to the patient. To summarize, the following are the 12 steps of the surgical procedure utilizing the Joint Revision Surgery Apparatus 10P and 10Q to extract a femoral stem, according to the present invention:

Steps of the Femoral Stem Extraction Procedure Utilizing Guide Black Assembly 600 of Embodiment 10P (Knurled Knob Adjustment Method)

1. Expose the hip in anterior, direct anterior; lateral, and/or posterior procedure or the surgeon's usual familiar fashion.
2. Dislocate the hip and remove the head.
3. Expose the femoral side of the total hip.
4. Expose the area of femur bone directly below the collar (if a collared stem) and remove a triangular or U-shaped piece of bone from the upper portion of the femur directly below the stem collar (if a collared stem).
5. Secure the assembled guide block with stem securing member to the stem trunnion and tighten stem securing member nut to firmly affix the stem securing member to the stem trunnion.
6. Release the anterior and posterior sides of the stem with the osteotome of choice, using a pickle fork or single blade extraction apparatus, such as that disclosed in U.S. patent application Ser. No. 17/198,396 which is incorporated in its entirely by reference herein.

7. Extend a rigid cutting blade down through the rearward blade guide slots and make contact with the stem thereby releasing the lateral aspect of the stem cutting the lateral aspect stem surface from the bone.
8. Extend a flexible cutting blade down through a surgical knife blade large forward slot equipped with an adjustable pressure plate and pressure plate adjustment knob.
9. Rotate the pressure plate adjustment knob to actuate the pressure plate inwardly placing pressure on the extended flexible knife blade within the surgical knife blade large forward slot, thereby accurately guiding the blade to the medial surface of the stem to be removed.
10. Extend the flexible cutting blade down the medial surface of the stem thereby releasing the medial surface of the stem to be removed from the bone.
11. Release the lateral aspect of the stem with a combination of the rigid blade and the flexible one through the appropriate slot.
12. Remove the stem manually by hand, or if removal manually by hand is not possible, secure the eye bolt onto the block and use a 2 lb. slap hammer with a hook by placing the hook through the eye bolt, or threading a slap hammer directly onto a hook secured to the surgical knife blade guide block, and gently removing the fully released stem.

Steps of the Femoral Stem Extraction Procedure Utilizing Guide Black Assembly 700 of Embodiment 10Q (Adjustable Guide Plate Method)

1. Approach the hip in the surgeons preference i.e. anterior, posterior, or lateral.
2. Release the soft tissue and dislocate the hip. Remove the femoral head. Remove soft tissue as needed to expose the bone implant interface. Use a Lambotte osteotome to define the bone implant interface. If a collared stem is found remove a small portion of bone below the collar to allow the flexible osteotome access to the stem below the collar.
3. Next use the anterior and posterior side specific osteotomes. After the anterior and posterior surfaces are released then choose the appropriate trunnion securing member adaptor.
4. Tighten the guide block to the stem.
5. Next choose the appropriate slot to place the adjustable guide plate into. After the correct slot has been chosen then thread the screw into the block and adjust the guide plate to the appropriate depth.
6. Next advance the flexible knife blade down the calcar. Adjust the guide plate as needed as the blade is advanced.
7. Remove the knife blade.
8. Next choose the correct slot laterally and advance the lateral knife blade until the lateral shoulder is released.
9. Thread the eyebolt into the threaded orifice for the eyebolt.
10. Attach the slap handle and extract.

The Joint Revision Surgery Apparatus 10A, 10B, 10C, 10D, 10E, 10F, 10G, 10H, 10J, 10K, 10L, 10M, 10N, 10P and 10Q shown in the drawings and described in detail herein disclose arrangements of elements of particular construction and configuration for illustrating preferred embodiments of structure and method of operation of the present design. It is to be understood, however, that elements of different construction and configuration and other arrangements thereof, other than those illustrated and described may be employed for providing a Joint Revision Surgery Apparatus 10A, 10B, 10C, 10D, 10E, 10F, 10G, 10H, 10J, 10K, 10L, 10M, 10N, lop and 10Q in accordance with the spirit of this application, and such changes, alternations and modifications as would occur to those skilled in the art are considered to be within the scope of this application as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A joint revision surgery apparatus comprising:
   (a) a surgical knife blade guide block having two half sections which when assembled form an assembled surgical knife blade guide block having a centrally located cavity and a plurality of forwardly located surgical knife blade guide slots, wherein each half section has a front portion and a rear portion, and each half section has a top surface and a bottom surface;
   (b) a stem trunnion securing member mountable within said central cavity and secured to said assembled surgical knife blade guide block;
   (c) an L-shaped adjustable blade guide plate moveably located within said plurality of forwardly located surgical knife blade guide slots, wherein said L-shaped adjustable blade guide plate includes an upper section and a lower section;
   (d) and further wherein said upper section of said L-shaped adjustable blade guide plate includes a guide plate retaining screw slot and is secured to said assembled knife blade guide block by a threaded guide plate retaining screw extending through said L-shaped adjustable blade guide plate upper section and threaded into said guide block assembly, and said lower section of said L-shaped adjustable blade guide plate is configured to be movable to one or more guide slots within said plurality of forwardly located surgical knife blade guide slots;
   (e) one or more surgical knife blade guide slots for accepting surgical knife blades, located in the rear portion of said assembled surgical knife blade guide block; and
   (f) a plurality of rigid and flexible, curved and straight surgical knife blades;
   wherein said assembled surgical knife blade guide block is affixed to an implanted femoral stem for extraction by attaching said stem trunnion securing member to the trunnion of said stem, and then said L-shaped adjustable guide plate is adjusted upwardly and downwardly using said retaining screw and said L-shaped adjustable guide plate is adjusted forwardly and backwardly by extending said lower section of said adjustable guide plate into one or more of the plurality of guide slots defined by the guide block assembly, then extending said flexible surgical knife blades down through said forwardly located surgical knife blade guide slots containing the L-shaped adjustable guide plate and extending said rigid surgical knife blades down through said rearward slots to reach the femoral stem and thereby cut the femoral stem free from the femur bone during revision surgery.

2. The joint revision surgery apparatus according to claim 1, wherein said L-shaped adjustable guide plate upper section includes a guide plate retaining washer on said guide plate retaining screw, and said L-shaped adjustable guide plate lower section is adjusted upwardly and downwardly using said threaded guide plate retaining screw located within said guide plate retaining screw slot in said upper section of said L-shaped adjustable guide.

3. The joint revision surgery apparatus according to claim 1, wherein said L-shaped adjustable guide plate upper section includes a guide plate retaining washer affixed to said upper section of said L-shaped adjustable guide plate, and said L-shaped adjustable guide plate lower section is adjusted upwardly and downwardly using said threaded guide plate retaining screw located within said guide plate retaining screw slot in said upper section of said L-shaped adjustable guide.

4. The joint revision surgery apparatus according to claim 1, wherein said stem trunnion securing member includes a securing nut and said securing nut is configured to both secure said stem trunnion securing member securely onto an assembled surgical knife blade guide block and to tighten said stem trunnion securing member securely onto a stem trunnion for extraction when said securing nut is tightened.

5. The joint revision surgery apparatus according to claim 4, further wherein said stem trunnion securing member can be configured in differing size diameters, applicable for use depending on the size of the trunnion of the femoral stem to be extracted.

6. The joint revision surgery apparatus according to claim 1, wherein said stem trunnion securing member includes an outer body and an inner ribbed section wherein said inner ribbed section is slidably moveable within said outer body.

7. The joint revision surgery apparatus according to claim 1, wherein said stem trunnion securing member inner ribbed section has slots therein for the purpose of tightly securing a stem trunnion thereon.

8. The joint revision surgery apparatus according to claim 1, wherein said top surface of said assembled surgical knife blade guide block includes a threaded orifice configured to accept a hook or eyebolt threaded therein.

9. The joint revision surgery apparatus according to claim 1, wherein said surgical knife blade guide block, said stem trunnion securing member and said plurality of rigid and flexible, curved and straight surgical knife blades, is assembled into a surgeon's hospital kit.

* * * * *